United States Patent [19]

Wakabayashi et al.

[11] Patent Number: 5,537,517
[45] Date of Patent: Jul. 16, 1996

[54] INFORMATION PROCESSING DEVICE IN AN ELECTRONIC APPARATUS UTILIZING AN ACCESSORY CONTROL DEVICE AND METHODS OF APPLICATION

[75] Inventors: Kenichi Wakabayashi; Chitoshi Takayama; Tadashi Shiozaki, all of Suwa, Japan

[73] Assignee: Seiko Epson Corporation, Japan

[21] Appl. No.: 461,224

[22] Filed: Jun. 5, 1995

Related U.S. Application Data

[63] Continuation of Ser. No. 895,536, Jun. 8, 1992, which is a continuation-in-part of Ser. No. 816,455, Dec. 30, 1991, Pat. No. 5,410,641.

[30] Foreign Application Priority Data

Oct. 23, 1991 [JP] Japan .................................. 3-305457
Feb. 27, 1992 [WO] WIPO ..................... PCT/JP92/00245

[51] Int. Cl.[6] .................................................. G06K 15/00
[52] U.S. Cl. .............................................. 395/115; 395/166
[58] Field of Search ................................ 395/110, 115, 395/116, 112, 163, 164, 165, 166; 358/404, 444; 400/61–69

[56] References Cited

U.S. PATENT DOCUMENTS

| | | | |
|---|---|---|---|
| 4,441,164 | 4/1984 | Pavan et al. | 364/100 |
| 4,872,091 | 10/1989 | Maniwa et al. | 361/424 |
| 4,908,637 | 3/1990 | Chung et al. | 346/160 |
| 4,949,188 | 8/1990 | Sato | 358/448 |
| 5,041,918 | 8/1991 | Ishida et al. | 358/442 |
| 5,051,925 | 9/1991 | Kadone et al. | 395/115 |
| 5,109,490 | 4/1992 | Arimilli et al. | 395/325 |
| 5,137,379 | 8/1992 | Ukai et al. | 400/121 |

FOREIGN PATENT DOCUMENTS

| | | |
|---|---|---|
| 211285 | 12/1983 | Japan . |
| 52884 | 4/1985 | Japan . |
| 52885 | 4/1985 | Japan . |
| 142730 | 7/1985 | Japan . |
| 218939 | 11/1985 | Japan . |
| 196495 | 8/1986 | Japan . |
| 1181 | 1/1987 | Japan . |
| 5875 | 1/1987 | Japan . |
| 14689 | 1/1987 | Japan . |

(List continued on next page.)

OTHER PUBLICATIONS

E. Meyer, "Hochzeit Zu Drift—Atari ST mit ECB– und IBM–PC–Bussystem", C T, No. 7, pp. 138–145, Jul., 1987 (German Language).

*Primary Examiner*—Arthur G. Evans

[57] ABSTRACT

Electronic apparatus, e.g., a printer, can transfer data or information to a releaseably connected accessory control device, e.g., a removable cartridge, installed in an input connector of the electronic apparatus wherein the accessory control device has no existing or designed input data line or data bus connect through which to receive data. The transferred data can then be processed by a microprocessor in the accessory control device. The data to be transferred to the accessory control device is accomplished as part of the address signal utilizing the lower 8 bits of the address signal provided as output on an address signal line (CAB). The data corresponding to the address specified by this address is read from a ROM (617) and thereafter held in latches (651, 652), and the holding of the read data is announced by a signal, EWRDY. When cartridge microprocessor reads the data held in latches (651, 652) via an internal data bus (DB29), the transfer of data from the electronic apparatus is complete. This arrangement makes it possible to transfer data to an accessory control device, which has no existing or designed data bus and is adapted as a read only device by the electronic apparatus, so that data can be readily processed by accessory control device microprocessor and either returned to the electronic processor, such as, for printing in the case of a printer, or held at the accessory control device for utilitarian purposes, e.g., display of data.

36 Claims, 28 Drawing Sheets

FOREIGN PATENT DOCUMENTS

| | | |
|---|---|---|
| 75991 | 4/1987 | Japan. |
| 111776 | 5/1987 | Japan. |
| 299892 | 12/1987 | Japan. |
| 41163 | 2/1988 | Japan. |
| 255750 | 10/1988 | Japan. |
| 250788 | 10/1988 | Japan. |
| 7281 | 1/1989 | Japan. |
| 159274 | 6/1989 | Japan. |
| 58789 | 2/1990 | Japan. |
| 37590 | 2/1990 | Japan. |
| 64728 | 3/1990 | Japan. |
| 122343 | 5/1990 | Japan. |
| 121023 | 5/1990 | Japan. |
| 155675 | 6/1990 | Japan. |
| 159615 | 6/1990 | Japan. |
| 244851 | 9/1990 | Japan. |
| 249022 | 10/1990 | Japan. |
| 253289 | 10/1990 | Japan. |
| 288985 | 11/1990 | Japan. |
| 301463 | 12/1990 | Japan. |
| 301890 | 12/1990 | Japan. |
| 22160 | 1/1991 | Japan. |
| 45365 | 2/1991 | Japan. |
| 51938 | 3/1991 | Japan. |
| 53635 | 3/1991 | Japan. |
| 9012359 | 10/1990 | WIPO. |

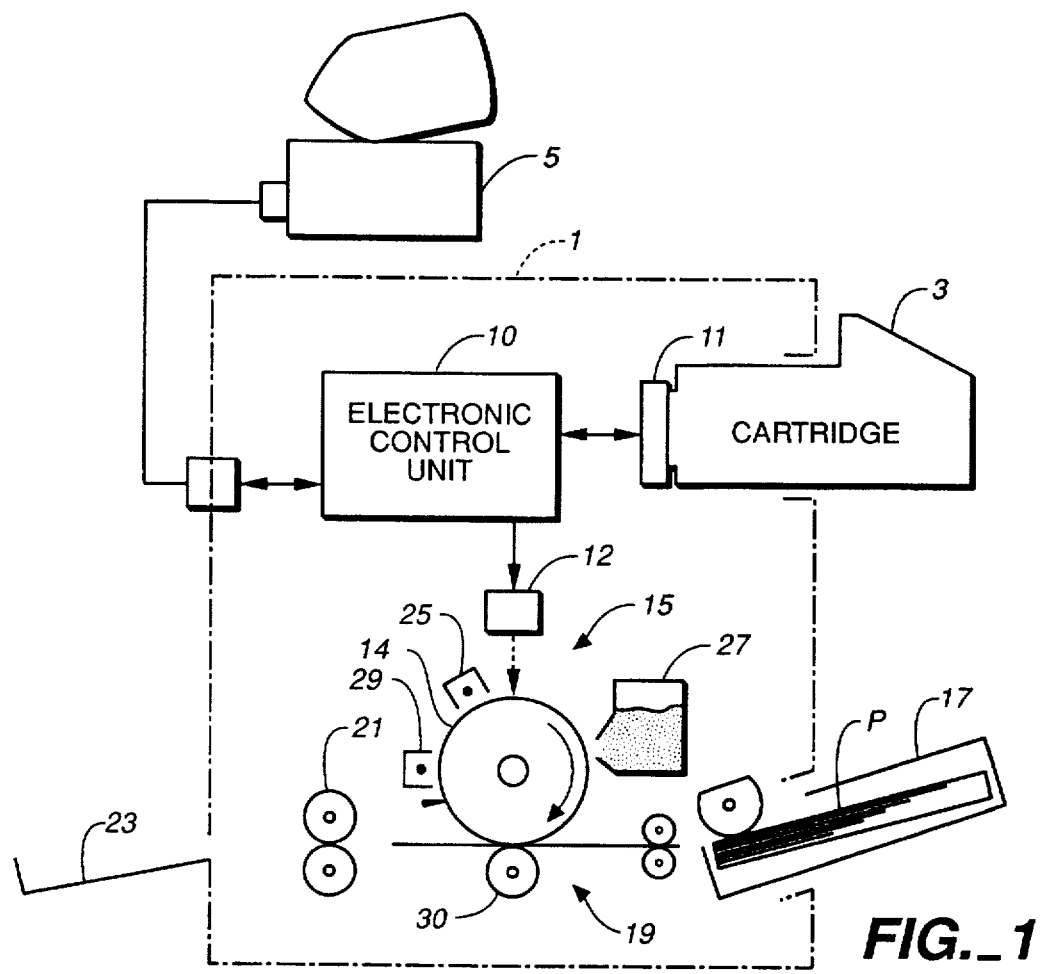
FIG._1
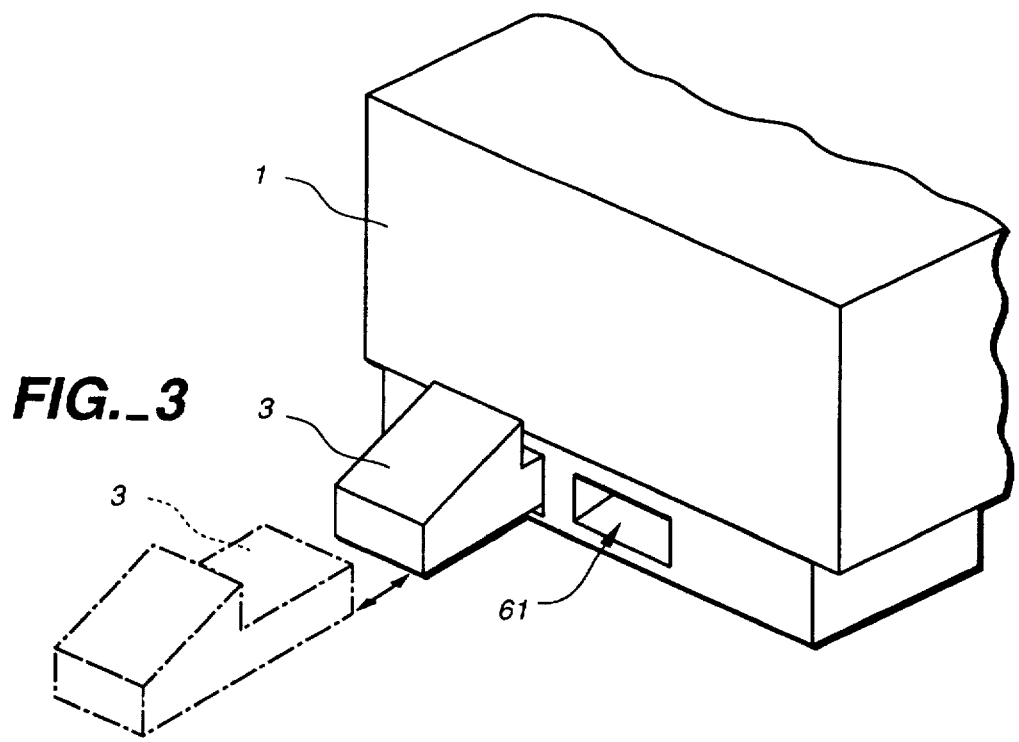
FIG._3

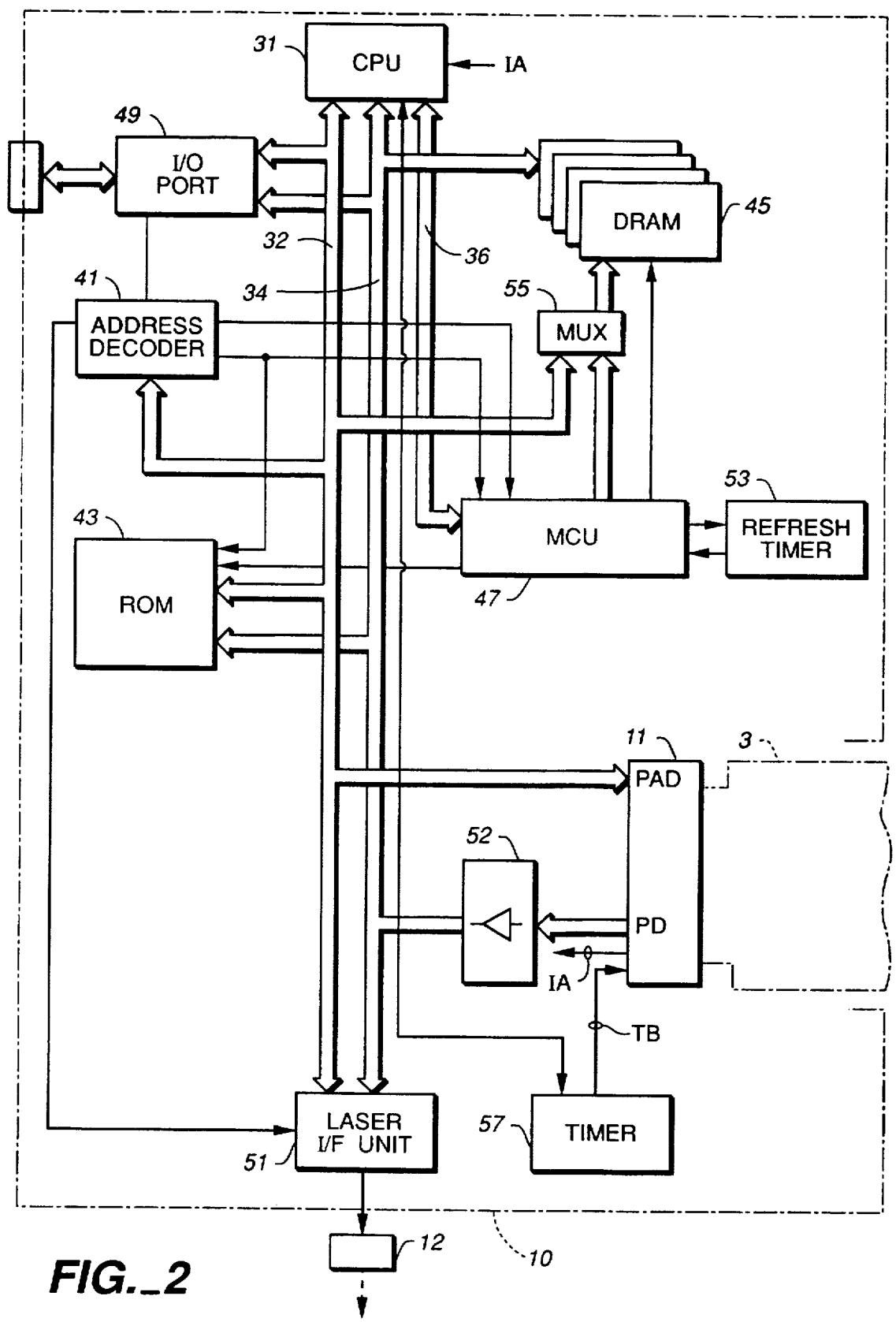
FIG._2

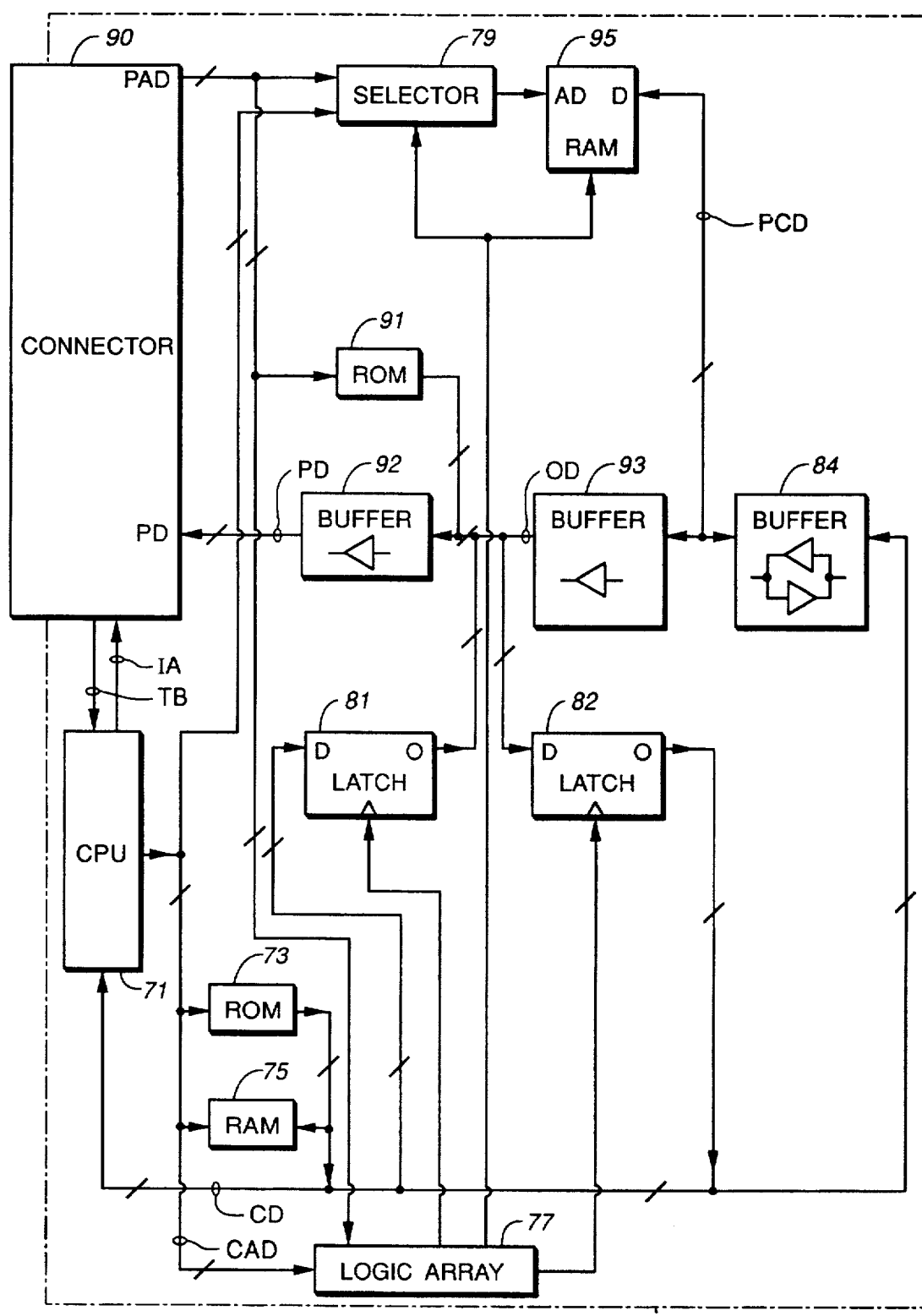
FIG._4

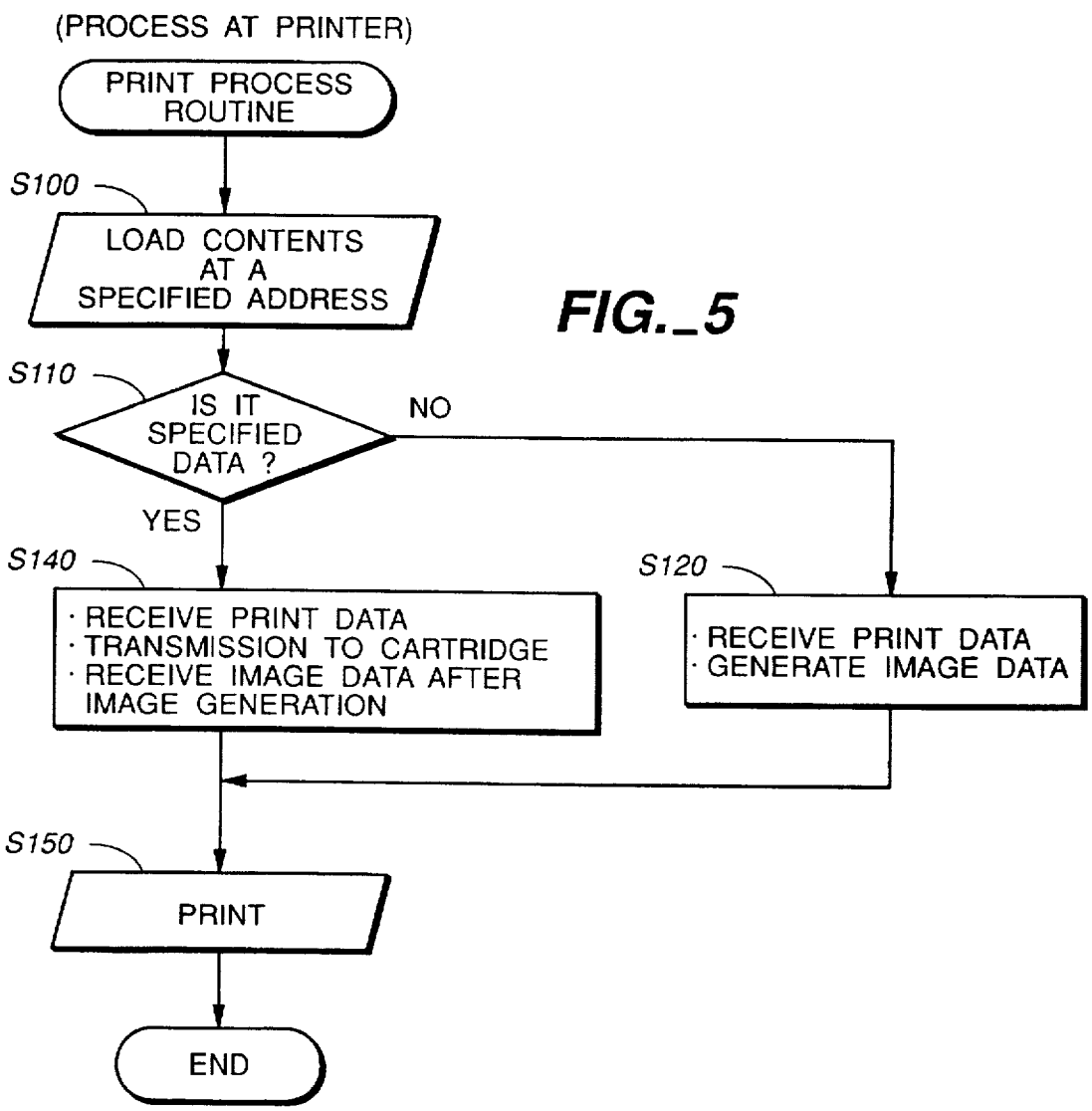
FIG._5
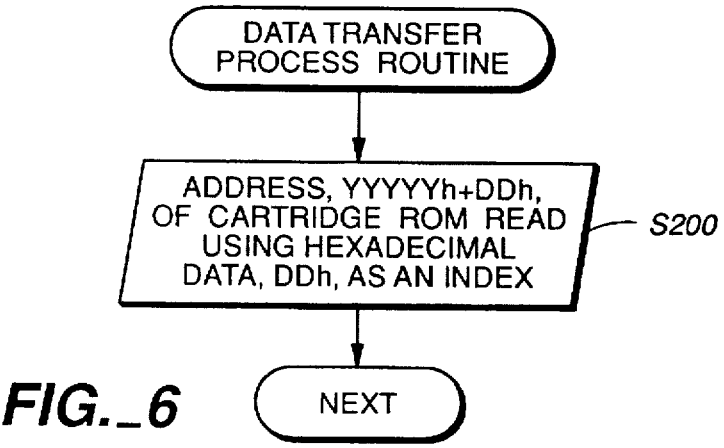
FIG._6

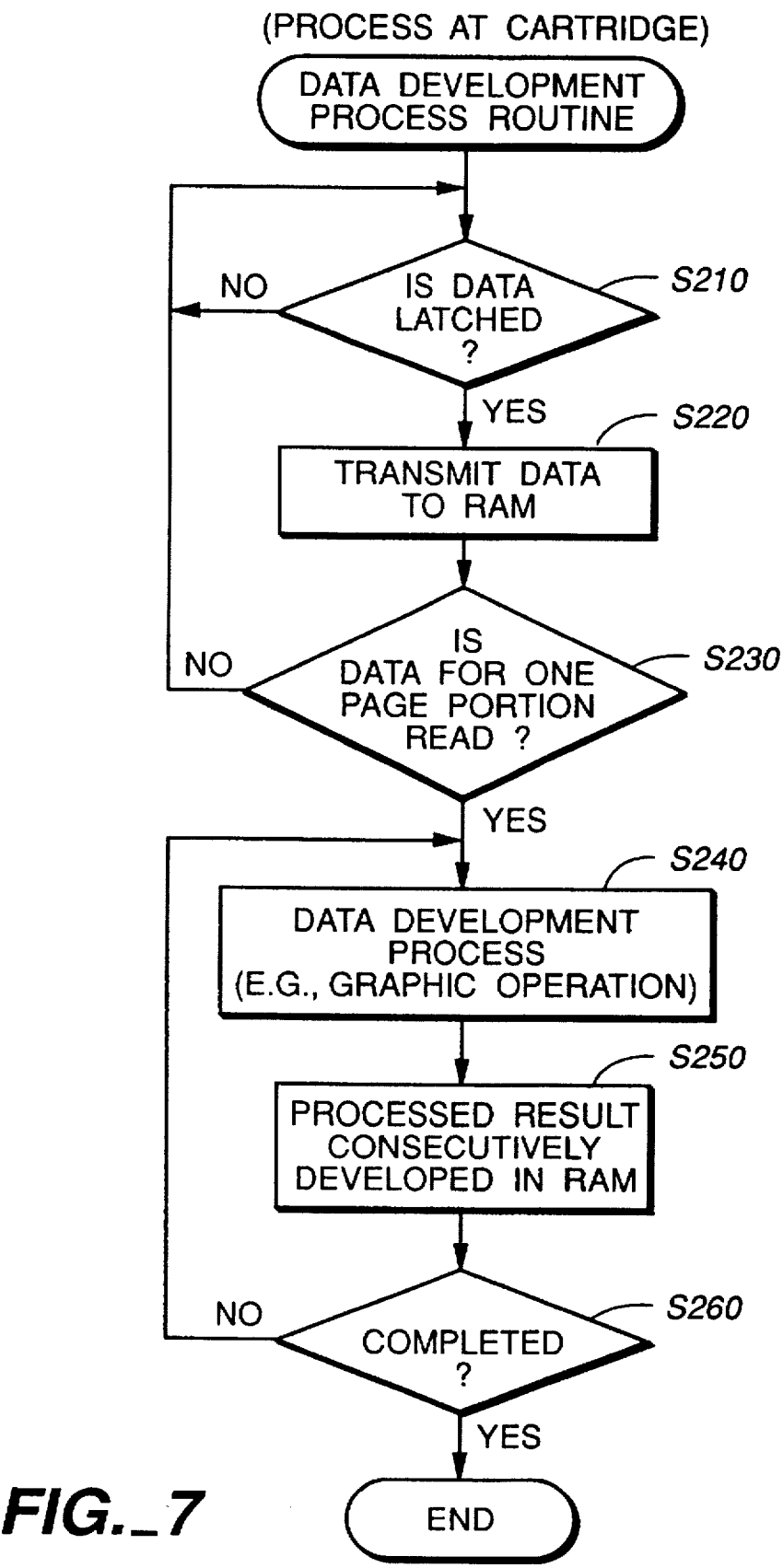
FIG._7

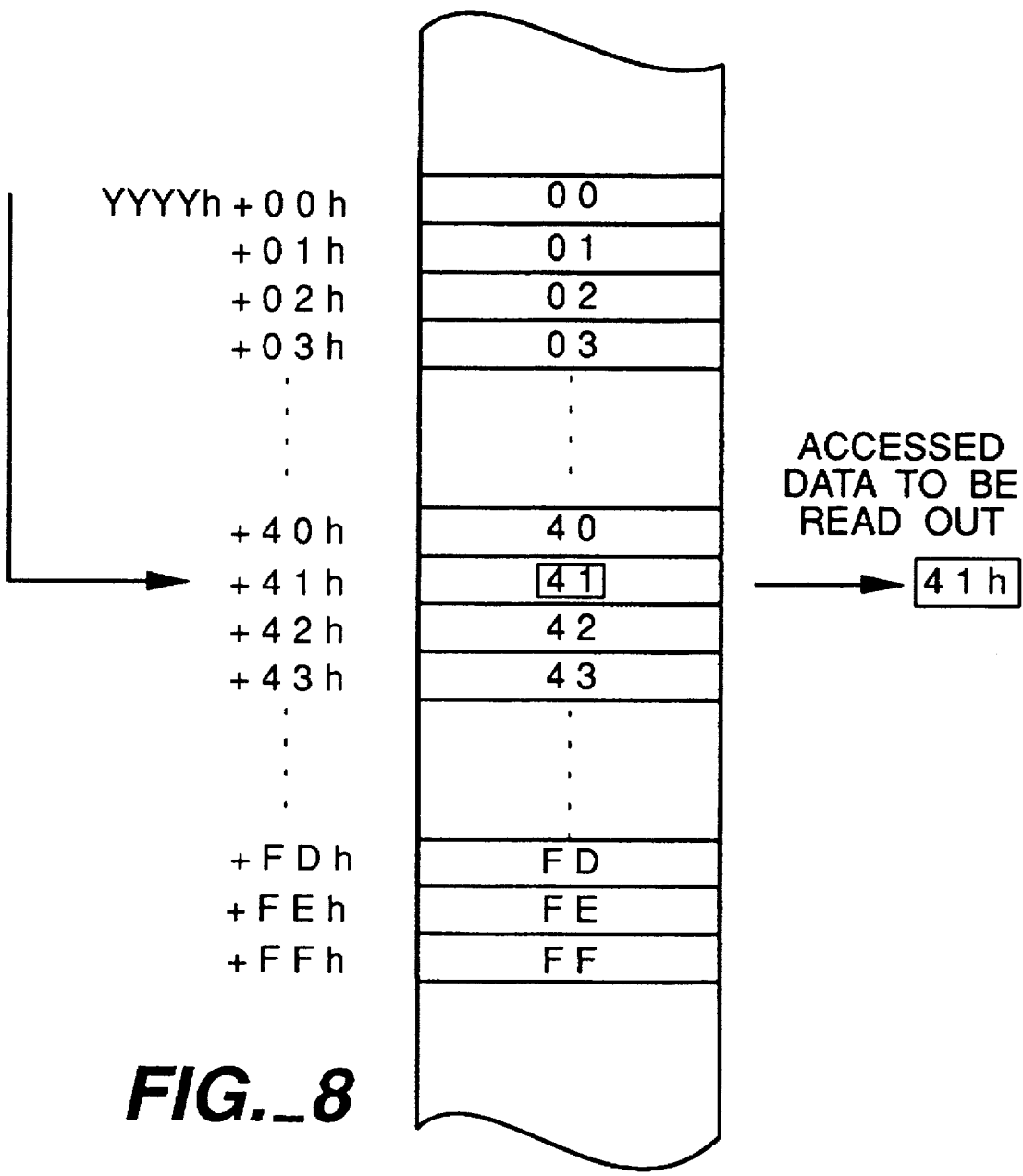
FIG._8

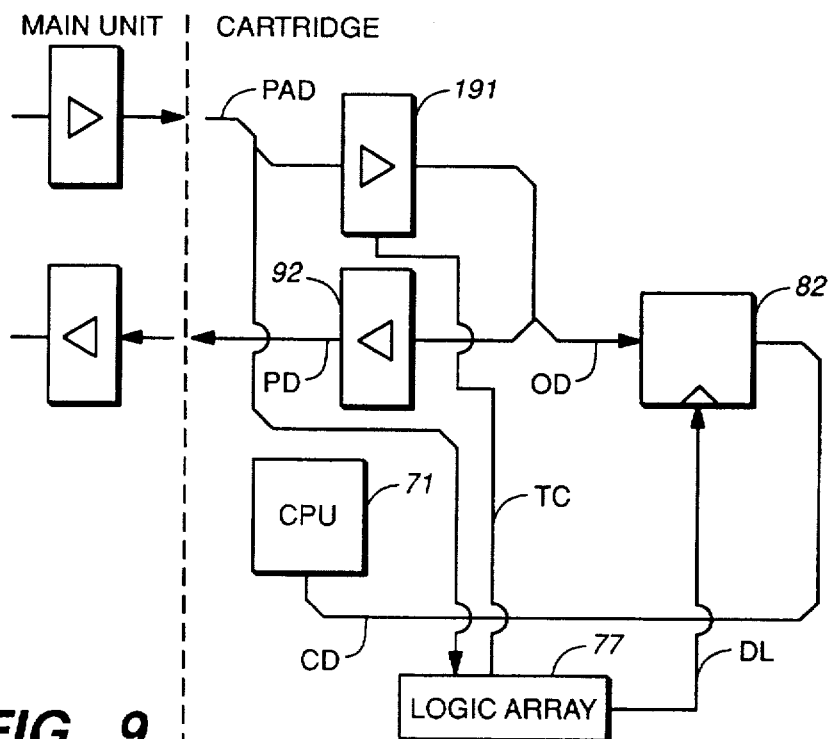
FIG._9
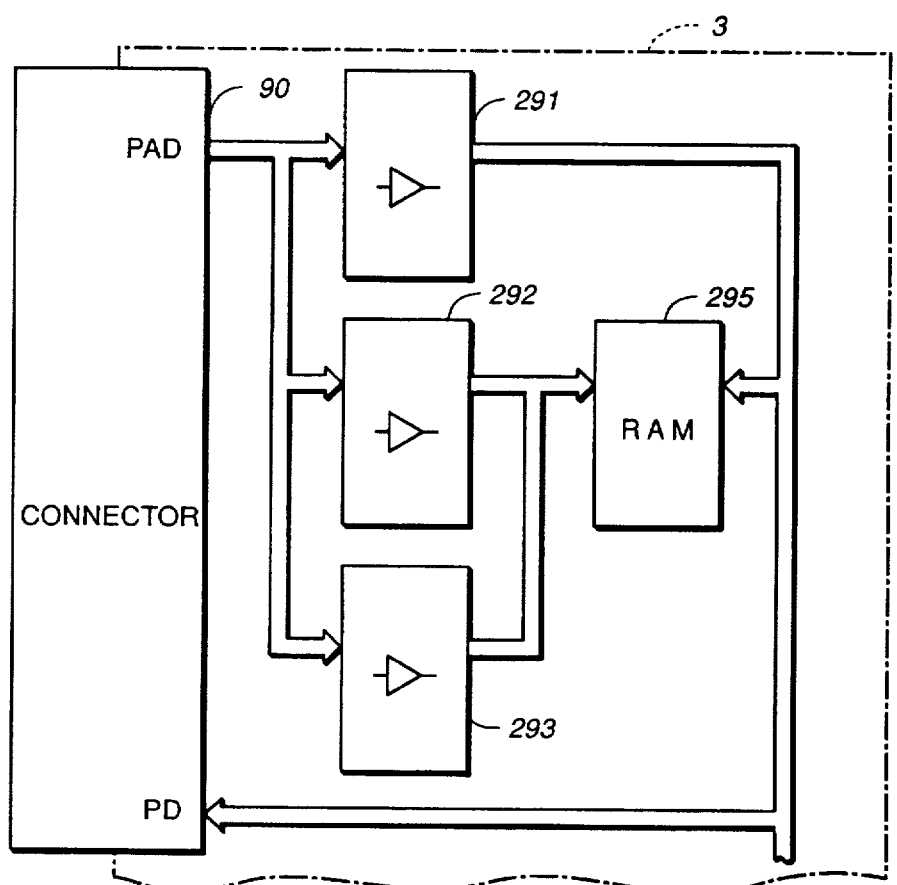
FIG._10

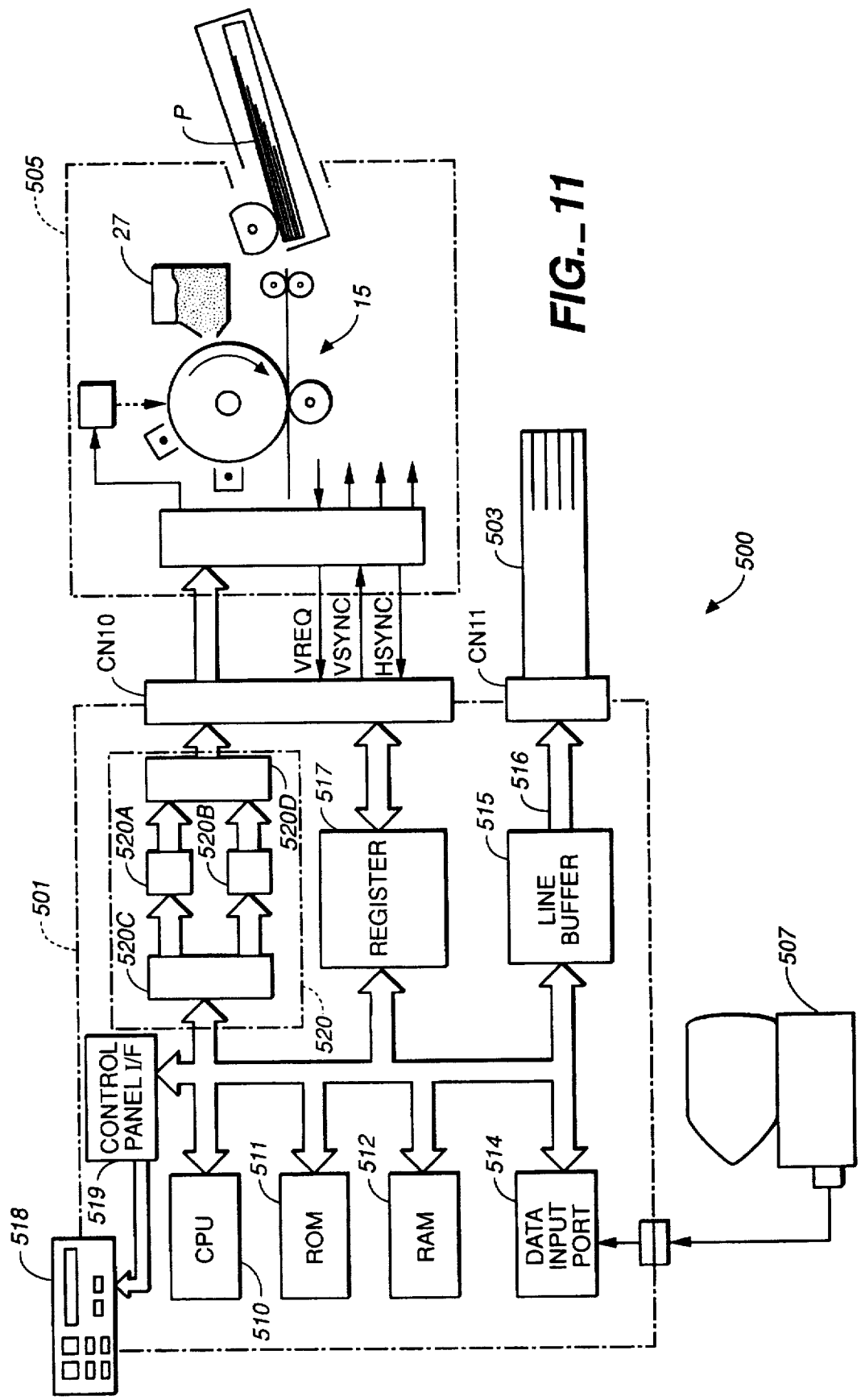
FIG._11

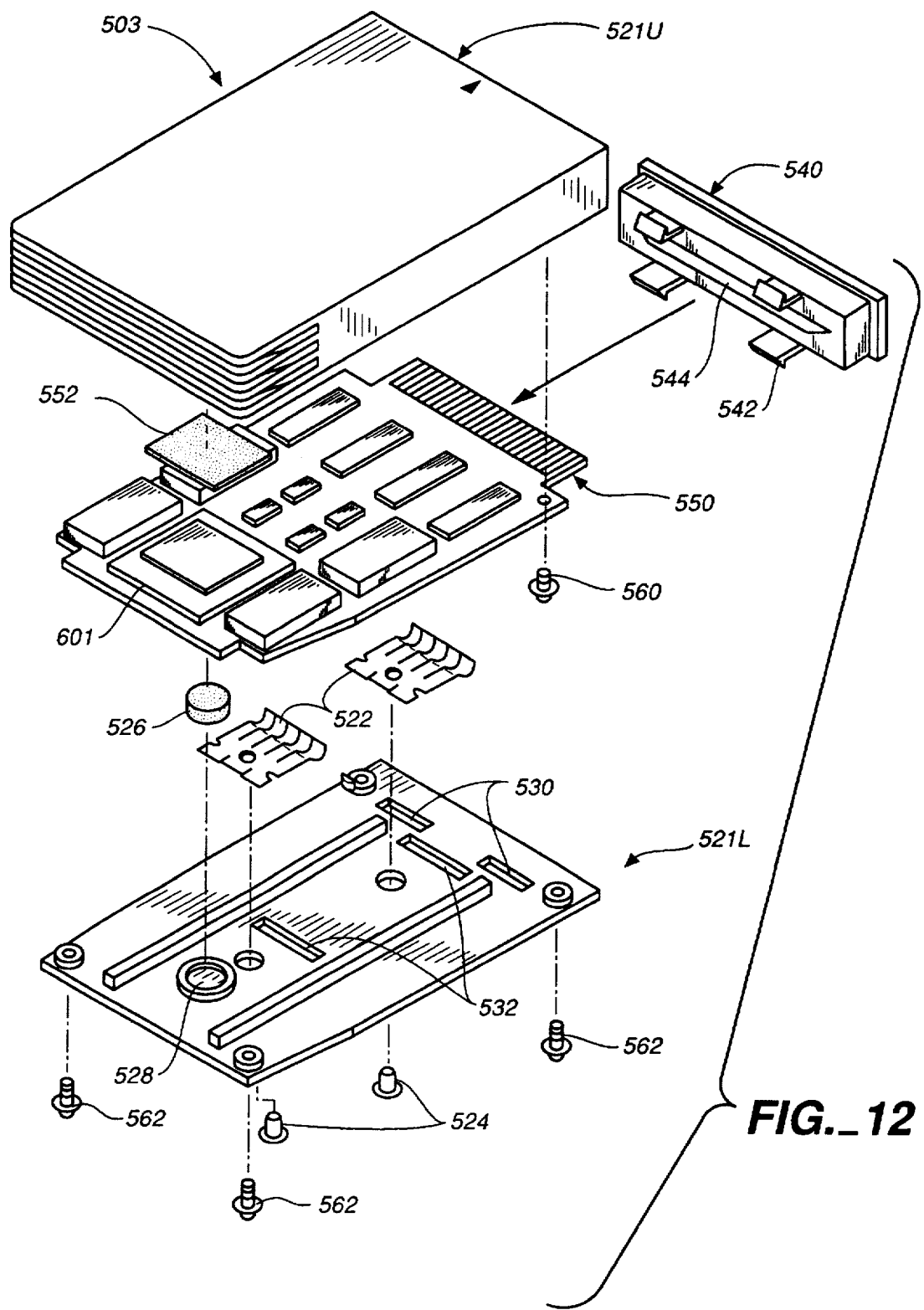
FIG._12

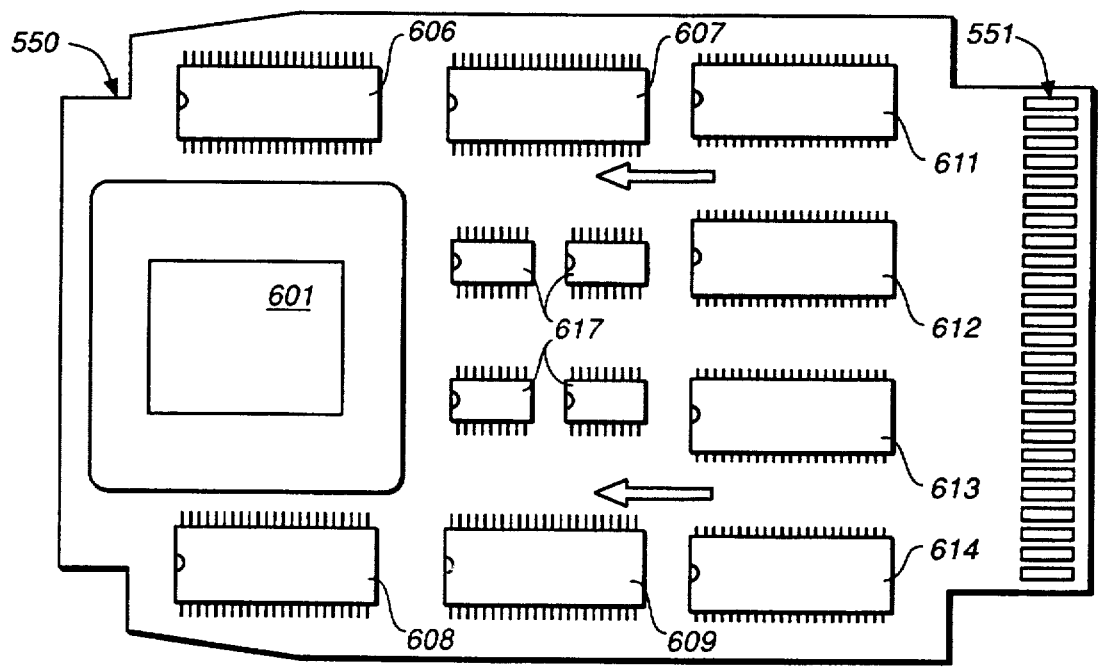
FIG._13A
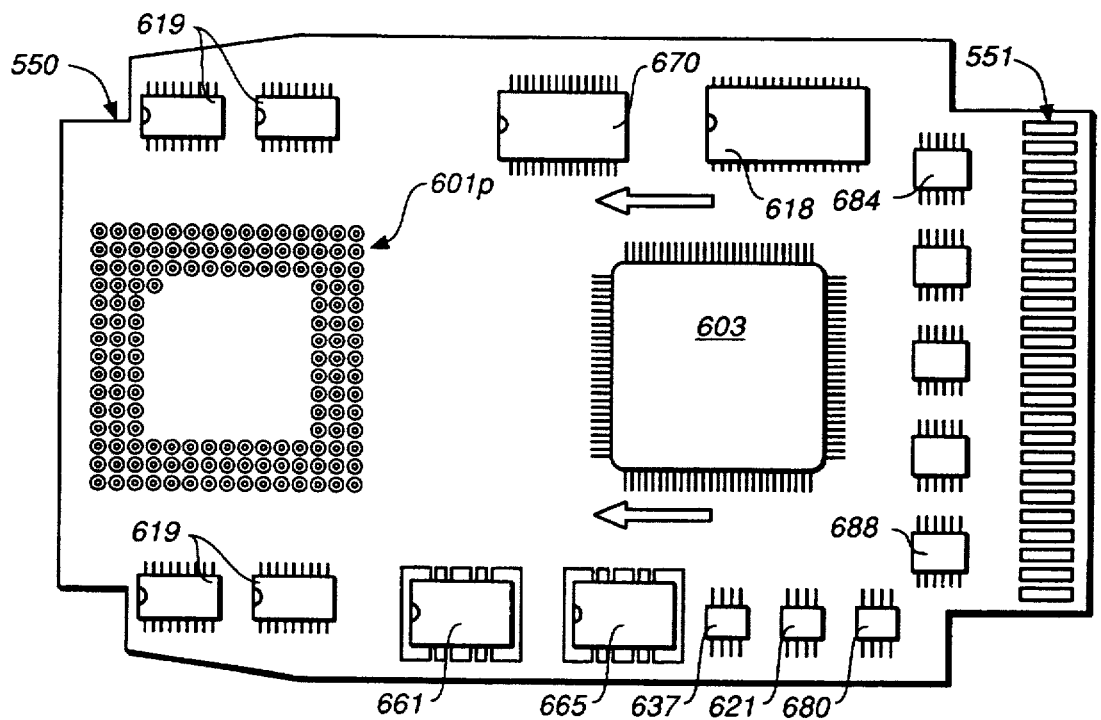
FIG._13B

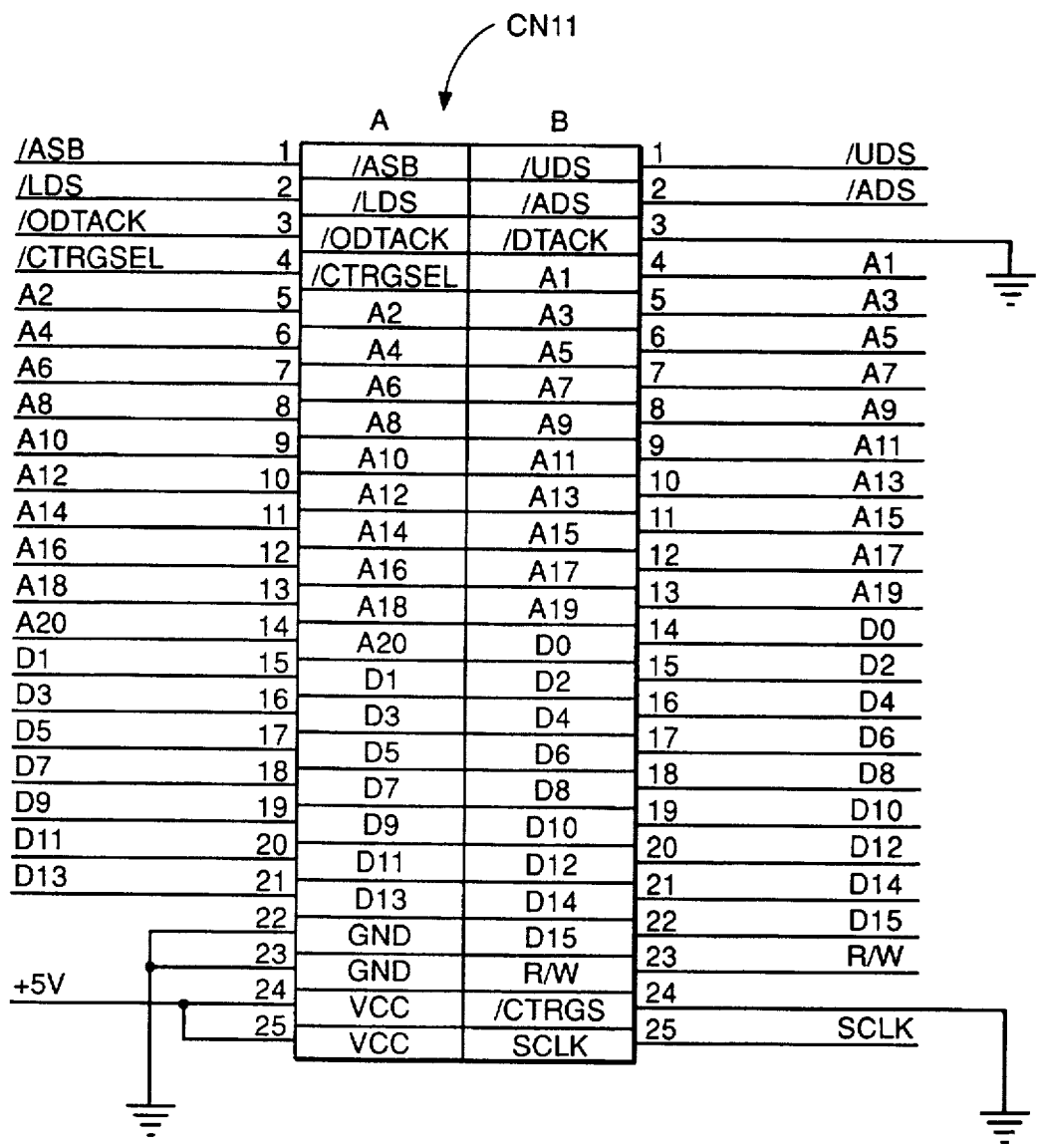
FIG._14
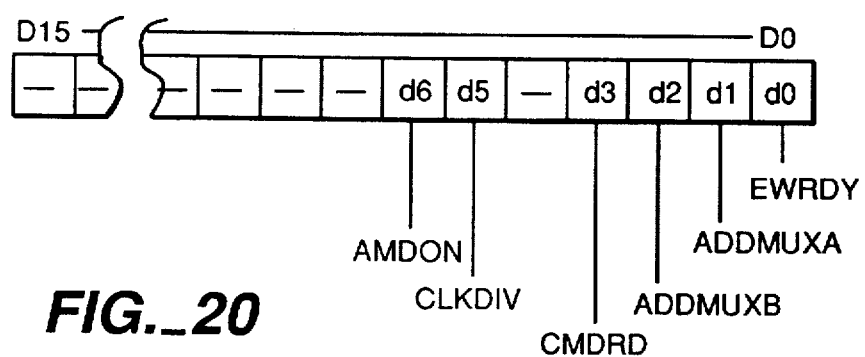
FIG._20

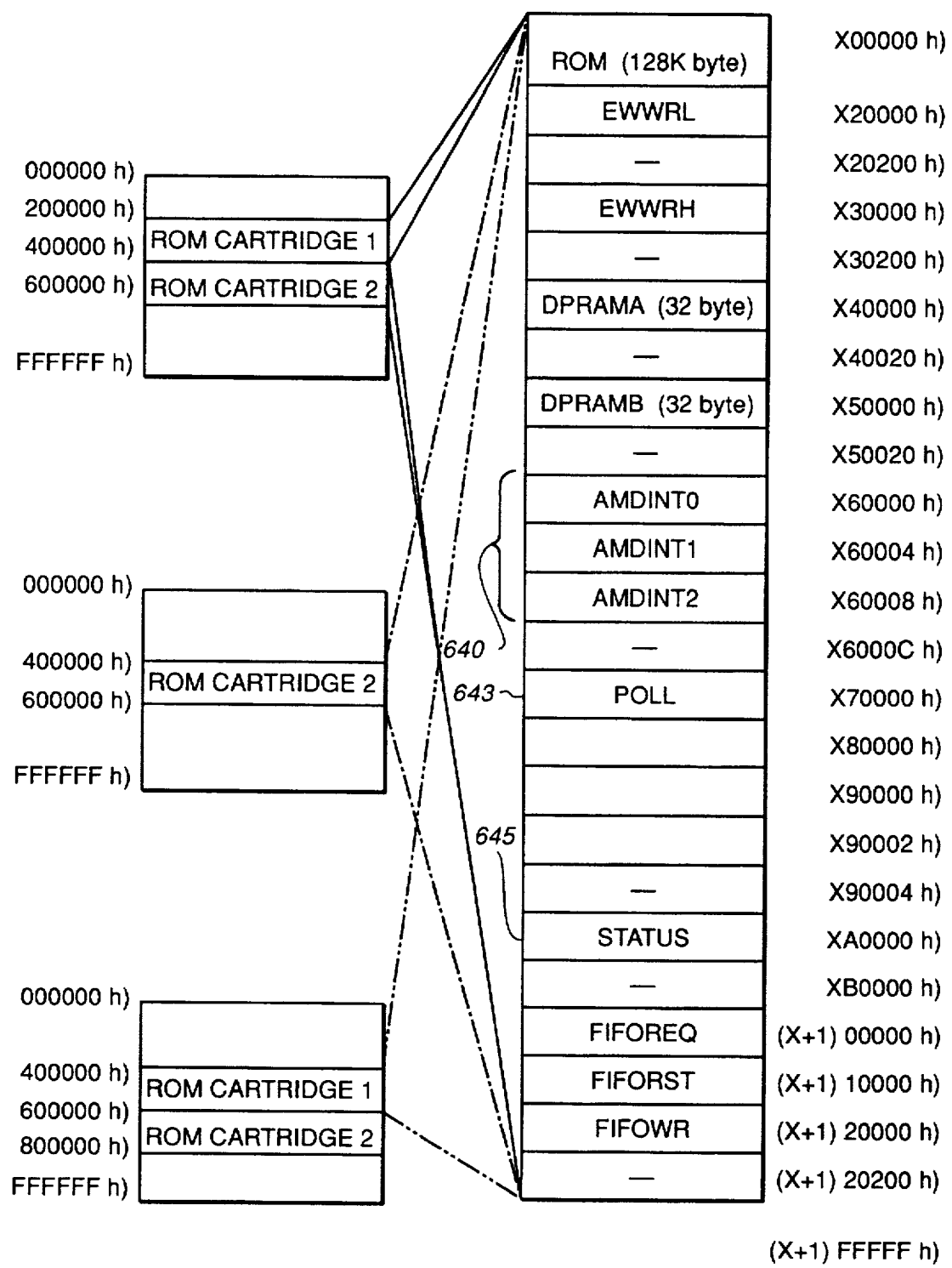
FIG._15

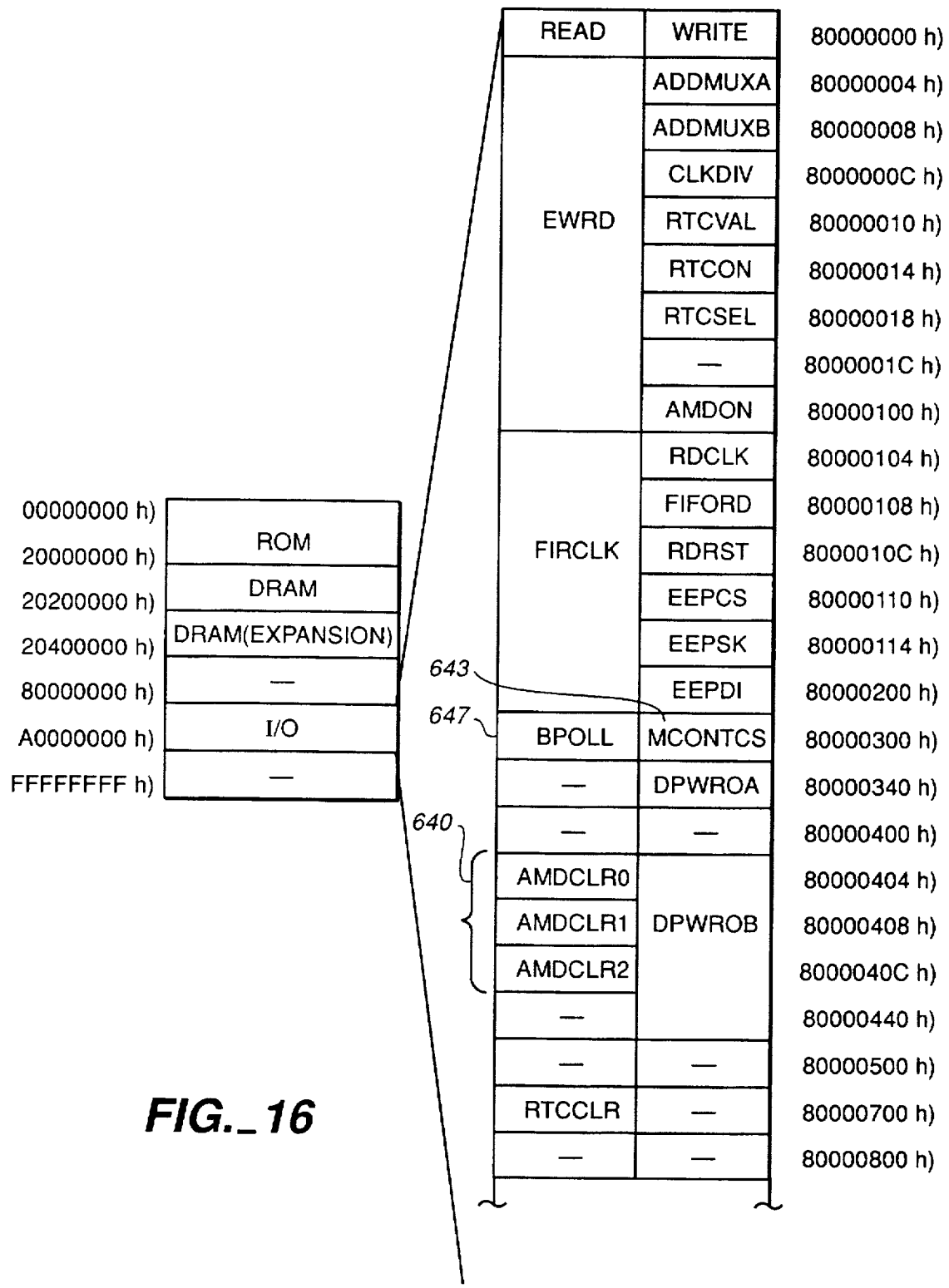
FIG._16

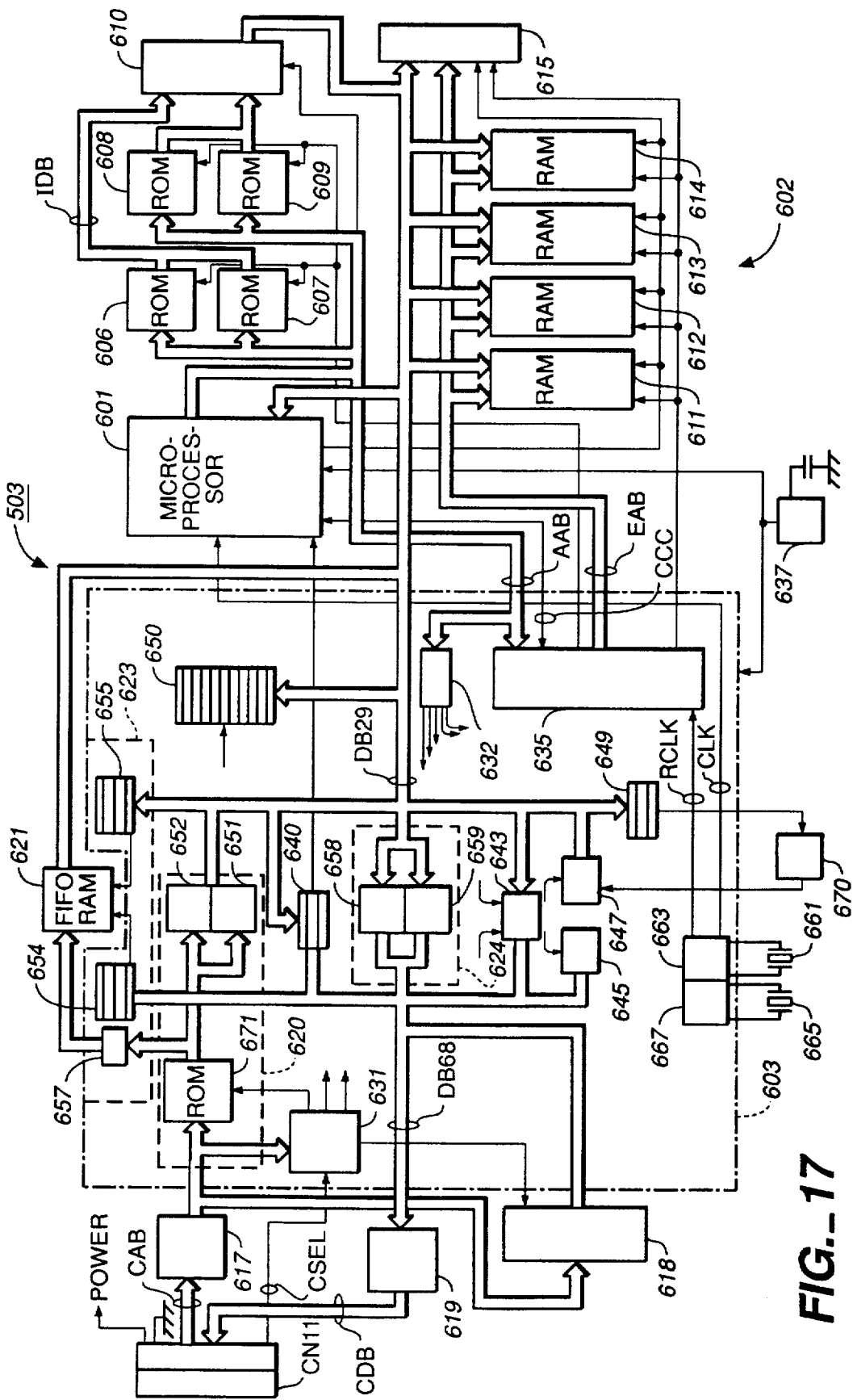
FIG._17

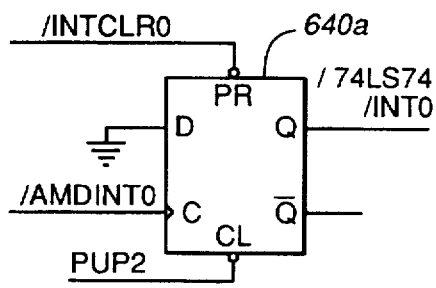
FIG._18A
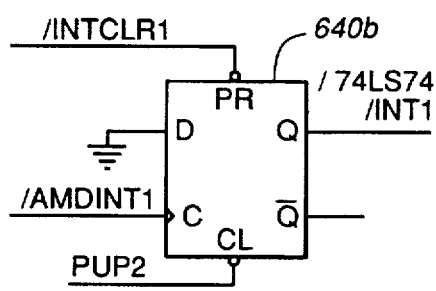
FIG._18B
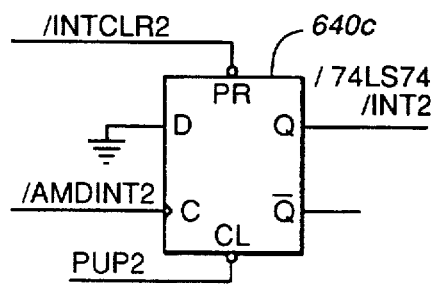
FIG._18C
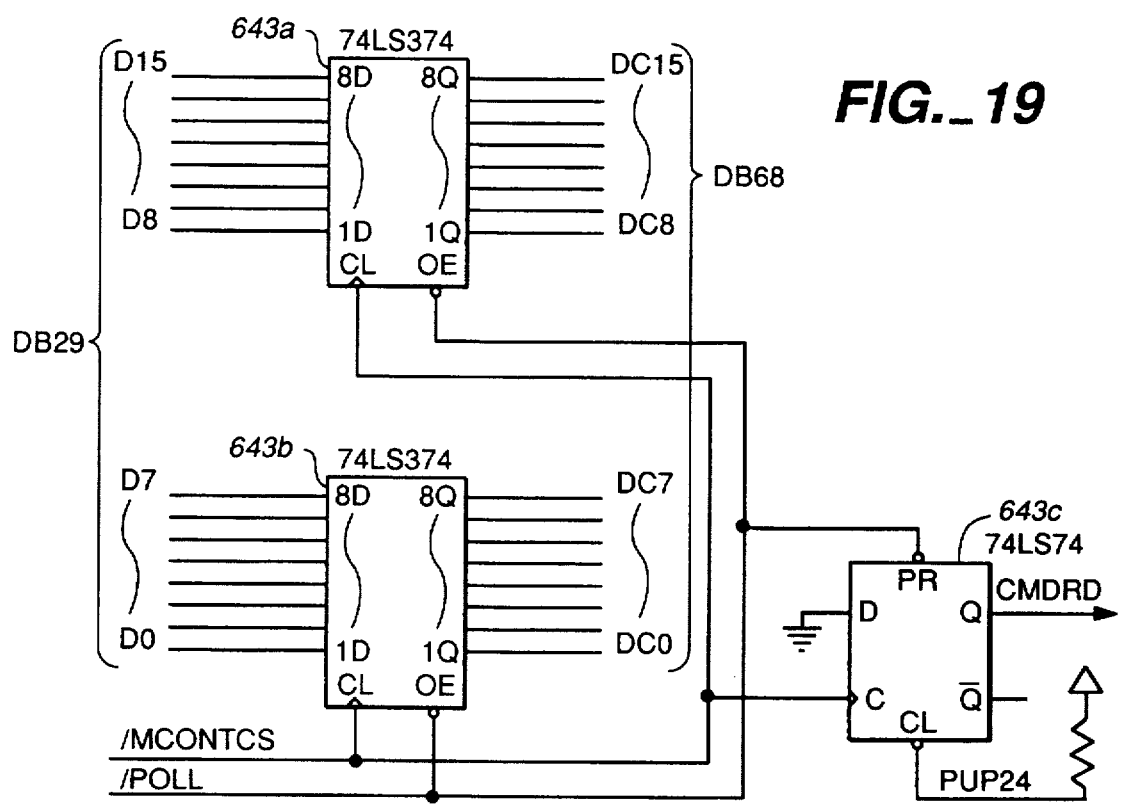
FIG._19

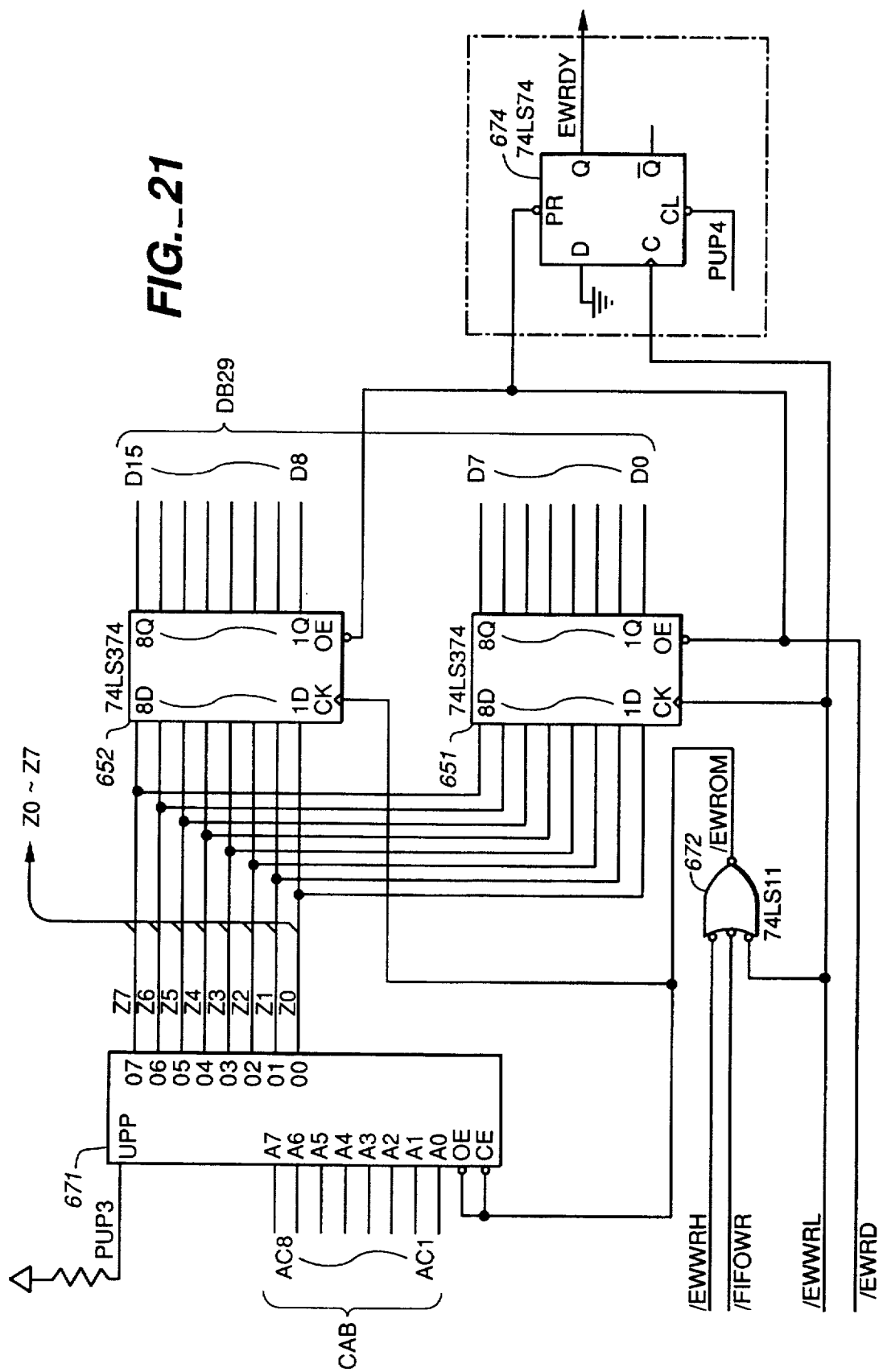
FIG._21

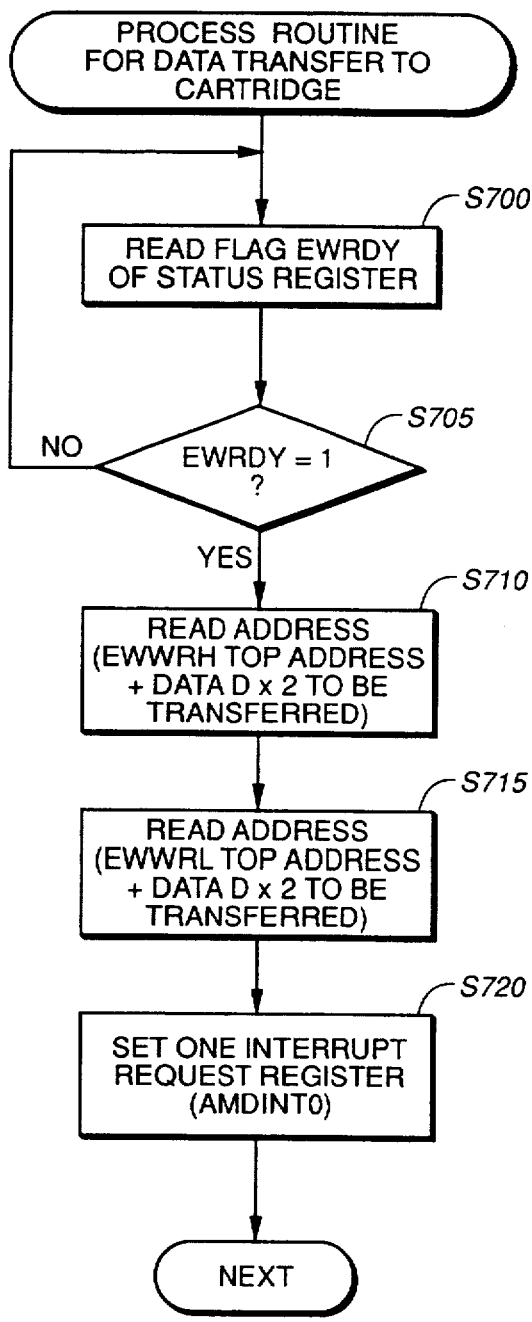
FIG._22
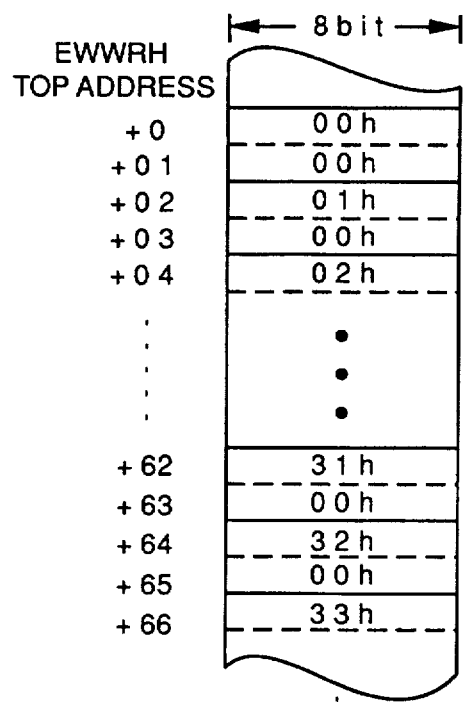
FIG._23
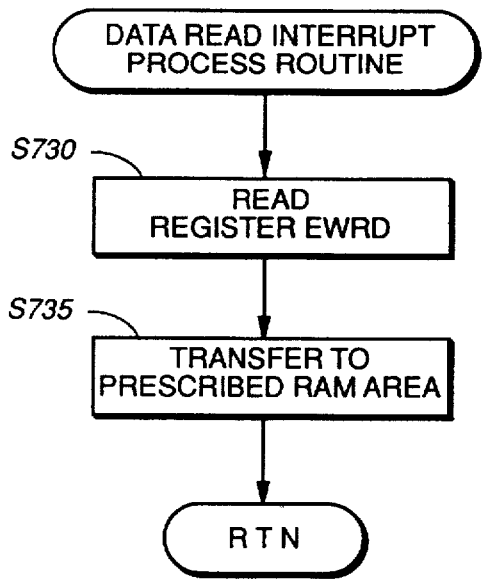
FIG._24

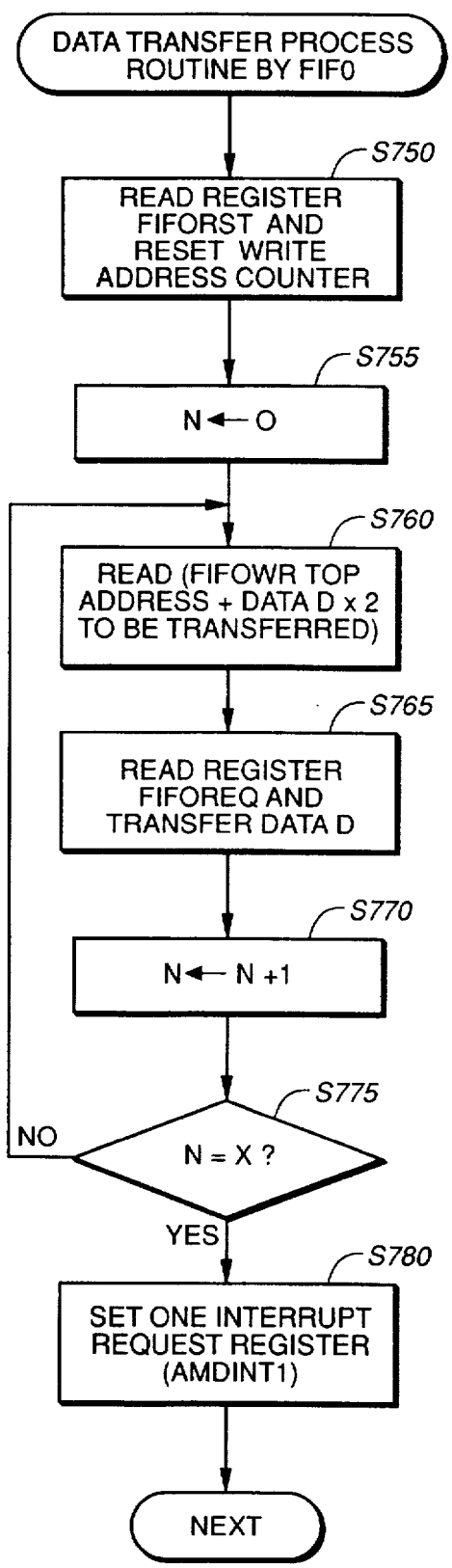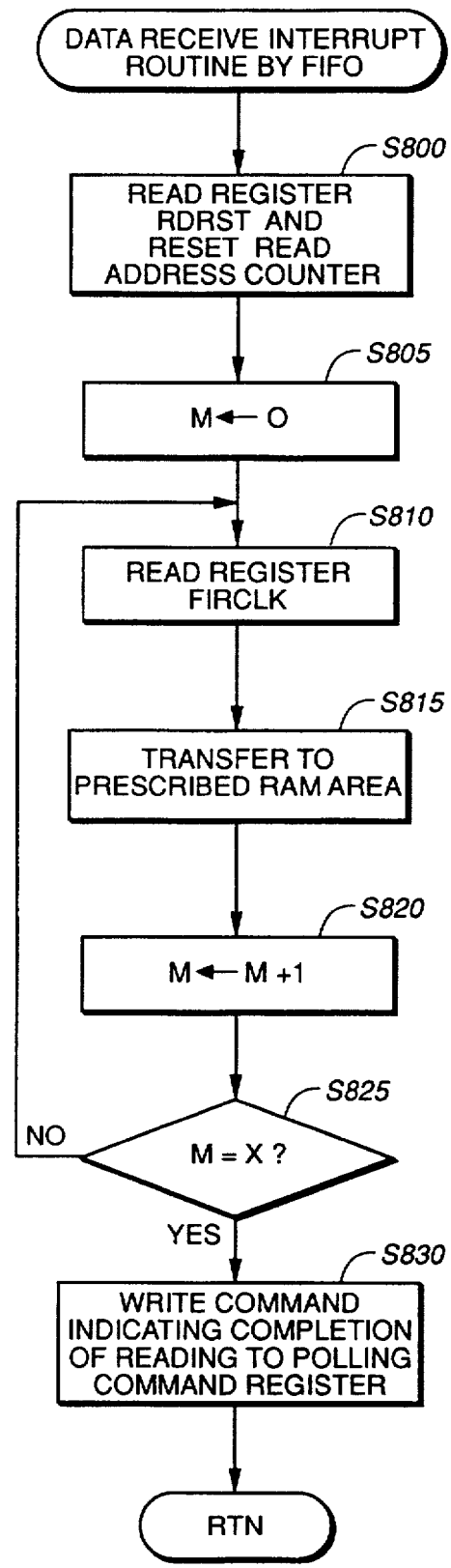
*FIG._25*      *FIG._26*

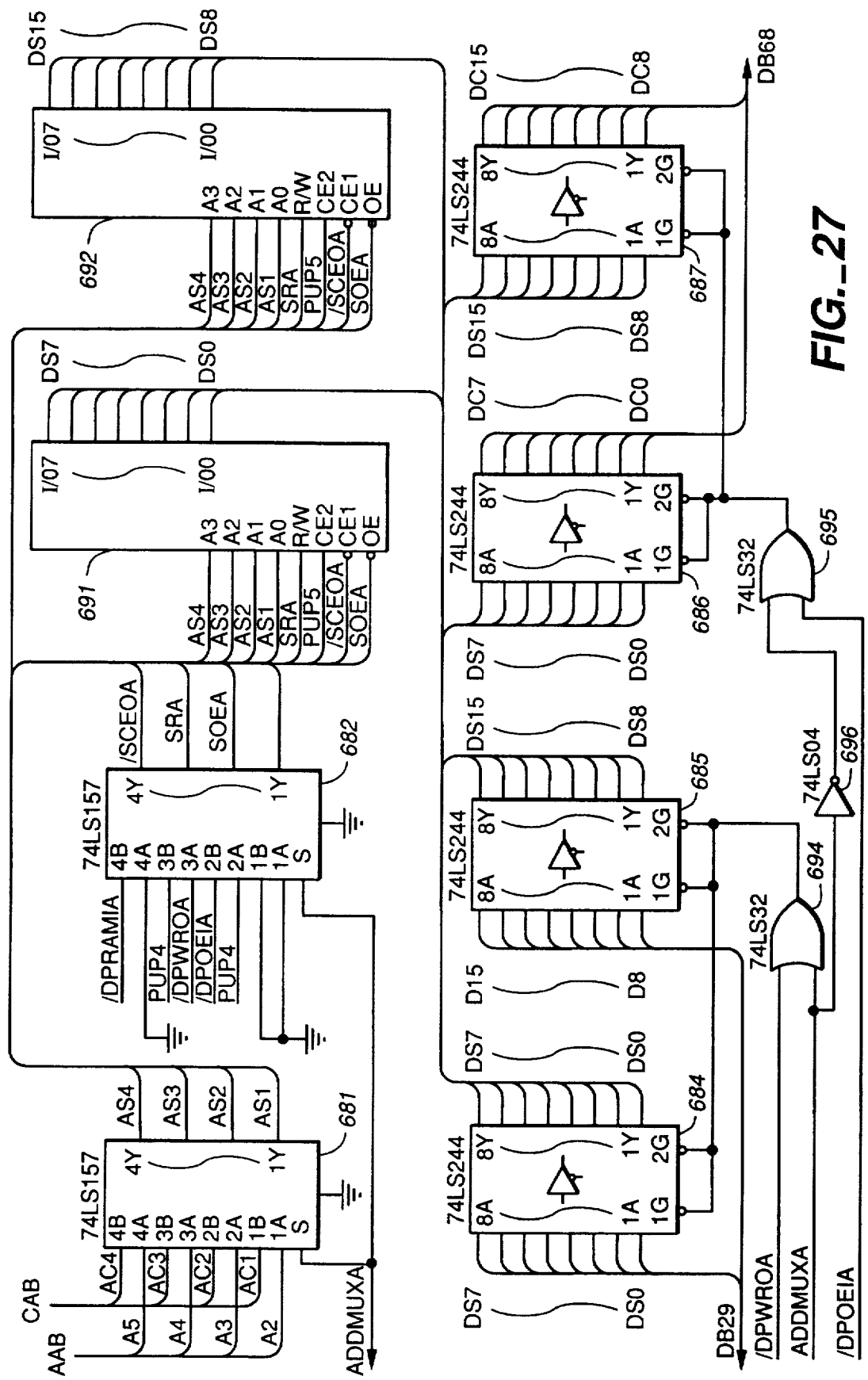
FIG._27

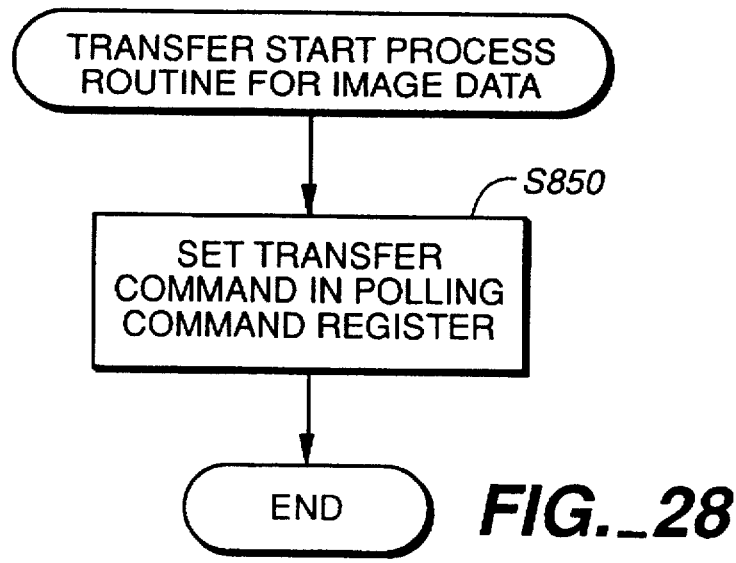
FIG._28
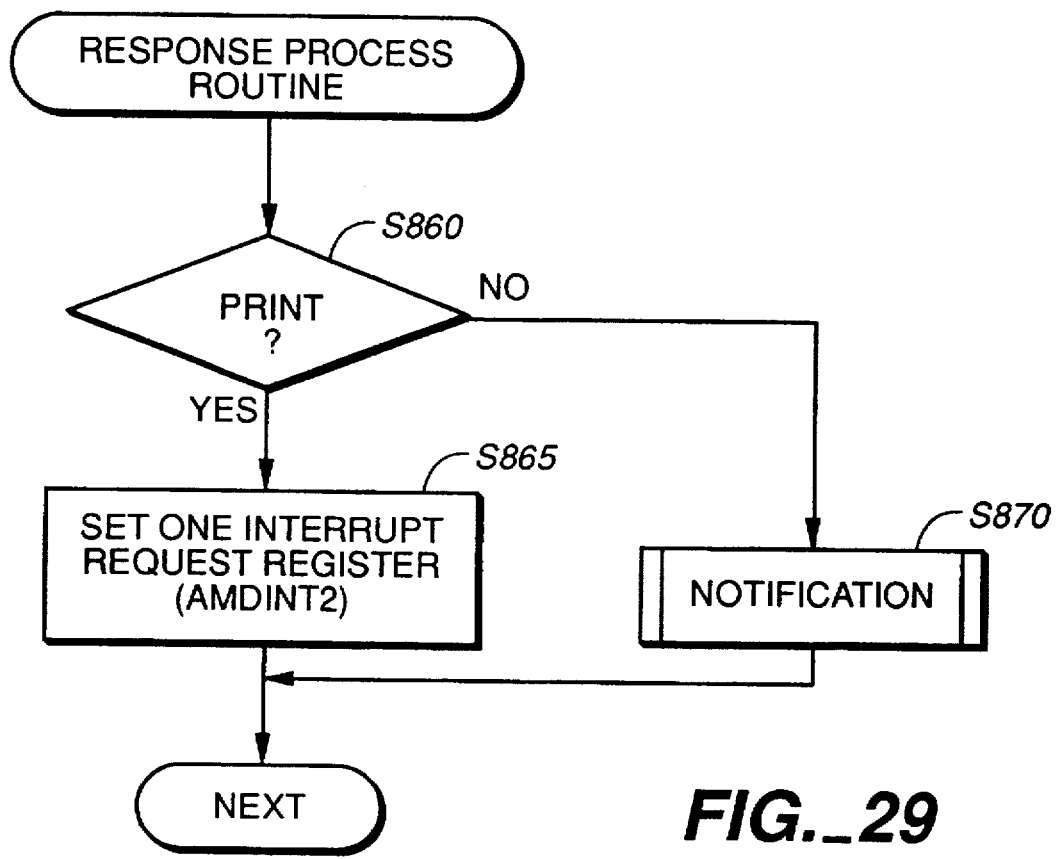
FIG._29

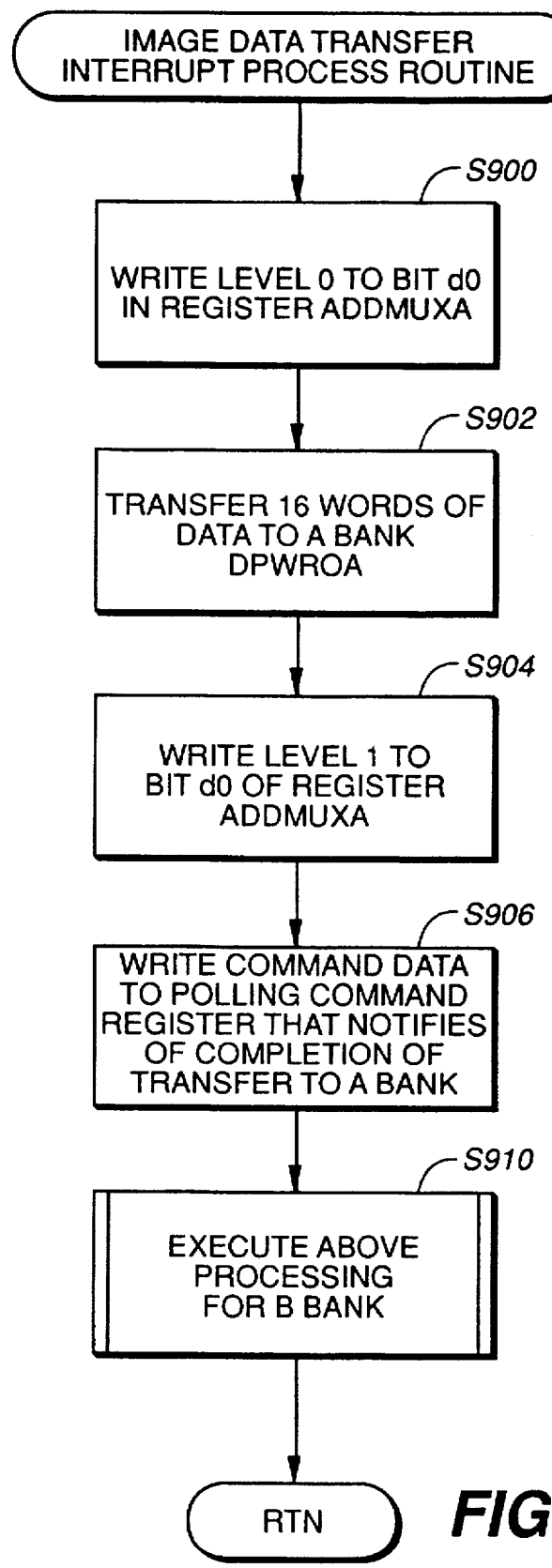
FIG._30

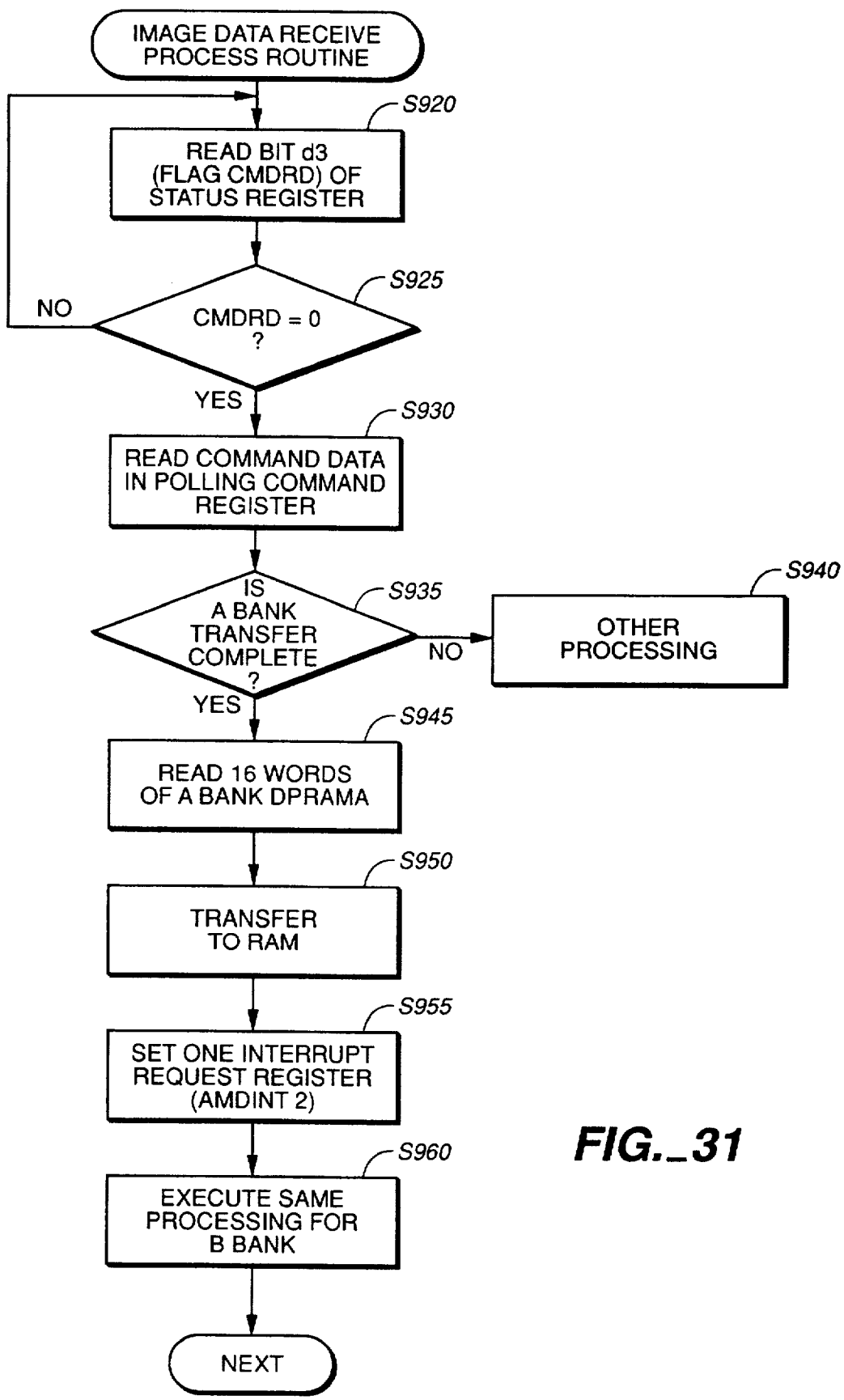
FIG._31

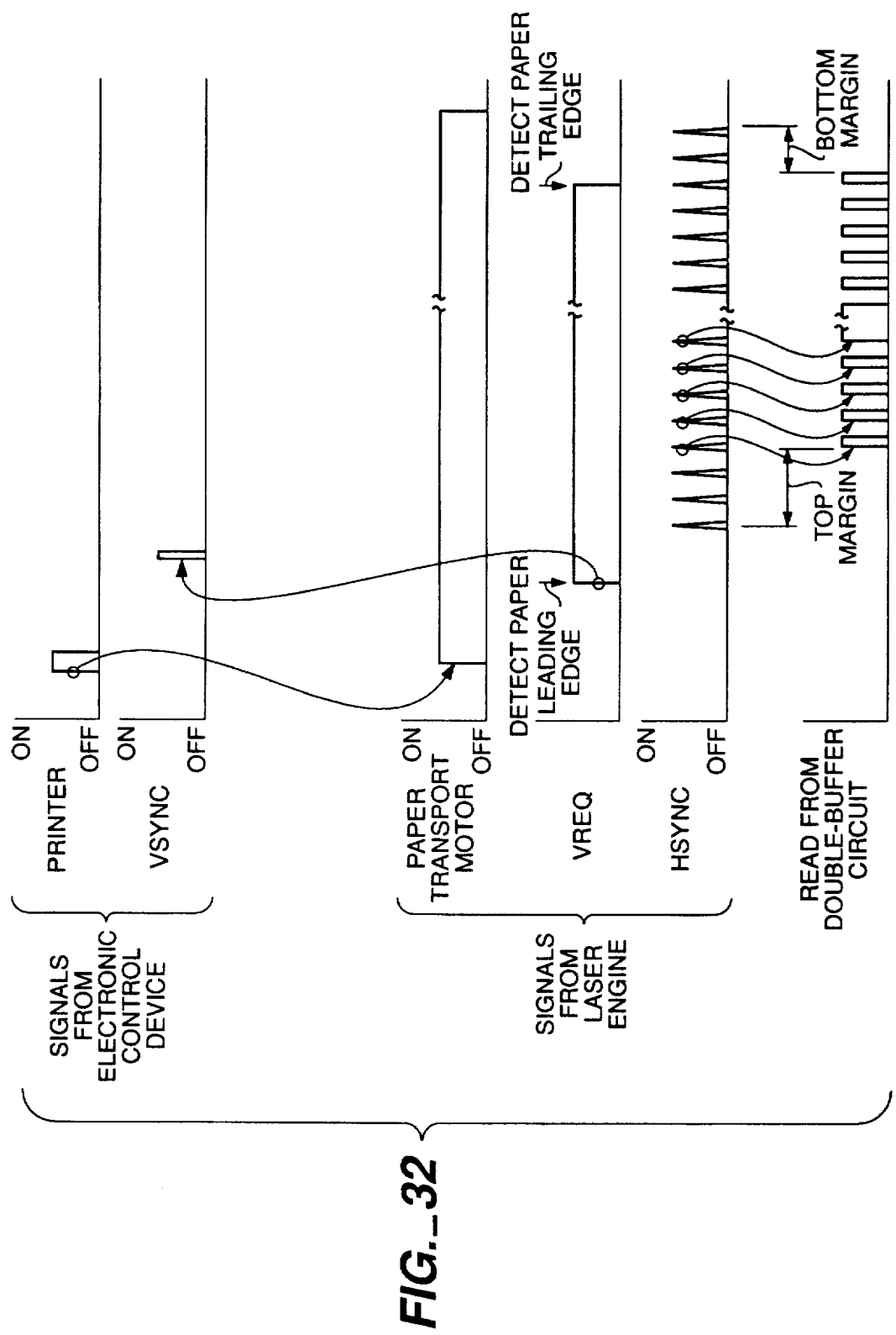
FIG.—32

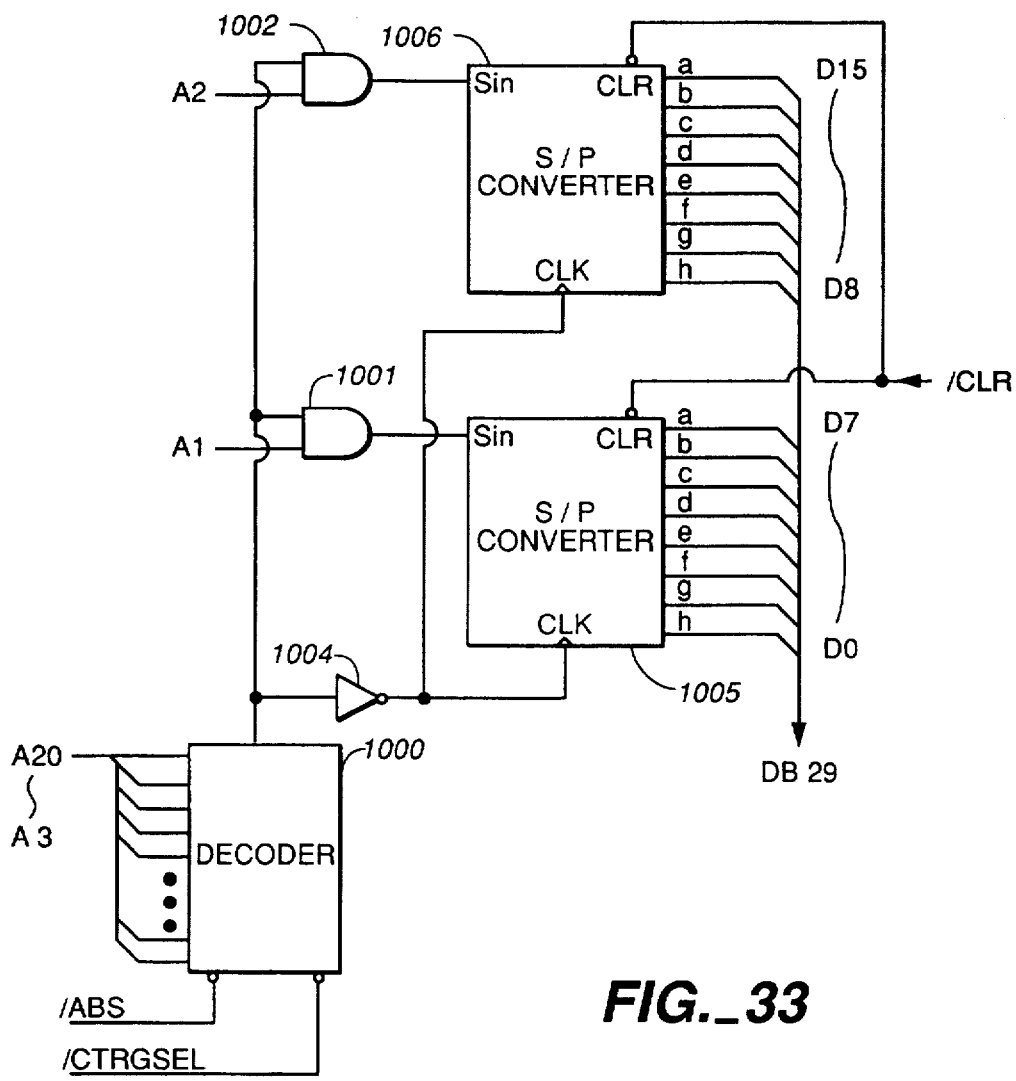
FIG._33
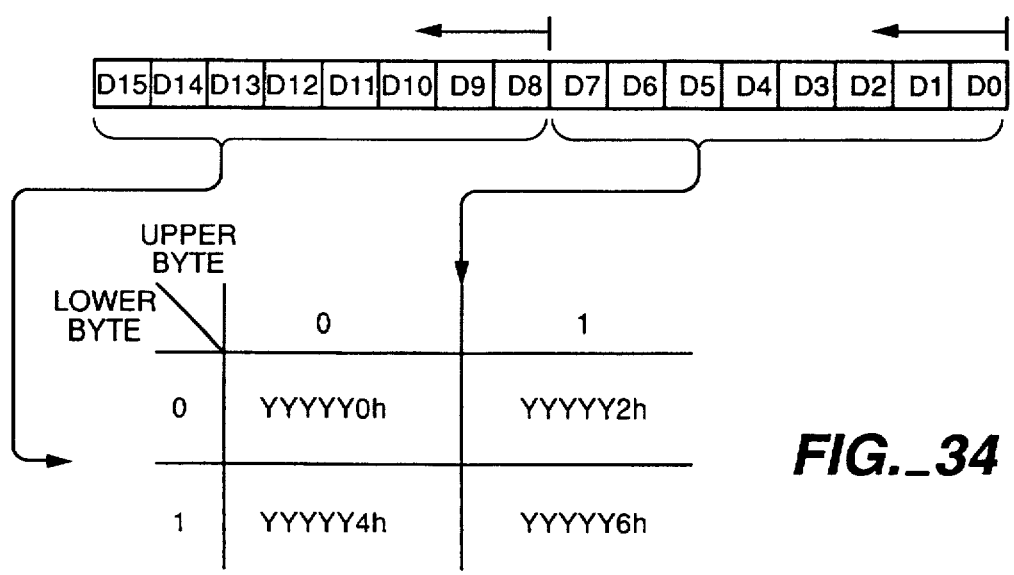
FIG._34

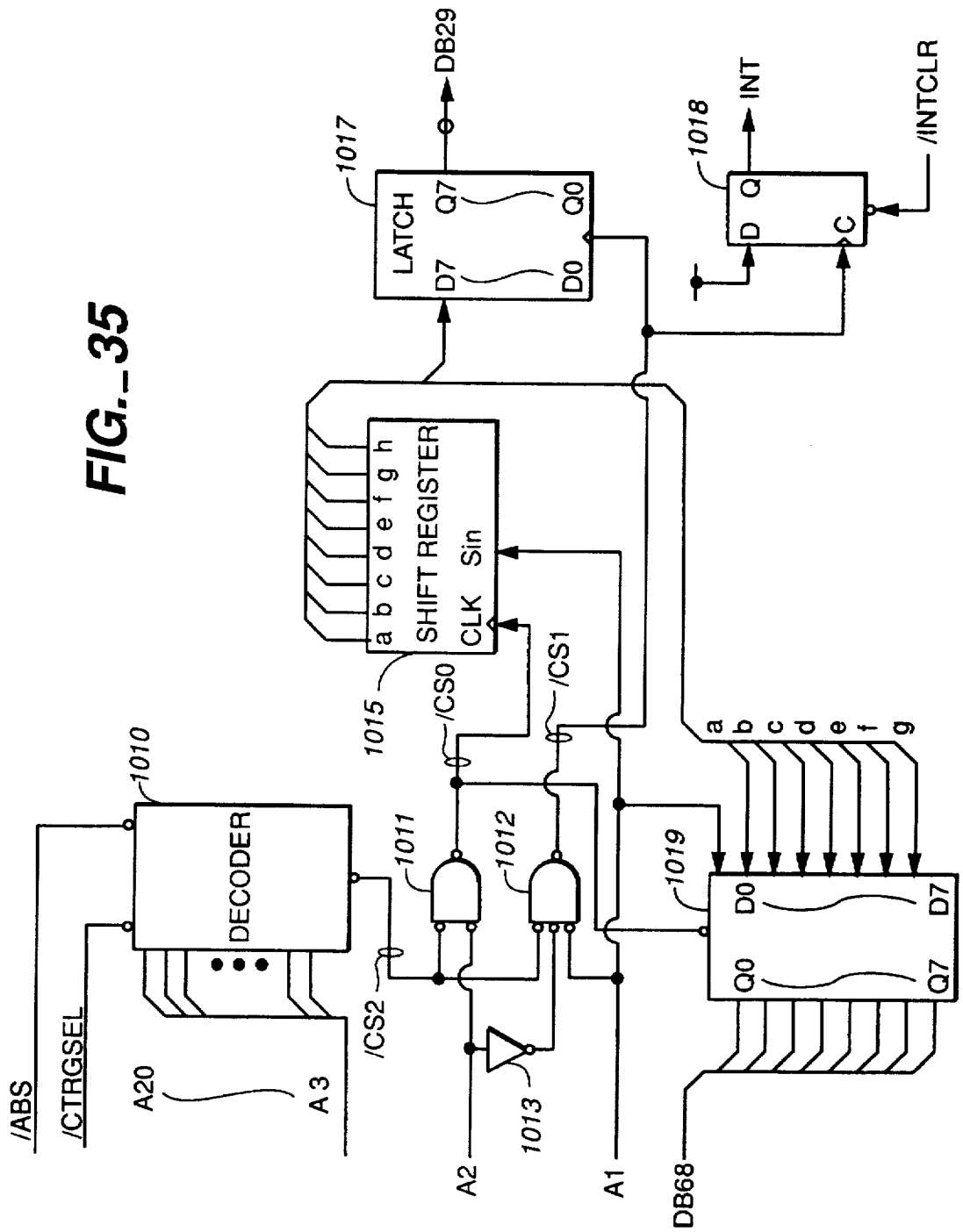
FIG._35

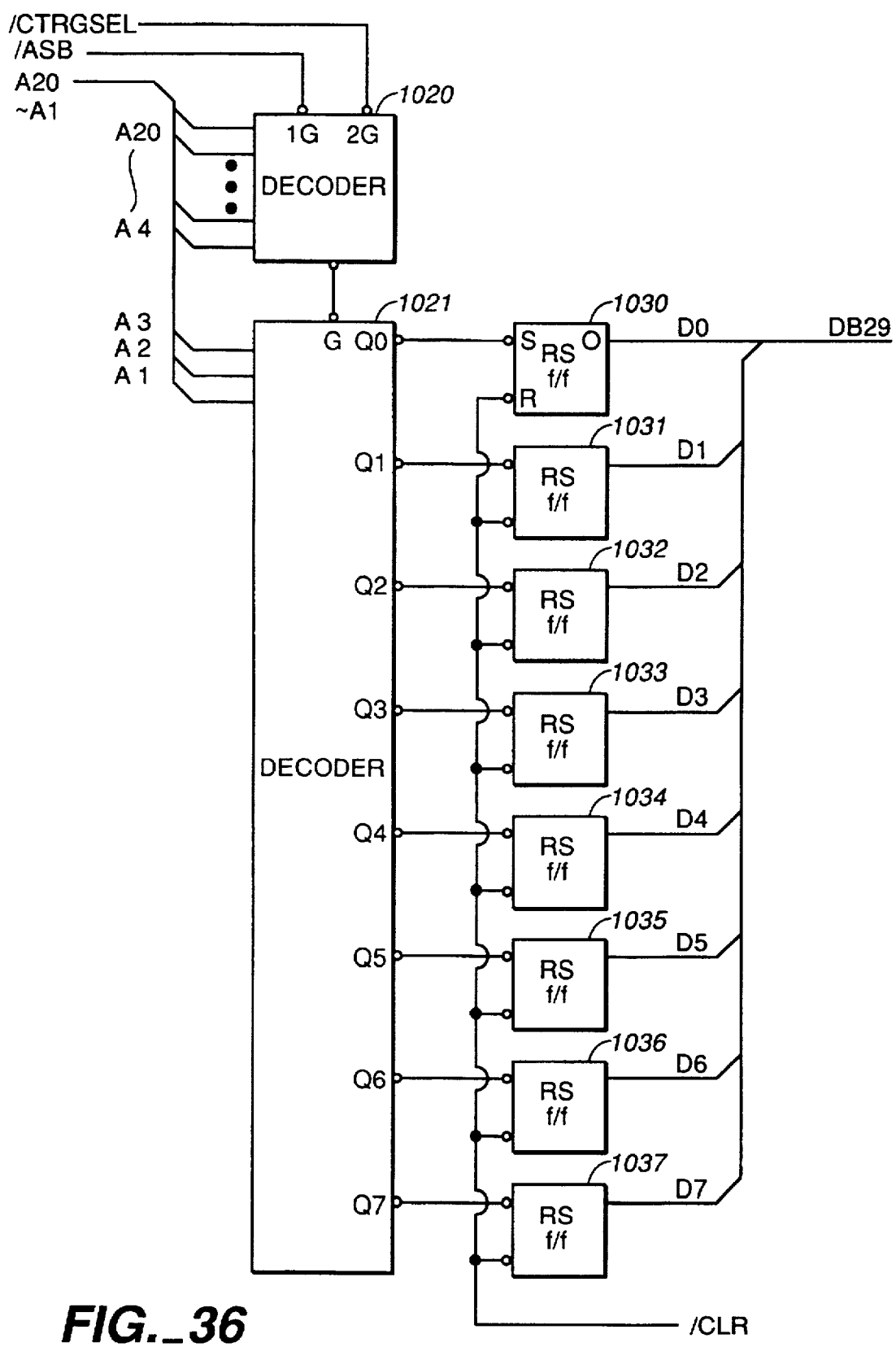
FIG._36

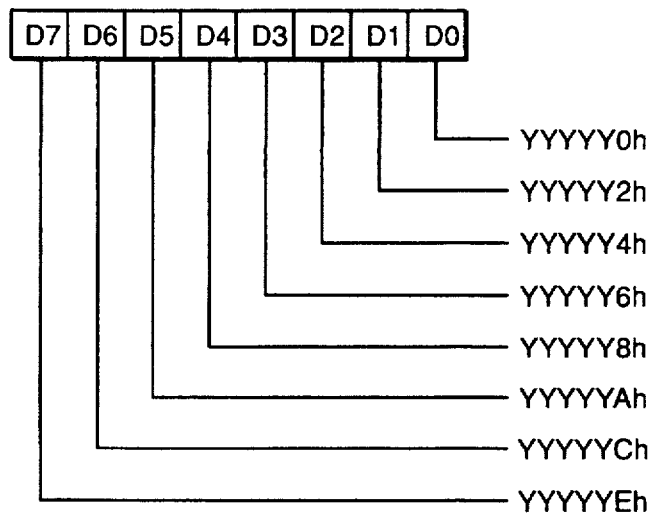
FIG._37
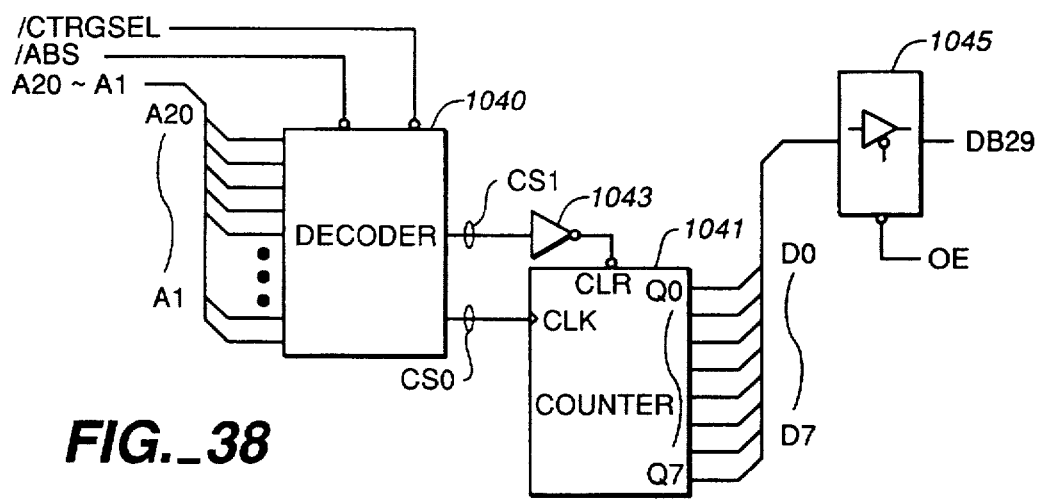
FIG._38
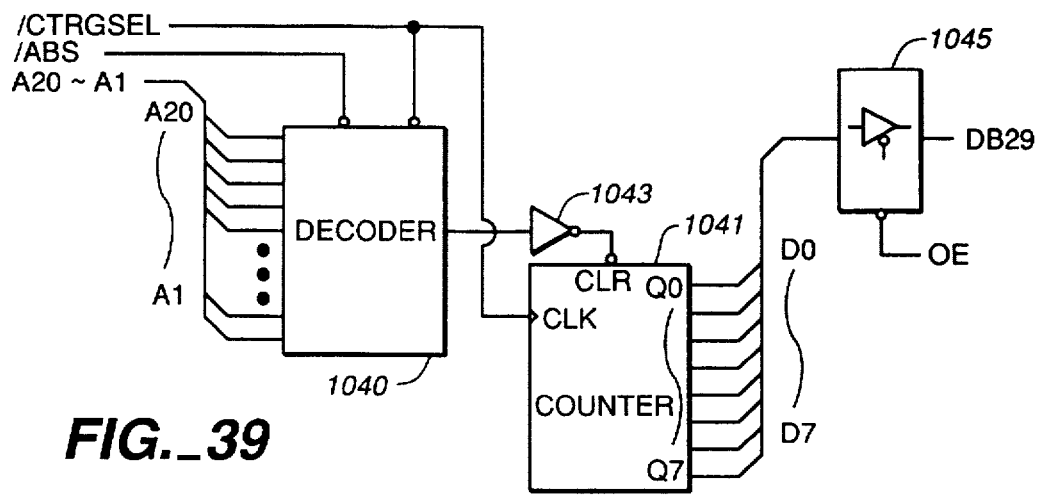
FIG._39

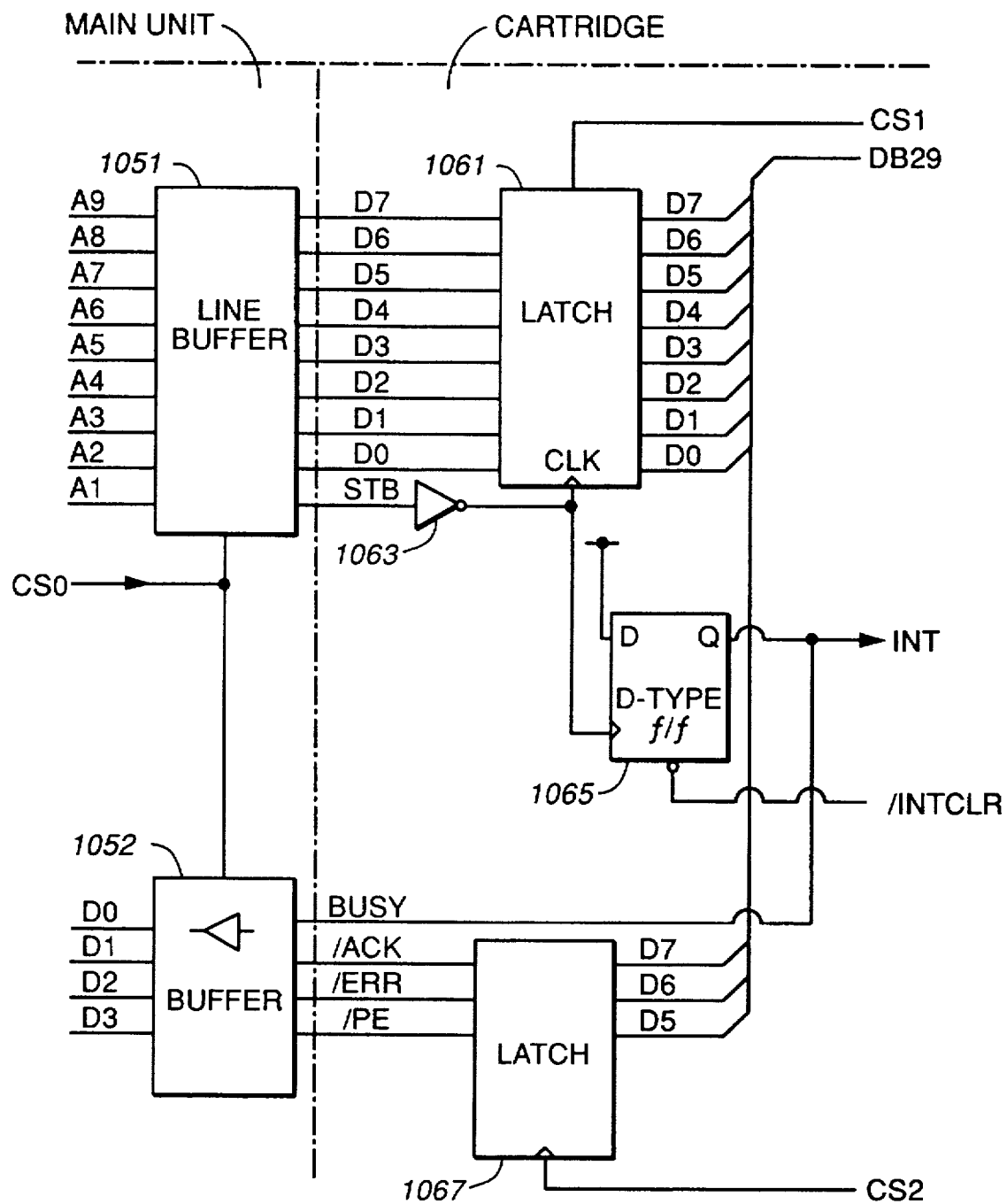
FIG._40

//5,537,517

INFORMATION PROCESSING DEVICE IN AN ELECTRONIC APPARATUS UTILIZING AN ACCESSORY CONTROL DEVICE AND METHODS OF APPLICATION

CROSS REFERENCES TO RELATED APPLICATIONS

This is a continuation of application Ser. No. 07/895,537 filed Jun. 8, 1992, which is a continuation in part of U.S. patent application, Ser. No. 07/816,455, filed Dec. 30, 1991 and entitled, "INTELLIGENT CARTRIDGE FOR ATTACHMENT TO A PRINTER TO PERFORM IMAGE PROCESSING TASKS IN A COMBINATION IMAGE PROCESSING SYSTEM AND METHOD OF IMAGE PROCESSING" now U.S. Pat. No. 5,410,641.

This application also is related to the following other applications:

"INFORMATION PROCESSING DEVICE IN AN ELECTRONIC APPARATUS UTILIZING AN ACCESSORY CONTROL DEVICE AND METHODS OF APPLICATION", Wakabayashi et al., Ser. No. 07/883,753, filed May 15, 1992.

"ADD-ON ELECTRONIC DEVICE AND ELECTRONIC SYSTEM", Wakabayashi et al., Ser. No. 07/854,643, filed Jul. 1, 1992.

"TEMPERATURE CONTROL FOR ADD-ON ELECTRONIC DEVICES", Wakabayashi et al., Ser. No. 07/907,988, filed Jul. 1, 1992.

"INFORMATION PROCESSING DEVICE AND THE ACCESSORY CONTROL DEVICE AND INFORMATION PROCESSING METHOD IT USES", Wakabayashi et al., Ser. No. 07/910,590, filed Jul. 8, 1992.

"APPARATUS TYPE IDENTIFICATION DEVICE AND METHOD THEREFOR", Wakabayashi et al., Ser. No. 07/908,671, filed Jul. 2, 1992.

"INFORMATION PROCESSING DEVICE AND THE ACCESSORY CONTROL DEVICE AND INFORMATION PROCESSING METHOD IT USES", Wakabayashi et al., Ser. No. 07/910,851, filed Jul. 7, 1992.

"INFORMATION PROCESSING DEVICE AND THE ACCESSORY CONTROL DEVICE AND INFORMATION PROCESSING METHOD IT USES", Wakabayashi et al., Ser. No. 07/911,558, filed Jul. 7, 1992.

The foregoing listed applications are incorporated herein by reference thereto.

BACKGROUND OF THE INVENTION

This invention relates generally to releasably attachable accessory devices for use in enhancing the operation of electronic apparatus and more particularly to accessory control devices that operate upon being added to various kinds of electronic apparatus and, upon installation of the accessory control device in such electronic apparatus, enhancing information handling, processing and executing of functions in such electronic apparatus. More specifically, this invention relates to information processing devices having a configuration wherein a data bus in a first processor in the electronic apprartus transfers data from the electronic apparatus to an accessory control device installed in an inlet connector adapted for read only data capbility and methods of efficiently handling and processing information of both the information processing means of the elecronic apparatus and of the installed accessory control device.

In recent years, personal computers, word processors, workstations and other electronic apparatus operating under digital logic control, and printers, facsimile machines, electronic pocketbooks, electronic musical instruments, electronic cooking appliances, electronic cameras and other electronic apparatus operating under microprocessor control are being employed in all areas of society. Further, the use of microprocessors is spreading rapidly to applications, such as, in automobiles, robotics and machine controlled tools, as well as all other types of electric products. Such apparatus utilizing digital logic operation and software have the potential of flexible data processing as compared with simple feedback control realized only with hardware, and, further, have the advantage of being able to change essential functions or change to different functions or to upgrade existing functions through changes to their software. Therefore, it is possible to accomplish completely different control utilizing the same hardware by, for example, merely changing the contents of the ROM utilized in conjunction with the microprocessor wherein procedures are stored or loading of a new program to the main memory from an external device, such as, a floppy disk is readily accomplished. As used herein, "procedures" is meant to be interchangeable with programs, instruction set, processing, process, instructions, program control, commands and the like.

However, since the throughput of the processor that actually performs control is dependent on the hardware, e.g., a predetermined number of operations per unit time, the number of bits that can be handled at one time and width of the bus that performs data transfer, improvement by upgrading the software is limited to only improved usage. As a result, any significant improvement in the performance of the existing electronic apparatus cannot, therefore, be realistically accomplished since it is limited by the existing hardware of the electronic apparatus. Further, upgrading by changing the software requires replacement of the ROM if the software is fused into the ROM, thus making it difficult to achieve in many cases. Therefore, upgrading the software is difficult in most cases except those in which ROM replacement is designed into the device from the beginning or the software is supplied on a replaceable medium, such as, by means of a floppy disk.

In personal computers, for example, accelerators on accelerator boards mounted in the computer housing are employed to improve the functionality of the computer system by completely replacing the microprocessor. However, this requires replacement of the CPU on the motherboard or other difficult operations that cannot generally be performed by ordinary computer users. In electronic apparatus intended for use as a personal computer, an input connector is often provided for the installation of ROM cards, font cartridges and other types of cartridges. An examination of the data transfer bus of the input connectors shows that many of them are only provided with read-only capability as viewed from the electronic apparatus. In such circumstances, a processing accelerator cannot be installed in the input connector since there are no means provided for the output of data from the electronic apparatus to a device or cartrdige installed in the input connector. If an accessory control device could be installed in the input connector that us capable of also receiving data from the electronic apparatus, the functionality of the electronic apparatus could be readily improved, enhanced, added to or changed. However, this is not possible since there is no data bus capability already provided for sending data from the electronic apparatus to the accessory control device installed in the apparatus input connector.

Generally, in the past, no consideration has been made regarding the improvement or changing of the functionality of existing printers, facsimile machines, electronic pocketbooks, electronic musical instruments, electronic cooking appliances, electronic cameras and other consumer electronic apparatus containing a microprocessor, and, further, existing electrical equipment for automobiles, robots, machine tools and other industrial electronic apparatus as well as all types of electric appliances. In case of such appliances, even if expanded functionality is provided through an external input connector, it is generally restricted to functionality of read only data from a device installed in the input conenctor. This lack of consideration is now described in conjunction with respect to one particular electronic apparatus, to wit, a page printer, although it should be realized that its is not limited to this particular kind of electronic apparatus.

In recent years, the rapid development and distribution of laser printers and other page printers has become widespread with high speed output in the transfer of data from computers to such printers for printing. In the case of laser printers, their resolutions range from 240 to 800 dots per inch (DPI), and these printers are capable of printing several pages a minute. One class of these printers generally employ a xerographic unit that employs a photosensitive medium, e.g., a xerographic drum, as the print engine. Since such a print engine continuously performs each of the functions of medium charging, exposure, toner application and image transfer processes in sync with the rotation of the photosensitive drum, the printing processing immediately begins after a image for a first single page has been processed and is stored in the printer memory. As a result, the memory provided in page printers for image processing must have the capacity to hold an image for at least one page. If compression of image data is not performed, the capacity is determined by the resolution and the size of the paper that is capable of being processed. For example, in the case of a resolution of 300 DPI and a paper size of 8 inches by 10 inches, 7,200,000 (8×10×300×300) dots must be manipulated and at least a 0.9 megabyte memory is required to hold this page of data.

In printers that function to receive character codes, row and column pitch and other information as print data and expand this data into an image, or in printers that receive a program described by a page description language and then expand the image by interpretation of the page description, it is necessary to calculate and produce a bit image based on such print data, which greatly reduces the overall processing speed compared to simple bit image transfer since there is huge volume of information to be expanded or interpreted. In other words, the processing speed of a printer is determined principally by the throughput of the printer processor that performs processing and memory access time and it is well known that their processing capability falls far short of the printing throughput and capability of the xerographic unit itself. For example, in a page printer capable of printing 10 pages per minute, only six seconds is allowed to prepare the image data for one page (0.9 megabytes of data) of printing. To process all 0.9 megabytes of data in this period of time means that the processing time allowed for one byte is a mere 6.6 microseconds (6 s/0.9 MB). This processing speed can possibly be realized with one of the high speed RISC type processors currently available on the market today. In contrast to this, however, there are currently many xerography units in use today capable of printing 10 pages per minute. Therefore, the throughput of the controllers that process print data in these printers is a bottleneck in improving overall print speeds of presently developed printers as well as existing printers being employed by end users.

For this reason, there are situations wherein the image processing throughput is remains below the throughput capability of the xerography unit utilized in laser printers. Furthermore, even if it becomes possible to obtain a processor with a high image processing throughput as the microprocessor technology continually advances, it is impossible to improve image processing functionality later in these printers already in the hands of end users.

There are some page printers whose functionality can be improved by being able to increase internal memory capacity or by providing an expansion slot and installing a cartridge with built-in fonts or programs stored in the cartridge but the structure of the data bus of the slot connector is designed for read only capability from the cartridge connector so that data cannot be transferred from the electronic apparatus to the cartridge and processed in the cartridge in conjunction with a separate cartridge processor and programs provided in the cartridge adapted for proper processing of the transferred data.

It is an object of this invention to provide an accessory control device for an electronic apparatus that is capable of enhancing the operation of the processor of the electronic apparatus.

It is another object of this invention is an information processing device in conjunction with an electronic apparatus for use with an accessory control device to provide for overall improvement, change in or added functionality of the electronic apparatus.

SUMMARY OF THE INVENTION

According to this invention, an information processing device and an accessory control device used in conjunction with the information processing device wherein the information processing device is capable of transferring data to the accessory control device without using a data bus for data transfer. The resulting effect is the capability of processing data in the accessory control device in not only stituations wherein an input data bus is provided for transferring data, but also in cases in which there is no such existing bus configuration. Overall, the information processing device makes it possible to perform at least some of the processing on data in the accessory control device, in which case the functions of the electronic apparatus can be improved, enhanced, added to or otherwise changed.

The ability to access the accessory control device from the electronic apparatus means that the connectors connecting the two will have at least an address signal line or other control signal line as a signal line. The oresent invention is distinguished by making it possible to perform data transfer using an address signal line or a control signal line in an information processing device and accessory control device under the restriction of not being able to send signals to the accessory control device via a data bus and in turn to process information in the accessory control device. A summary of the invention is set forth below together with the principle concept behind data transfer between the information processing device and the accessory control device.

(1) Application of Address Signals

The present invention contrived as an accessory control device comprises an electronic apparatus equipped with a first processor capable of logic operation, a first memory means that stores the processing executed by the first processor and a connector connected to at least the address bus of the first processor. An accessory control device connected to the connector. The electronic apparatus is equipped with an address output means that reflects the data transferred to the accessory control device in the address signal and outputs the address signal via the connector. The accessory control device is equipped with a data fetch means for fetching the data reflected in the address signal from the address signal output from the electronic apparatus.

When the address output means of the electronic apparatus outputs an address signal via the connector, the data fetch means in the accessory control device fetches the data reflected in the address signal from the address signal output from the electronic apparatus. In other words, data is reflected in the address signal line, and data transfer is peformed. In cases where address signals can be exchanged, the transfer of data can be easily realized. As a result, processing of data in the for, for example, the storage or display of or operations on data can be performed in the accessory control device, and when considered overall, the functionality of the device can easily be improved, enhanced, added to or otherwise changed.

By providing the accessory control device with a second processor that performs processing separate and distainct from the first processor of the electronic apparatus and executes procedures stored in the second memory means, information processing can be performed in the accessory control device thereby facilitating high speed manipulation of and operations on transfered data, judgment determination and other high level logic operations data processing. Furthermore, in situations wherein such a processor is utilized, the content of data processing can be realized using software thereby making it easy to improve, enhanced, add to or change the content of processing. It is also possible to have the accessory control device perform at least a part of all the information processing performed by the information processing device.

Various configurations that reflect the data to be transferred in the address signal line can be considered for the electronic apparatus of this invention. For example, ; the data to be transferred for processing can be included as part of the address. In this case, data having a correlation with addresses to be presented to the accessory control device can be stored in advance in the accessory control device. When an address signal is received, the data corresponding to that address signal can be read out for processing. In this manner, it is easy to establish a correlation between the address and data to be transferred. Further, assuming a complex correlation between the address data and the data to processed, it is possible to encipher the data to be transferred.

Another possibility for data transfer is to include the data to be transferred as part of the address and hold at least a portion of this address as the data, per se. In this situation, it is possible to perform data transfer at high speed.

In cases in which there is an address signal line, data can be transferred by communications employing the address signal line. For example, the data to be transferred can be reflected by temporal variations in the address signal in the electronic apparatus, and the data can be restored in the accessory control device based on the temporal variations read from the address signal. When doing this, temporal variations in one address signal can be employed, but multiple bits can be communicated at the same time by causing variations in multiple address signals. Further, it is desirable to establish communication protocols in advance for the sending side and the receiving side to raise the reliability of communication.

There are other ways to transfer data employing address signals as the medium or carrier for the transfered data. For example, address signals can be established to correspond to the data to be transferred and provided as output from the electronic apparatus to the accessory control device. The accessory control device is provided with condition memory means capable of discriminating from the transferred data, whose conditions are changed by the output addresses and that hold those conditions after changing, whereby the transferred data can be restored in the accessory control device by reading the conditions of the condition memory means. In particular, the condition memory means, e.g., flip-flops, are set one bit at a time as specified by the addresses, and the accessory control device reads these one bit at a time and reconstitutes the data. Of course, a configutation is also possible in which multiple bits are combined and read from the read side.

In another configuration, the electronic apparatus outputs prescribed address signals in a number corresponding to the data to be transferred and the accessory control device detects the number of these address signals by means of a condition memory means, e.g., counter, whereby it restores the data. In this case, a fewer number of addresses need be employed for data transfer.

(2) Application of Control Signals

If the electronic apparatus reflects the data to be transferred in a control signal and the accessory control device fetches the data reflected in this signal, then data can be transferred employing the control signal. The selection signal that selects the accessory control device from the electronic apparatus, write and read control signals, interrupt signals, associated power lines, etc., can be utilized as such a control signal line. This approach makes it possible to transfer data between the electronic apparatus and the accessory control device without utilizing address signals as the medium for such data exchange.

(3) Other Types of Data Transfer

Data can also be transferred by having the electronic apparatus respond to a condition corresponding to the receipt of data from an external device, as in the case of sending address signals to the address signal output via the input connector and having the installed accessory control device read that address signal as data from such an external device. In this case, the accessory control device can be considered to be operating as though the device is receiving data directly from the external device and not receiving an address signal. This allows the accessory control device to flexibley accommodate data transfer.

(4) Invention of Configuration Incident to Data Transfer

The procedure executed by the first processor of the electronic apparatus for transferring data can be built into the electronic apparatus in advance, but memory means (also, referred to as third memory means) for storing this procedure can also be provided in the accessory control device. The procedure stored in the third memory means can also be executed after being transferred to the memory means of the electronic apparatus, but the configuration can be simplified by assigning the third memory means to an address space of the first processor in the electronic apparatus to make it possible for the first processor to execute the procedure directly. In this case, the first processor in the electronic apparatus can be made to operate according to the requirements of the accessory control device, and data transfer and data processing can be realized in any form.

Also, it is desirable that the accessory control device be configured as a cartridge equipped with at least a printed circuit board on which the second processor is mounted and having a housing for the printed circuit board to facilitate its use as a single unit for portability and adaptation to the electronic apparatus input connector.

The data processed by the accessory control device can be retained for use in conjunction with tasks to performed or accomplished by the accessory control device, but by providing for the the transfer of data processed by the accessory control device to the electronic apparatus, the functionality of the electronic apparatus can be enhanced. Another application of this invention is processing of data transferred to the accessory control device after which the processed data is visually displayed by a display device, such as, an LCD device incorporated into the accessory control device.

The information handled by the information processing device can be a variety of types; e.g., by providing the electronic apparatus with a display means that displays at least characters, graphics or color and having the accessory control device generate the image data displayed on the display device based on data transferred from the electronic apparatus, the accessory control device functions as a display accelerator, thus making it possible to improve the processing speed of the display controller section, which normally places a large demand on the electronic apparatus. A CRT, liquid crystal panel, plasma display or other optical display means can be used as the display device, or a display device for printing, such as, a printer, pen plotter and cutting plotter can be employed. A configuration is also practical wherein the electronic apparatus is a printer for receiving and printing the print data. Further, another configuration is the case of an information processing device for the processing of sound.

By employing the accessory control device to develop image data based on data received from the electronic apparatus, the image processing capability of the printer can be improved or enhanced. Also, by employing a page description language to develop the image data, complex image processing can be easily realized.

(5) Information Processing Method

The present invention further comprises a method of information processing method wherein the electronic apparatus and the accessory control device are connected to one another for cooperatively handling and processing data. The electronic apparatus transfers the data to be processed to the accessory control device via the address signal provided as an output via the input connector of the electronic apparatus. The accessory control device fetches the data from the address signal received via the connector and performs operations on or processes the fetched data. As a result, the electronic apparatus and accessory control device hold data to be processed in common and share functions in the sequential processing of the data thereby facilitating efficient handling and processing of the data.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a general configuration of a printer representing one example of an electronic apparatus with which the present invention is utilized.

FIG. 2 is a block diagram showing the architecture of an electronic control unit or controller incorporated in a printer of the embodiment shown in FIG. 1.

FIG. 3 is a perspective view of an intelligent cartridge comprising this invention attached to the printer.

FIG. 4 is a block diagram of the internal architecture for an intelligent cartridge comprising this invention.

FIG. 5 is a flowchart illustrating a print process routine executed by the printer electronic control unit shown in FIGS. 1 and 2.

FIG. 6 is a flowchart illustrating a data transfer process routine executed by the printer electronic control unit comprising this invention.

FIG. 7 is a flowchart illustrating a data development process routine executed by the intelligent cartridge comprising this invention.

FIG. 8 illustrates the data read process from a ROM utilizing the data as an index.

FIG. 9 is a block diagram showing another configuration for the transfer of data from the electronic control device.

FIG. 10 is a block diagram showing a still further configuration for the transfer of data from the electronic control device.

FIG. 11 is a block diagram showing the general configuration of a second embodiment.

FIG. 12 is an exploded perspective view of an accessory control device in the form of a cartridge in accordance with the second embodiment of this invention.

FIGS. 13A and 13B are plan views of the top and bottom portions of the printed circuit board on which the second processor and other electronic components, such as, shown in FIG. 4, are mounted on the board.

FIG. 14 is an explanatory diagram of the configuration of signal wires in the connector CN11 between the electronic apparatus and the cartridge.

FIG. 15 is an explanatory diagram of the address map of the cartridge as viewed from electronic control device 501.

FIG. 16 is an explanatory diagram of the address map of the cartridge as seen from microprocessor 601.

FIG. 17 is a block diagram showing the internal electronic configuration of the cartridge.

FIGS. 18A, 18B and 18C are circuit diagrams illustrating an example configuration for interrupt request registers 640.

FIG. 19 is a circuit diagram illustrating an example configuration for polling command registers 643.

FIG. 20 is an explanatory diagram illustrating contents of status registers 645.

FIG. 21 is a circuit diagram illustrating an example configuration of read control circuit 620.

FIG. 22 is a flowchart illustrating the process performed by the electronic control device for accomplishing data transfer employing read control circuit 620.

FIG. 23 is an explanatory diagram illustrating a configuration of data in ROM 671.

FIG. 24 is a flowchart illustrating the process performed in the cartridge for accomplishing data transfer employing read control circuit 620.

FIG. 25 is a flowchart illustrating the process performed by the electronic control device for accomplishing data transfer employing FIFO control circuit 623.

FIG. 26 is a flow chart illustrating the process performed in the cartridge for accomplishing data transfer employing FIFO control circuit 623.

FIG. 27 is a circuit diagram illustrating an example configuration of double-bank control circuit 624.

FIG. 28 is a flowchart illustrating the process for beginning data transfer employing double-bank control circuit 624.

FIG. 29 is a flowchart of the response process executed in electronic control device 501.

FIG. 30 is a flowchart illustrating the process executed in the electronic control device for accomplishing data transfer employing double-bank control circuit 624.

FIG. 31 is a flowchart illustrating the process executed in the cartridge for accomplishing data transfer employing double-bank control circuit 624.

FIG. 32 is a timing chart illustrating the timing for the printing of image data via the printer engine.

FIG. 33 is a circuit diagram showing an example of a configuration of a circuit that transfers data by superposing serial data on an address signal.

FIG. 34 is an explanatory diagram showing the relationship between the data to be transferred and read processing.

FIG. 35 is a circuit diagram showing another example of a configuration of a circuit that transfers data by superposing serial data on an address signal.

FIG. 36 is a circuit diagram showing an example of a configuration of a circuit that provides a register corresponding to each bit of the data to be transferred and transfers data by setting the registers.

FIG. 37 is a diagram illustrating the relationship between each data bit and the register addresses.

FIG. 38 is a circuit diagram showing an example of a configuration of a circuit that performs data transfer employing a counter.

FIG. 39 is another circuit diagram showing a further example of a configuration of a circuit that performs data transfer employing a counter.

FIG. 40 is a circuit diagram showing an example of a configuration for an inetrface circuit with an external accessory control device in the connector portion of a cartridge.

DESCRIPTION OF THE PREFERRED EMBODIMENTS

Embodiments of the invention are explained in conjunction with the drawings in order to describe the invention in detail. Since the description is extensive and covers a number of topics, the following is a table of contents of the description.

[I] First Embodiment
A. Overall Configuration of Hardware
B. Configuration and Operation of Electronic Control Device 10
C. Configuration of Cartridge 3
D. Transfer of Data from Electronic Control Device 10
E. Cooperative Operation of Electronic Control Device 10 and Cartridge 3
F. Effectiveness of First Embodiment
G. Example Modification of First Embodiment—No. 1
H. Example Modification of First Embodiment—No. 2
[II] Second Embodiment
A. Explanation of the Overall Configuration
B. Structure of the Cartridge
C. Address Space of the Cartridge
D. Internal Configuration of the Cartridge
E. Explanation of Data Transfer Controller 603
F. Explanation of the Registers
G. Configuration and Operation of Read Control Circuit 620
H. Configuration and Operation of FIFO Control Circuit 623
I. Configuration and Operation of Double-Bank Control Circuit 624
J. Printing of Image Data
K. Effectiveness of Second Embodiment
L. Other Embodiments
  (1) Configuration that Utilizes Address Bus as Communication Line—No. 1
  (2) Configuration that Utilizes Address Bus as Communication Line—No. 2
  (3) Configuration that Transfers Data by Setting Each Bit of the Data to Be Transferred by Means of a Data Read Signal
  (4) Configuration that Transfers Data Employing a Counter
  (5) Configuration that Performs Data Transfer Employing a Control Signal
  (6) Configuration that Transfers Data by Reproducing a Signal as Received from an Outside Source
M. Other Applications of the Invention

[I] First Embodiment

A. Overall Configuration of Hardware

Preferred embodiments of the invention are explained below in order to further clarify the configuration and action of the invention described above. First is an explanation of an embodiment in which the invention is applied to a printer. FIG. 1 is a block diagram showing the general configuration of the main printer unit 1 of one embodiment of this invention with the access control device in the form of cartridge 3 installed in printer unit 1.

Printer 1 comprises a page printer capable of printing by means of xerographic processing. In operation, print data is transmitted from an external source, such as, host computer 5, and printer 1 forms a toned and fused image on a recording medium, such as, paper P. Printer 1 contains a controller comprising electronic control unit 10 which receives print data from computer 5 and develops the print data into a bitmap or bit image data. Intelligent cartridge 3 is insertable into printer 1 for image processing in conjunction with printer control unit 10 and is provided with a connector 11 to which the address bus and the data bus of printer electronic control unit 10 are connected to cartridge 3. Semiconductor laser unit 12 is driven by electronic control unit 10 to selectively expose the charged surface of photosensitive drum 14 in xerographic unit 15 to form a latent image of the processed bit image to be printed. Xerographic unit 15 includes photosensitive drum 14, paper cassette 17 for storing paper P, feed mechanism 19 for feeding single sheets of paper P for tangential engagement with the peripheral surface of photosensitive drum 14, thermal fixing roller unit 21 for fusing toner previously transferred to paper P and an external tray 23 into which printed paper P is fed from printer 1.

Xerography unit 15 also includes a charging unit 25 to apply electrical charge to the surface of photosensitive drum 14. Toner unit 27 applies charged toner onto photosensitive drum 14. Toner cleaner unit 29 removes remaining toner on the surface of photosensitive drum 14 after the toned image has been transfer to paper P. Electronic control unit 10 drives semiconductor laser unit 12 in synchronism with the rotational movement of photosensitive drum 14 and forms a latent image on drum 14 by means of selectively discharging the charged surface in an image-wise formation in accordance with an image to be printed and the image is toned at 27 by the attraction of charged toner to discharged regions of drum 16 that have been exposed to the laser beam. Synchronized with the rotational movement of photosensitive drum 14, a single sheet of paper P is removed from paper cassette 17 and fed tangentially relative to photosensitive drum 14 by feed mechanism 19. Paper P at this point is also fed by rotational movement of photosensitive drum 14 and transfer roller 30. As a result, most of the toner on photosensitive drum 14 is transferred to the paper P. The toned paper P is then fed to fuser unit 21 and the toner is melted by roller heat and fixed to paper P.

It should be noted that application of the present invention is not confined to a laser type printer but also has applicability to other types of printers, such as, LED array printers, thermal printers and ink jet printers.

B. Configuration and Operation of Electronic Control Device 10

Reference is now made to FIG. 2 which illustrates in more detail electronic control unit 10 of printer 1. Unit 10 comprises an arithmetic and logic operation circuit having a CPU 31 for operating the entire print processing. CPU 31 is connected to address bus 32, data bus 34 and control signal bus 36. Address bus 32 is connected to connector 11 as an address bus, PAD, for cartridge. Bus 32 is connected to address decoder 41, ROM 43, I/O port 49, laser interface (I/F) unit 51 and MUX 55. Data bus 34 is connected to connector 11 of cartridge, via bus driver/buffer 52, when cartridge 3 is engaged, and is also connected to I/O port 49, ROM 43 and laser I/F unit 51. Control signal bus 36 is connected to MCU 47, and MCU 47 is also connected to MUX 55 via a bus. All components, except for connector 11, are connected to respective buses as read/write enabled. Control unit data bus 34 is connected to the read-only data bus, PD, of cartridge 3 via bus driver 52, which is between data bus 34 and cartridge connector 11. Therefore, cartridge 3 is strictly a read-only device as viewed from CPU 31.

Address decoder 41 decodes address signals generated by CPU 31. When an address is designated by CPU 31, decoder 41 provides a select signal to ROM 43, DRAM 45, I/O port 49 and laser I/F unit 51 according to allocation in their designated memory areas. ROM 43 stores an operating program and CPU 31 normally operates according to the program stored in ROM 43. DRAM 45 is utilized for the development and processing of print data into bit image data. Since it is generally necessary to store image data for at least one page, DRAM 45 is provided with a capacity of at least 2 Megabytes.

MCU 47 analyzes and processes the control signals provided from the CPU 31 and outputs control signals for ROM 43 and DRAM 45. MCU also provides read/write signals for memories 43 and 45 and for I/O port 49 and, further, controls the refresh timing for DRAM 45. In this connection, refresh timer 53 is connected to MCU 47, and upon receiving a signal from refresh timer 53, MCU 47 provides a refresh address to DRAM 45 via multiplexer 55 if MCU 47 determines that the timing is proper for memory refresh. I/O port 49 receives print data from computer 5, which is then stored in DRAM 45, and also operates as an interface with xerographic unit 15. Laser I/F unit 51 is connected to electronic control unit 10 and drives and controls the interface of laser unit 12. Electronic control unit 10 also includes timer 57 which is connected to both connector 11 and CPU 31 via the control lines shown in FIG. 2.

The basic function of printer 1 utilizing electronic control unit 10 is to process and develop print data into a bit image in advance of printing. Unit 10 also controls the operation of xerographic unit 15 when print data for one page has been processed into a bit image and is ready for printing while also simultaneously driving semiconductor laser unit 12 to printout the image data on paper P. Beside performing these basic functions, printer 1 of the this invention can execute more intelligent printing, as an expanded function utilizing cartridge 3 connected to printer connector 11. Cartridge 3, beside the storage of font data and a software program for interpretation of a page description language, further includes a processor unit to process PDL, which is explained in greater detail below.

C. Configuration of Cartridge 3

FIG. 3 illustrates an external view of cartridge 3, which is designed to be releasably attached in connection port 61 of printer 1. The external construction of cartridge 3 includes a rectilinearly shaped portion for insertion into connection port 61 while a larger trapezoidal shaped portion projects from and remains external of printer 1. When cartridge 3 is fully inserted into connection port 61, a connector portion on the forward end of cartridge 3 is coupled with printer connector 11, and, as a result, printer 1 is electrically coupled to cartridge 3. In this connected state, the larger rearward portion of cartridge 3 is substantially in engagement with the body of printer 1. The upper surface of the rearward portion of cartridge 3 is exposed outside of printer 1 and is provided with an angular surface to prevent the careless placement of objects on the surface of the inserted cartridge.

Reference is now made to FIG. 4 which is a block diagram of the internal circuitry of cartridge 3. In FIG. 4, bus lines are indicated by diagonal slash lines while other connection lines shown are signal lines. Bus lines may be, for example, an 8 bit or 16 bit configuration.

Cartridge 3 includes a CPU 71 which is a separate CPU from CPU 31 of printer electronic control unit 10. CPU 71 may be a RISC type processor which is appropriate for the processing of a page description language (PDL), such as, PostScript®. An address bus, CAD, of CPU 71 is connected to a ROM 73 which stores a page description language, such as, PostScript®, representing character or graphic data or the like, and a PDL program. Address bus CAD is also connected to RAM 75 for storing data, logic array 77 for performing control functions via cartridge address bus, CAD, and selector 79. Both printer address bus, PAD, and cartridge address bus, CAD, are connected to selector 79 and selector 79 is connected as input AD to RAM 95, which may be a 16 Kbyte SRAM. Cartridge data bus CD for CPU 71 is connected to ROM 73, RAM 75, the data input D of first latch 81, the data output O of second latch 82, and an of first bi-directional buffer 84. Buffer 84 is shown as a bi-directional buffer but may also be a single direction buffer for only the transfer of bit image data from bus, CD, to bus, PCD, for storage in RAM 95.

With reference to FIGS. 2 and 4, when cartridge 3 is electrically coupled to printer controller 10 by means of the releasable attachment of connector 90 to connector 11, printer address bus 32 is electrically coupled to its counterpart bus PAD on cartridge 3. Printer data bus, PD, is driven by the output of buffer 92 across attached connectors 90, 11 and received by the input of buffer 52. Control interrupt signals IA and TB also are coupled between the print controller 10 and cartridge 3 by means of connectors 90, 11 as in FIGS. 2 and 4. Both cartridge address bus, CAD, and printer address bus, PAD, are coupled to logic array 77 as inputs.

The primary function of cartridge 3 is to execute bi-directional data communication (read/write) via read-only data bus PD. ROM 91 (e.g., 128 Kbyte ROM) with its input coupled to printer address bus, PAD, operates under the control of control unit CPU 31 and functions similar to an I/O driver. ROM 91 has two portions. A first portion is a translation table containing print data information, a portion of which is illustrated in FIG. 8. The print data, DDh, in the example here is 8 bit wide for a table having 256 memory locations. A second portion contains a program which is executed by control unit CPU 31 for the transfer of print data address signals to cartridge 3. Thus, if cartridge 3 is attached, CPU 31 will function with cartridge ROM 91 rather than control unit ROM 43.

Address signals, YYYYh+DDh, are provided on address buses 32 and PAD which are coupled to and decoded by logic array 77 and utilized for addressing locations in ROM 91 corresponding to print data to be developed. FIG. 8 illustrates a portion of these address signals representing DDh data as part of the byte address and function as an index or pointer to print data locations in the access table of ROM 91. ROM 73 contains operating programs for CPU 71 including a PDL program. As previously indicated, RAM 75 has a large capacity for receiving at least one page of bit image data processed by CPU 71 based upon print data accessed from ROM 91. The data accessed at ROM 91 is provided on OD bus onto the CD bus via latch 82 under the control of logic array 77. The data is developed by CPU 71 and the bit image data is stored in RAM 75 until a full page of data has been completed. Segments of the page image data are thereafter transferred to RAM 95 in segments via buffer 84 when logic array 77 has placed RAM 95 in its write-enable state. Based upon cartridge timing, logic array 77 places RAM into its read-enable state after which the stored image data in RAM 95 is transferred off of cartridge 3 via the read-only data bus, PD under the control of logic array 77, and stored in DRAM 45 in preparation for printing.

An input bus to second buffer 92 is referred to as output bus, OD. Output bus, OD, is connected to the data output of ROM 91, the output O of first latch 81, the input D of second latch 82 and the output of third unidirectional buffer 93. The input of third buffer 93 is connected to printer/cartridge data bus, PCD, which is connected also between first buffer 84 and the data input D of RAM 95. Latches 81 and 82 are tri-state devices and they can latch and hold the contents of their inputs D for presentation at their outputs O under the control of logic array 77. Also, under the control of logic array 77, these latches are able to convert their outputs into a high-impedance state. Logic array 77 is also connected to control selector 79 and RAM 95, which components will be explained later. Logic control array 77 controls selector 79 and RAM 95 either as addressed by CPU 71 via address bus, CAD, or as addressed by CPU 31 in electronic control unit 10 via address bus, PAD, connected to address bus 32 in electronic control unit 10.

It will be understood by those skilled in the art that an alternate approach to the use of the data table in ROM 91 is that the print data portion, DDh, with each address byte on address bus, PAD, may be decoded and data DDh portions provided to a tri-state latch (similar to latches 81 and 82) for transfer to RAM 75 and processing into bit image data. This approach would require additional logic and logic control on cartridge 3 compared to the configuration of FIG. 4, which latter configuration would be a more cost effective approach.

D. Transfer of Data from Electronic Control Device 10

In operation, when CPU 31 of electronic control unit 10 provides an instruction to read the contents at a specified address of RAM 95 in cartridge 3, logic array 77 analyzes the address and switches selector 79 to enable printer address bus, PAD, and to change RAM 95 to its read-enable state. The data read from RAM 95 is transmitted to CPU 31 of electronic control unit 10 via printer/cartridge data bus, PCD, third buffer 93, output data bus, OD, second buffer 92 and printer data bus, PD. Therefore, if the bit image data has already been written in advance in a specific area of RAM 95 by CPU 71 of cartridge 3 via cartridge data bus, CD, first buffer 84 and print/cartridge data bus PCD, the bit image data can be transferred from cartridge 3 over to electronic control unit 10.

It should be noted that there is another way to transfer the bit image data from cartridge 3 to electronic control unit 10. Since first latch 81 is connected to cartridge data bus, CD, CPU 71 can hold the bit image data at first latch 81. When electronic control unit 10 instructs the addresses allotted to first latch 81 under this condition, logic array 77 enables the output O from first latch 81 and the latched bit image data is transferred to electronic control unit 10 via output data bus, OD, buffer 92 and printer data bus, PD.

Since the data bus connecting electronic control unit 10 and cartridge 3 is read-only as viewed from electronic control unit 10 via one-way driver 52, it is a simple task to transfer data from cartridge 3. As previously indicated, it is not possible for cartridge 3 to receive any data from control unit 10 by normal access and communication protocol. However, the present invention utilizes the above described architecture to accomplish the transfer of the data to cartridge 3 by the following method.

When control unit CPU 31 executes an instruction via a program stored in ROM 91 to read the contents of a specified address in cartridge ROM 91, logic array 77 analyzes the address and operates second latch 82, via specified timing, to capture the data output of ROM 91. ROM 91 functions as a tri-state device relative to bus, OD. As a result, the data read out from ROM 91, via bus, OD, is latched at second latch 82 and can be read by cartridge CPU 71 through control of logic array 77. At this same time, second buffer 92 is idle so that any data in this latch cannot be read by control unit CPU 31. Thus, there is no problem if control unit CPU 31 tries to read data at buffer 92 via control unit driver 52 and printer data bus, PD, since no data will be present.

CPU 71 will then output a specific address to logic array 77, via address bus, CAD, to enable the output of second latch 82 and reads its contents and stores the content in RAM 75. Thus, data loading from control unit 10 is accomplished in address coding wherein a portion of address data from control unit 10 is utilized as an index or pointer to print data already stored in a memory table in ROM 91. With the decoding of the address data via logic array 77, print data is accessed out of ROM 91 via logic array 77 for development into bit image data.

E. Cooperative Operation of Electronic Control Device 10 and Cartridge 3

Next to be described are the processing operations executed by electronic control unit 10 and cartridge 3. Cartridge 3 processes page description language (PDL) and printer 1 delivers the PDL transmitted from computer 5 to cartridge 3 and, on reception of the processed result from cartridge 3, unit 10 operates xerographic unit 15 to print the developed image data.

Reference is made to FIG. 5 which shows a flowchart of the print process routine executed by electronic control unit 10. When the print process commences, control unit CPU 31 first executes the process of loading contents at a specified address at ROM 91 into RAM 75 (step S100). The expected addressed contents of specified data is returned in the case where cartridge 3 has been attached to printer 1. If the expected specified data is not returned (step S110), CPU 31 determines that cartridge 3 is not attached and alternatively receives print data from computer 5 and develops the bit image data within control unit 10 per se. Then, according to the print data received from computer 5, electronic control unit 10 generates bit image data for a single page (step S120).

If the expected addressed contents is return as specified at the address location in ROM 91 and, therefore, CPU 31 has reliably determined that cartridge 3 is attached (step S110), CPU 31 will proceed as follows. CPU 31 receives print data from computer 5, and receives the image data developed in cartridge 3 according to the print data (step S140). An image data transfer process is executed wherein CPU 31 in printer 1 directly executes a transfer program in cartridge 3, which process is described in greater detail later.

Through the process described above, DRAM 45 stores either the image data generated by electronic control unit 10 when cartridge 3 is not attached or the image data developed by cartridge 3 when cartridge 3 is attached. Then, printer 1 operates xerographic unit 15 according to the developed image data in order to print the image onto paper P (step S150).

Data transfer from electronic control unit 10 to cartridge 3 is executed by the data transfer process routine of printer 1, which is illustrated in the flowchart of FIG. 6, and by the data development process routine of cartridge 3, which is illustrated in the flowchart of FIG. 7. Electronic control unit 10 commences with the data transfer routine shown in FIG. 6 if there is print data to be transferred to cartridge 3. When this processing commences, electronic control unit 10 operates to read address YYYYh+DDh of ROM 91 of cartridge 3 utilizing the hexadecimal data DDh (h is a code indicating hexadecimal representation) as an index to a location in the ROM translator table of FIG. 8 (S200).

Following this operation, logic array 77 of cartridge 3 controls second latch 82 to latch the data read out from ROM 91. As shown in FIG. 8, for 256 bytes of data commencing with addresses starting from YYYYh of ROM 91, data from 00h to FFh is written in advance. When addresses commencing from YYYYh are read utilizing the data to be transmitted as an index, the print data corresponding to the index, which is latched at second latch 82, is provided on output data bus, OD. FIG. 8 shows a specific example for the case wherein print data to be accessed is data 41h.

At this time, cartridge CPU 71 is carrying out the data development process routine illustrated in the flowchart of FIG. 7. CPU 71 determines first if second latch 82 has latched data (step S210) and if it has not yet latched data, will wait until the data is latched. When the data is latched by second latch 82, CPU 71 executes the process of transferring the data from second latch 82 to print data memory, RAM 75 (step S220). CPU 71 also determines if all the print data for one page has been loaded from electronic control unit 10 into RAM 75 (step S230). The foregoing process via steps S210 to S230 are repeated until print data for a single page is completely loaded in RAM 75. The data transferred from electronic control unit 10 to RAM 75 is the page description language (PDL) program.

On completion of the loading of print data for one page (step S230), CPU 71 executes the data development process (step S240). The data development process executed by CPU 71 is a graphic operation to generate and develop the PDL program into a graphic image having a resolution of 300 dpi. The final operational results are sequentially developed at RAM 95 (step S250). The above described processes (steps S240 to S250) are repeated until the completion of the data development and storage of the results. The data development process (step S240) is executed by CPU 71 which is a processor and not CPU 31 of electronic control unit 10. On completion of the image data development (step S260), the operation comes to an [END], and the developed image data is then sequentially transferred to electronic control unit 10 via printer data bus, PD (FIG. 5, step S140).

F. Effectiveness of the First Embodiment

In summary, when cartridge 3, incorporating CPU 71 for image processing, is attached to connector 11 in electronic control unit 10, cartridge CPU 71 receives print data from printer 1 as a portion of the address byte code and accordingly develops the print data into bit image data for transfer to control unit 10 and printing at xerographic unit 15. Therefore, in comparison with the case where cartridge 3 supplies the function of the page description language processor per se, the operating performance of the page description language is significantly improved. It is also possible to supply a higher level page process language, such as, PostScript® level 2 with a cartridge CPU.

It is, thus, possible to transfer print data to cartridge 3 while utilizing connector 11 which is incorporated for the purpose of supplying fonts and a page description language processor to printer 1 and which is equipped with a read-only data bus when viewed from the side of electronic control unit 10. Therefore, the cartridge adapter of this invention may be used with any existing laser or page printer not previously or originally designed for attachment of a PDL interpreter cartridge incorporating a CPU. Therefore, with the employment of such PDL interpreter cartridge, existing printers can be effectively utilized to their fullest potential in performance and speed of printing.

Generally, when a main frame computer functions are improved, the printer connected to the computer becomes a bottleneck in the system. Thus, the older printer may need to be replaced at the time of upgrading the functionality of the main frame computer. With the implementation of the PDL interpreter cartridge of this invention, all that is required is the attachment of cartridge 3 to the older existing printer 1 thereby saving costs in procurement of an new printer.

Further, in this embodiment, since the data to be transferred are included as part of the addresses and the data are fetched using a ROM 91 in which the data, having a one-to-one correlation with the addresses, are stored, the correlation between the addresses and the data is easy to understand. On the other hand, the data to be transferred can also be enciphered by destroying the correlation between the addresses and the data. Also, a RAM can be used in place of the ROM 91, in which case a table for fetching the data is laid out within a prescribed range of addresses as part of an initialization process, for example, before the data are transferred.

G. Example Modification of First Embodiment—No. 1

In the first embodiment described above, ROM 91 in which data corresponding to addresses was employed to write data through a read-only signal line, i.e., address signals are handled as addresses, and the transfer of data is realized by using ROM 91 in which data having correlation to the addresses are stored. However, the writing of data using a read-only signal line is not limited to this configuration; e.g., a configuration is possible in which part of the addressing at the time of read out is latched directly as data. This configuration, as shown in FIG. 9, employs tristate buffer 191 instead of ROM 91 to perform the address-data conversion function.

When data is transferred from electronic control device 10 in this configuration, CPU 31 of electronic control device 10 reads data at the effective address (YY00h+Dh) determined by both the previously set address YY00h as an index and the displacement (lower 8 bits in this case) of data D to be transferred. Logic array 77 at this time opens tristate buffer 191 and outputs lower 8 bits of the address, while it also sends the signal DL to latch 82 and causes latch 82 to hold the lower 8 bits of the address output by tristate buffer 191.

As a result, data D to be transferred is held in latch 82, where it is readable by CPU 71 in cartridge 3, as in the case of the previous embodiment. Transfer of this data to the RAM by CPU 71 is the same as in the previous embodiment. By means of this configuration, only the tristate buffer need be used instead of the ROM thereby simplifying the configuration and reducing the cost. Further, if a ROM is used, time must be allowed for reading data from ROM. However, in the configuration shown in FIG. 9, this read time is not required, thus facilitating high speed data transfer.

H. Example Modification of First Embodiment—No. 2

Further, instead of a configuration that latches the output of tristate buffer 191 in latch 82, a configuration is possible, as shown in FIG. 10, that stores the lower 8 bits (AD0–AD7) of the address, which is the data being transferred, directly in the RAM in cartridge 3. This configuration can be realized using three tristate buffers 291, 292 and 293 and RAM 295. Each of the elements are connected as follows.

The most significant 4 bits (AD23–AD20) of the 24-bit address signal (AD23–AD0) from electronic control device 10 are connected to an address decoder, which is not shown, and function to cause a specific area to become a write area for data and another area to become a read area. In this example, the addresses [AD23, AD22, AD21, AD20] become [1000], i.e., the most significant 4 bits show the eighth which is decoded as a range of the write area, and when the addresses [AD23, AD22, AD21, AD20] become [1001], i.e., the most significant 4 bits show the ninth which is decoded as a range of the read area.

The remaining 20 bits of the address signals AD19 to AD0, however, are connected as follows. Of the address signals AD19 to AD0, the least significant 8 bits (AD7–AD0) are connected to the input side of tristate buffer 291, the next 12 bits (AD19–AD8) are connected to the input side of second tristate buffer 292, and the lower 12 bits (AD11–AD0) are connected to the input side of third tristate buffer 293. The outputs of first and second tristate buffers 291 and 292 are enabled when an address corresponding to a write operation on RAM 295 is accessed. At other times, the outputs are at a impedance state. The output of first tristate buffer 291 is connected to the data lines of RAM 295. The output of second tristate buffer 292 is connected to addresses RA11–RA0 in RAM 295.

The ouput of third tristate buffer 292 is enabled when an address corresponding to a read operation is accessed, and at all other times it is high impedance. This output has a wired OR connection with the output of second tristate buffer 292 and is input to addresses RA11–RA0 in RAM 295. The RAM 295 has a 4-kilobyte capacity, and its effective addresses are 12 bit, i.e., from 000h to FFFh.

When electronic control device 10 writes the data DDh to a prescribed address (e.g., C5Ah) in RAM 295 in cartridge 3, the contents of the address 8C5ADDh may be read out. Since access of the addresses 8XXXXXh by electronic control device 10 is judged as a write operation, the outputs of first and second tristate buffers 291 and 292 are enabled, i.e., the RAM 295 goes to a write mode, the addresses AD19–AD8 from electronic control device 10 are output to the addresses RA11–RA0, and the data DDh is written to that addresse because the signals of AD7–AD0 are passed as the data of RAM 295 through buffer 192 which is enabled.

When electronic control device 10 reads the contents of a prescribed address (e.g., C5Ah) in RAM 295 in cartridge 3, the contents of the address 9XXC5Ah can be read. Since access of the address 9XXXXXh by electronic control device 10 is judged as a read operation, the output of third tristate buffer 293 is enabled. In other words, RAM 295 is set to a read mode, the addresses AD11–AD0 from the electronic control device 10 are output to the addresses RA11–RA0, and the contents of these addresses are read. By using this configuration, electronic control device 10 can write to or read from any desired address in RAM 295 in cartridge 3.

[II] Second Embodiment

Reference is now made to a second embodiment of this invention. This embodiment combines cartridge 503 as an accessory control device with laser printer 500 as an electronic apparatus. Laser printer 500 uses a xerography unit as in the main printer unit of the first embodiment, and the part that prints using a photosensitive drum functions independently as laser engine 505. Electronic control device 501, which performs control of entire laser printer 500, can perform printing by only sending commands to laser engine 505 via connector CN 10 and transferring image data to a prescribed buffer.

As shown in FIG. 20, inside electronic control device 501 are disposed a commonly used CPU (e.g., Motorola's MC68000), ROM 511 that stores the programs executed by CPU 510, a RAM where print data or image data subsequent to being developed are stored, data input port 514 that receives print data from host workstation 507, line buffer 515 connected to bus line 516 which exchanges data with cartridge 503, register 517 for exchanging commands and status information with laser engine 505, console panel I/F 519 that serves as the interface with console panel 518 of laser printer 500, and double-buffer circuit 520 where the image data to be transferred to laser engine 505 is stored. The bus line configuration and the control line configuration are the same as set forth relative to the first embodiment and so they are simplified in this figure.

Double-buffer circuit 520 is equipped with RAMs 520A and 520B, capable of holding 8 lines of print data, i.e., 4-kilobyte capacity, for printing by laser engine 505, and image data from CPU 510 are written alternately to these RAMs by memory write controller 520C. Laser engine 505 performs printing by reading these two RAMs 520A and 520B alternately via memory read controller 520D and converting the image data to a video signal in sync with the rotation of the photosensitive drum. These two RAMs 520A and 520B are provided and written and read alternately because access from CPU 510 and access from laser engine 505 must be performed independently.

After CPU 510 has written data to one RAM, it sets a flag at a prescribed bit in register 517. In response, the laser engine checks this flag and reads the image data stored in the one RAM where the data was written to. During reading, it sets a flag at another bit in register 517 to let CPU 510 know which RAM is being read. Since the other RAM is not accessed by laser engine 505 at this time, CPU 510 writes the next 8 lines of image data into the other RAM during this time period. When laser engine 505 finishes reading data from one RAM, it then resets the flag and switches to reading data from the other RAM. Since the speed with which CPU 510 writes data is faster than the speed with which laser engine 505 reads data, i.e., speed with which printing is executed, it is easy to avoid interference between memory access by the two and realize the reliable transfer of one page of image data.

Cartridge 503 is mounted in connector CN11 of electronic control device 501. The relationship between laser printer 500 and cartridge 503 mounted in it is the same as in the first embodiment in that electronic control device 501 judges whether or not cartridge 503 is installed in connector CN11 at the time of power on, and if it is judged to be installed, then after initialization of device 501, it jumps to a prescribed address in the ROM, which is described in further detail later, provided in cartridge 503, after which the processing provided in cartridge 503 is executed in sequence. Cartridge 503 interprets the program generated by the page description language and output from workstation 507 to laser printer 500 and develops it into image data and laser engine 505 performs printing, which are the same as in the first embodiment.

B. Structure of the Cartridge

Cartridge 503 of this embodiment, which is installed in cartridge connector CN11 of printer 500 has a structure like that shown in FIG. 12 in which a multilayer printed circuit board is inserted between an upper case 521U recessed on the inside and a plate-like lower case 521L and cap 540 is inserted on the connector side of printed circuit board 550. Microprocessor 601, to be described below, as well as other circuit elements are mounted on printed circuit board 550. Both upper case 521U and lower case 521L are made from aluminum. Due to the high heat conductivity of aluminum, the heat generated by the internal elements can be effectively carried outside and released.

Two grounding spring members 522 for securing a ground connection with the main printer unit are fixed to the lower case 521L with rivets 524, and a cylindrically shaped piece of silicon rubber 526 for applying pressure on printed circuit board 550 up from below is fitted in rubber retainer 528 on the inside surface of the lower case. Silicon rubber 526 for applying pressure is disposed directly below microprocessor 601. A sheet shaped piece of silicon rubber 552 for radiating heat is positioned between the top surface of microprocessor 601 and the inside surface of upper case 521U to improve contact and heat conductivity. When cartridge 503 is assembled, silicon rubber 526 for applying pressure pushes up on printed circuit board 550 to improve the contact between microprocessor 601, silicon rubber 552 for radiating heat and upper case 521U. As a result, good conductivity of heat from microprocessor 601 to upper case 521U is achieved, thus efficiently radiating heat up and away from the microprocessor.

In assembly, first upper case 521U is turned upside down and silicon rubber 552 for radiating heat is fixed in a prescribed position on upper case 521U, after which printed circuit board 550 is secured to the inside of the upper case by one screw 560. Lower case 521L is then fitted in upper case 521U and each of the corners are secured in place with screws. The cartridge is then completed by inserting cap 540 in the cap opening between upper case 521U and lower case 521L.

FIG. 13A is a plan view showing the top of the printed circuit board 550, and FIG. 22B is a plan view showing the bottom of printed circuit board 550.

As shown in FIG. 13A, microprocessor 601 is attached at one end to the top surface of printed circuit board 550, and at the other end is formed insertion plug 551 in which multiple electrodes are formed in a row for connecting to the connector of the main printer unit.

On each of the sides of printed circuit board 550 near the microprocessor are disposed four ROMs 606–609 for storing the control program and other data and software programs for the operation of microprocessor 601. Four tristate buffers 617 are disposed in a square pattern in the center of printed circuit board 550 next to microprocessor 601. Four dynamic RAMs 611–614 are arranged in a row between the ROMs 606–609 and plug 551 and between tristate buffers 617 and plug 551. To simplify the drawing, the wiring pattern formed on the surface of printed circuit board 550 is omitted.

Microprocessor 601 is a pin grid array (PGA) type element, and the other elements are SOJ, SOP or QFP types of elements. AMD Corporation's Am29030 RISC processor (25 MHz clock frequency), for example, may be employed as microprocessor 601.

As shown in FIG. 13B, plug 551 is also formed at one end on the bottom surface of printed circuit board 550. Further, pins 601p of microprocessor 601 protrude at the other end. Two tristate buffers 619 are disposed on each side of microprocessor 601. ASIC chip 603 contains the control circuit and registers for microprocessor 601 and is disposed in a position in the center of printed circuit board 550 toward plug 551.

EEPROM 670, stores the configuration of the main printer unit (number of pages to be printed, paper size, margins, fonts, communication parameters and other parameters related to the operation of the printer) and is disposed on the side of printed circuit board 550 near ASIC chip 603. Next to EEPROM 670 is disposed a ROM 618, which stores the program for operating the microprocessor of the main printer unit.

On the side opposite EEPROM 670 are disposed two oscillators 661 and 665. First oscillator 661 is a circuit that generates a signal which becomes the basis for the clock signal of microprocessor 601 and generates a 50 MHz clock signal, for example. Second oscillator 665 is a circuit that generates a clock signal for use in the interval timer processor and generates a 5-MHz clock signal, for example. By providing oscillator 661 exclusively for microprocessor 601 in this manner, the clock frequency of microprocessor 601 may be easily changed by merely replacing oscillator 661.

Next to oscillator 665 are disposed reset element 637, FIFO memory 621 and NAND gate 680 in a row along the edge of printed circuit board 550. Five tristate buffers 684–688 are disposed in a row parallel to plug 551.

As shown in FIGS. 13A and 13B, the longitudinal direction of rectangular elements is arranged in the direction of insertion of cartridge 3 on both the top and bottom of printed circuit board 550. This arrangement facilitates the flow of air, as indicated by the arrows, from plug 551 toward microprocessor 601 thereby contributing to cooling of microprocessor 601.

As described above, cartridge 3 is inserted in the cartridge insertion opening of the main printer unit. Regular font cartridges only house ROM memory in which font data is stored. In contrast to this approach, cartridge 3 of this invention is equipped with a microprocessor 601, ROMs 606–609 in which the processing program for microprocessor 601 is stored, a ROM 618 in which the processing program for the processor in the main printer unit is stored and a control circuit including ASIC chip 603.

FIG. 14 shows the wiring relationship between the plug 551 formed on the end of printed circuit board 550 and connector CN11. Plug 551 has 25 terminals formed on each of the two sides (side A and side B) of the two-sided printed circuit board. FIG. 14 lists the signal names corresponding to each of the terminals of plug 551. The slash (/) attached to the front of signal names indicates that the signal is low active. The meaning of each of the signals is as follows.

Signal /ASB: address strobe signal output by CPU 510 (MC68000, Motorola Corporation).

Signal /UDS: upper data strobe signal output by CPU 510.

Signal /LDS: lower data strobe signal output by CPU 510.

Signal /ADS: auxiliary address strobe signal generated based on address strobe signal /ASB in electronic control device 501. This auxiliary address strobe signal /ADS demonstrates different behavior in different types of printers when the printer is initialized. In this embodiment, as described below, the printer type is judged based on the behavior of this auxiliary address strobe signal /ADS at the time of initialization.

Signal /ODTACK: output data acknowledge signal for when data is transferred from cartridge 503 to electronic control device 501.

Signal /CTRGSEL: cartridge selection signal when CPU 510 selects cartridge 503 and accesses ROM 56, register, etc., assigned to the address space inside the cartridge.

Signals A1–A20: address signals output by CPU 510.

Signals D0–D15: output signals from cartridge 503.

Signal R/W: read-write signal output by CPU 510.

Signal SCLK: clock signal output from the oscillator (not shown) built into laser printer 500.

The signal /CTRGS supplied to laser printer 500 becomes low level when cartridge 503 is inserted, and CPU 510 detects that cartridge 503 has been inserted in connector CN11 in this manner.

CPU 510 specifies word addresses using the 23-bit address signals A1 to A23, and it specifies the upper byte and lower byte of each word using the signals/ UDS and /LDS. As a result, CPU 510 is capable of using the 16-megabyte address space from 000000h to FFFFFFh. The "h" added to the end of the address here is a hexadecimal indicator.

C. Address Space of the Cartridge

Cartridge 503 is assigned to part of the address space handled by CPU 510 in electronic control device 501. CPU 510 handles the 16-megabyte address space from 000000h to FFFFFFh, and part of that is set aside for the ROM cartridge. The space assigned cartridge 503 differs depending on the type of laser printer, but in the case of a Hewlett Packard laser printer, normally the 2-megabyte space from 200000h to 3FFFFFh or from 400000h to 5FFFFFh is assigned as shown on the left side of FIG. 15.

Microprocessor 601 disposed in cartridge 503 of this embodiment is a 25-MHz AMD29030 produced by AMD Corporation, and the address space it can handle is 4 gigabytes from 00000000h to FFFFFFFFh. This address space is assigned to not only ROM or RAM but also to the various registers, etc., used to exchange data with electronic control device 501 in the printer. This is shown in FIG. 25. Below, the internal electrical configuration of cartridge 503 is explained together with the address space assignments for both microprocessors.

D. Internal Configuration of the Cartridge

The internal configuration of cartridge 503 is shown in FIG. 17. As shown in the figure, cartridge 503 is configured around microprocessor 601, which handles all control, and comprises mainly memory section 602 made up of the ROM, RAM and their peripheral circuitry, data transfer controller 603, which handles all exchange of data with electronic control device 501, and other circuits.

Memory section 602 comprises ROMs 606–609, totaling 2 megabytes, where the programs executed by microprocessor 601 are stored, selector 610 for facilitating use of ROMs 606 to 609 by bank selection, and RAMs 611–614, totaling 2 megabytes, where the print data from electronic control device 501 is stored or the image data after being developed is stored. ROMs 606 to 609, totaling 2 megabytes, are each 4-megabit (16 bits×256 kilobits) mask ROM, and as shown in FIG. 16, they are assigned the address space 00000000h to 001FFFFFh. ROMs 606 and 607 and ROMs 608 and 609 each make up a bank, and each bank of two make up a 32-bit data bus. ROMs 606–609 and microprocessor 601 are connected via the address bus AAB and the control signal bus. Further, the data bus IDB of ROMs 606–609 is connected to data bus DB29 via data selector 610, whereby microprocessor 601 is capable of reading data from ROMs 606–609.

Except for the least significant 3 bits (A0, A1, A2) of address bus AAB from microprocessor 601, all address signals are input to ROMs 606 and 607 and ROMs 608 and 609. The least significant 2 bits (A0 and A1) are not input because the reading of data by microprocessor 601 is done in 1-word=32-bit units (4-byte units). Also, since address A2 is not assigned, when data of a prescribed area is read, four ROMs 606–609 simultaneously output data. In other words, since access of ROM by microprocessor 601 is often performed on consecutive addresses, two consecutive words, where one word is 32 bits, are read from ROMs 606–609 at one time, and when words that are actually consecutive are read, the bank to which the ROM belongs is sequentially switched by data selector 610 to facilitate the reading of contiguous data. As a result, the reading of data in two contiguous words is extremely fast.

RAMs 611–614, on the other hand, are 16-bit×256-kilobit=4-megabit DRAM, and as shown in FIG. 16, they are assigned to the two megabytes of address space from 20000000h to 201FFFFFh. The memory in cartridge 503 can be increased by 2 megabytes, for which expansion RAM interface 615 is provided. Expansion RAM interface 615 is assigned to the address space from 20200000h to 203FFFFFh. A SIMM type RAM up to 2 megabytes can be installed in expansion RAM interface 615. It is not necessary to limit the expansion RAM to a SIMM type RAM, as it can also be a memory card with a built-in semiconductor memory or a laser card that stores data using the photoelectromagnetic effect.

The data line of RAMs 611–614 and expansion RAM interface 615 are connected directly to data bus DB29 of microprocessor 601, and the address line is connected to address bus AAB of microprocessor 601 via data transfer controller 603. The I/O of each of the registers, etc., described below is assigned to the address space beginning from 80000000h.

When cartridge 503 is seen from electronic control device 501 of printer 500, the ROM is assigned the top 128 kilobytes as shown on the right side of FIG. 15. In other words, cartridge 503 contains the program executed by CPU 510 of electronic control device 501. When cartridge 503 is installed, CPU 510 executes a jump instruction to go to a prescribed address in this ROM upon completion of initialization. Following this, CPU 510 operates according to the procedure stored in this ROM.

When CPU 510 accesses this 128-kilobyte space beginning from the top of the 2-megabyte space assigned to cartridge 503, ROM 618 is accessed by the address signal output via address buffer 617 provided in address bus CAB for the connector of cartridge 503, and the instructions and data stored in ROM 618 is sent to CPU 510 in electronic control device 501 via data buffer 619 provided in data bus CDB for the connector. In FIG. 15, "X" indicates the value of the most significant 4 bits of the top address of the assigned space.

E. Explanation of Data Transfer Controller 603

In the address map shown in FIG. 15 and FIG. 16, addresses other than the addresses assigned to ROM and RAM contain the various control registers and status registers. Since these registers are realized by data transfer controller 603, the data transfer controller will be explained next. The explanation will center around the circuitry, but the address maps shown in FIGS. 15 and 16, are referred to as required.

Data transfer controller 603, shown in FIG. 17, is realized by means of an ASIC gate array 7900. This ASIC is a standard cell, model No. SSC3630, produced by and available from Seiko Epson Corporation, and it is a low-power element manufactured by CMOS processing. Data transfer controller 603 was designed employing Seiko Epson's ASIC design system, LADSNET, which is a CAD system. This CAD system contains latches, flip-flops, counters, programmable logic arrays and other elements used in logic circuit design in the form of libraries, and after the required logic circuit is designed using these, the pattern of the ASIC can be automatically generated.

Data transfer controller 603, realized as an ASIC chip, controls the exchange of data between CPU 510 of electronic control device 501 and microprocessor 601 of cartridge 503 when cartridge 503 is installed in connector CN11 of printer 500. The exchange of data between these two is realized by means of read control circuit 620 for sending data from electronic control device 501 to cartridge 503 via the read-only data bus, FIFO control circuit 623, which performs the same function by passing data via FIFO memory 621 using part of the configuration of read control circuit 620, and double-bank control circuit 624, which makes it possible to read data prepared by cartridge 503 from electronic control device 501. The FIFO memory 621 is a RAM that stores and reads data based on a first-in-first-out procedure. In this embodiment, the RAM employed is Mitsubishi Electric's M66252FP.

The address bus CAB is connected to data transfer controller 603 via address buffer 617 and data bus CDB is connected to electronic control device 501 via data buffer 619 as signal lines with electronic control device 501. Inside data transfer controller 603 is first decoder 631 that receives the signal of address bus CAB and cartridge select signal CSEL and outputs a selection signal to the respective parts inside data transfer controller 603. In a similar manner, address bus AAB and control signal CCC from microprocessor 601 are connected to data transfer controller 603, and inside data transfer controller 603 is second decoder 632 that receives address bus AAB and outputs a selection signal to each of the internal circuits. There is also a bus controller that receives address bus AAB and control signal CCC and outputs address signals and control signals to ROMs 606–609, RAMs 611–614 and expansion RAM interface 615.

In addition to these, data transfer controller 603 also contains various registers, a number of which are automatically written to when a specific process is performed in addition to those that are read from and written to by normal read-write operation. The configuration of these special registers is described below. In a relationship that treats cartridge 503 as a read-only device as seen from electronic control device 501, the registers addressable from electronic control device 501 have a configuration whereby they are written to by performing read function from a prescribed address. In other words, by specifying a prescribed address, a selection signal is output from first decoder 631, and data is written to the register by means of this signal. Reading from the register is performed by a normal read cycle. Further, the reading and writing of data from microprocessor 601 is performed by normal read-write operation. In FIG. 17, registers are shown connected to a readable bus and writing operation is indicated by only arrows. These registers include interrupt request registers 640, polling command registers 643, status registers 645 (STATUS register in FIG. 15), transfer flag registers 647 (BPOLL register in FIG. 16), PROM control registers 649 and control registers 650.

Except for status registers 645 and transfer flag registers 647, all of these registers are generic names for multiple registers assigned as memory mapped I/O to CPU 510 of electronic control device 501 or microprocessor 601 of cartridge 503. The multiple registers are not necessarily assigned contiguous addresses. Interrupt request registers 640 include registers AMDINT0, -1 and -2 and registers AMDCLR0, -1 and -2, shown in FIGS. 15 and 16. Polling command registers 643 include the register POLL and the register MCONTCS. The PROM control registers include the registers EEPCS, EEPSK and EEPDI.

Control registers 650 include those registers not belonging to read control circuit 620, FIFO control circuit 623 and double-bank control circuit 624 and are all those registers not mentioned in the above explanation. These are the registers ADDMUXA, ADDMUXB, CLKDIV, RTCVAL, RTCON, RTCSEL, RTCCLR and SYSKEEP shown in FIGS. 15 and 16.

Each of the 512-byte areas EWWRL and EWWRH shown in the memory maps in FIGS. 15 and 16 are used to write from electronic control device 501 to first and second latches 651 and 652 of read control circuit 620, and register EWRD corresponds to these latches 651 and 652, seen as one word from microprocessor 601. The registers FIFOREQ, FIFORST and FIFOWR correspond to FIFO register 653 of FIFO control circuit 623, and the registers FIRCLK, RDCLK, FIFORD and RDRST correspond to FIFO read register 655 of FIFO control circuit 623. FIFO control circuit 623 has latch 657 that uses some of the functions of read control circuit 620 to retain the data to be written to FIFO memory 621.

The area indicated by the codes DPRAMA and DPRAMB in FIG. 15 are buffers with a 32-byte capacity, and they correspond to first and second buffers 658 and 659 of double-bank control circuit 624 as seen from electronic control device 501. These buffers 658 and 659, as seen from microprocessor 601, are the banks DPWROA and DPWROB shown in FIG. 16. The prescribed bits d1 and d2 of status register 645 are used in the exchange of data via double-bank control circuit 624, which will be discussed in detail later.

F. Explanation of the Registers

Interrupt request register 640 generates the request for an interrupt from electronic control device 501 to microprocessor 601 and retains it. Interrupts from electronic control device 501 to microprocessor 601 are prepared in three levels, and as shown in FIG. 15, they have three registers (AMDINT0, -1, -2). By reading one of these interrupt request registers 640 from electronic control device 501, an interrupt request for microprocessor 601 is generated. These registers are set by a read operation from electronic control device 501, but the data read has no meaning and is not related to the generation of an interrupt request.

Specific examples of configurations of these interrupt request registers 640 are shown in FIGS. 18. These registers are configured from D-type flip-flops, and the output terminal Q of each of the flip-flops 640a, -b and -c are set to active low by the signals /AMDINT0, -1 and -2 output by first decoder 631 by the read operation of the above registers from electronic control device 501, resulting in the output of the interrupt signals /INT0, -1 and -2. The slash (/) affixed to the front of signal names indicates that signal is low active (same below). The registers that clear the outputs of these flip-flops 640a, -b and -c are assigned, as shown in FIG. 16, to prescribed addresses as three read-only registers (AMD-CLR0, -1, -2). Therefore, when reading of each of the addresses assigned to these registers is performed by microprocessor 601, second decoder 632 outputs each of the signals /INTCLR0, -1 and -2), and the corresponding flip-flops are preset.

When an interrupt request is given from electronic control device 501, any of interrupt request registers 640 can be accessed, and microprocessor 601 judges the precedence and performs processing in response to the interrupt requests. In this case, microprocessor 601 clears corresponding interrupt request registers 640a, -b and -c. Signals, such as, PUP2 that start with the code PUP are signal outputs from the reset signal output circuit 637 and become low level at the time of feet. The signal PUP2 shown in FIG. 18 is used to clear three interrupt requests at once.

Polling command registers 643 are used to pass commands from microprocessor 601 to electronic control device 501, and these registers are written to by microprocessor 601 and readable by electronic control device 501. An example of a hardware configuration of these registers is shown in FIG. 19. As shown in the figure, polling command registers 643 comprise two octal D-type flip-flops 643a and -b and one D-type flip-flop 643c, which make up a 16-bit-wide data latch.

Data bus DB29 (16-bit-wide bus) from microprocessor 601 is connected to data input terminals 1D-8D of the octal D-type flip-flops 643a and -b, and data bus DB68 (16-bit-wide bus) from electronic control device 501 is connected to output terminals 1Q-8Q. The signal /MCONTCS output from second decoder 632 at the time of access (register MCONTCS in FIG. 16) of polling command registers 643 by microprocessor 601 is connected to clock terminal CK of the octal D-type flip-flops 643a and -b, and when this signal becomes active low, the contents of data bus DB29 of microprocessor 601 are latched in octal D-type flip-flops 643a and -b. Further, the signal /POLL output from first decoder 631 at the time of access (register POLL in FIG. 15) of polling command registers 643 by electronic control device 501 is connected to output-enable terminal OE, which enables the output of octal D-type flip-flops 643a and -b, and when this signal becomes low active, the data latched in octal D-type flip-flops 643a and -b are output to data bus DB68 of electronic control device 501. The signal /MCONTCS and the signal /POLL are connected to clock terminal C and preset terminal PR of D-type flip-flop 643c, and the signal CMDRD from the output terminal Q is set to high level when octal D-type flip-flops 643a and -b latch data (signal /MCONTCS is low level) and to low level when this data is read by electronic control device 501 (signal /POLL is low level). The signal CMDRD output from D-type flip-flop 643c becomes prescribed bit d3 (flag CMDRD below) of status registers 645, which is readable by electronic control device 501. Therefore, when electronic control device 501 reads status registers 645, electronic control device 501 can know that a command was set in polling command registers 643 from microprocessor 601.

When electronic control device 501 looks at flag CMDRD, which is bit d3 of status registers 645, and knows that the command has been sent, it reads the contents of polling command registers 643, i.e., command sent from microprocessor 601, in a normal read cycle. The command may be an instruction to begin transfer of the print data to data transfer controller 603, an instruction to begin printing or the display of a message in console panel 518. When electronic control device 501 reads the contents of polling command registers 643, the output signal CMDRD of D-type flip-flop 643c is inverted to high level by the signal /POLL as shown in FIG. 19. Therefore, microprocessor 601 can determined whether or not the command it provided as an output was read by electronic control device 501 by monitoring the prescribed bit d2 of transferred flag register 647.

In addition to the above-described information that indicates the whether or not a command has been set from microprocessor 601, status registers 645 also hold the information shown in FIG. 20. A description of each bit is as follows. Bit d0 is set to low level by the signal EWRDY generated in read control circuit 620 when data is written to read control circuit 620 from electronic control device 501, and when this data is read by microprocessor 601, bit d0 is set to high level by a signal from second decoder 632. This bit is called flag EWRDY.

Bits d1 and d2 indicate whether double-bank control circuit 624 can be accessed from electronic control device 501 or microprocessor 601, and are respectively referred to as flag ADDMUXA and ADDMUXB. These two bits correspond respectively to the two transfer banks built into double-bank control circuit 624. These bits d1 and d2 are set and reset by microprocessor 601 writing data to bit d0 of the registers ADDMUXA and ADDMUXAB included in the control registers 650 as shown in FIG. 16. Therefore, by setting this flag to low level before microprocessor 601 writes data to one of the banks of double-bank control circuit 624 and resetting it to high level upon completion of writing and having electronic control device 501 read data from the bank for which the flag is high level, data can be passed continuously from microprocessor 601 to electronic control device 501 by alternately writing data to and reading data from these two banks.

Bit d3 (flag CMDRD) has already been described. Bit d5 is flag CLKDIV, which is set based on the operation clock of microprocessor 601. The operation clock of microprocessor 601 is the clock CLK output from first oscillator 661, which employs externally attached liquid crystal vibrator CRC1, and when microprocessor 601 writes level 0 to the prescribed bit d0 of register CLKDIV of control register 650, the operation CLK of microprocessor 601 becomes 25 MHz, and when level 1 is written to bit d0, then the operation clock becomes 12.5 MHz. The flag CLKDIV of status registers 645 as seen from electronic control device 501 is set to a low level when this clock CLK is 25 MHz and is set to a high level when it is 12.5 MHz. When it is necessary for electronic control device 501 to know the frequency of the operating clock, i.e., operating speed, of microprocessor 601 in order to match timing for data transfer, etc., it checks this bit of status registers 645.

Bit d6 is the flag ADMON, which is set to high level when microprocessor 601 is operating and to low level when it enters the sleep mode. In this embodiment, microprocessor 601 performs processing that receives the page description language from electronic control device 501 and develops it into image data, and therefore when a prescribed amount of time has elapsed during which no page description language to be processed is sent from electronic control device 501, microprocessor 601 reduces its initial operating frequency by one half to 12.5 MHz in order to reduce power consumption, and after more time has elapsed, it stops its own operation and enters the so-called "sleep mode." At this time, microprocessor 601 writes level 0 to register ADMON of control register 650. As a result, this bit d6 of status registers 645 becomes low level as seen from electronic control device 501, and by checking this bit, electronic control device 501 can know the operating mode of microprocessor 601.

This time is measured with a real-time clock built into data transfer controller 603. The clock RCLK for this real-time clock is a clock from second oscillator 667 configured using an externally attached liquid crystal vibrator 665. The real-time clock is disposed inside bus controller 635, and it receives instructions from microprocessor 601 to measure the elapse of prescribed time periods. The reason why two sets of liquid crystal vibrators and oscillators are employed is to make it possible to change the operating clock CLK of microprocessor 601 independently of the operating clock RCLK of the real-time clock.

The real-time clock sets the d1 bit of registers RTCVAL and RTCSEL, which belong to control registers 650, to low or high, and it is capable of specifying four interval timers, which it can start by writing level 1 to the prescribed bit d0 of the register RTCON. A timer that has been started outputs an interrupt request signal to microprocessor 601 at prescribed intervals until level 0 is written to bit d0 of register RTCON and it is stopped. When microprocessor 601 receives this interrupt request signal, it reads register RTCCLR and clears the interrupt request. The output of these interval timers are used for counting user time, etc., in the processing of the page description language.

Next is an explanation of the configuration of PROM control registers 649. PROM control registers 649 include the registers EEPCS, EEPSK and EEPDI, shown in FIG. 16, but these registers are memory built into cartridge 503 and are used to exchange data with EEPROM 670, which is capable of electrical erasure and rewriting of data.

Cartridge 503 of this embodiment stores the various variables (configuration) required for operation of laser printer 500 in EEPROM 670. EEPROM 670 is one that reads, erases and writes data by serial transfer. In this embodiment the EEPROM employed is National Semiconductor's NMC93C66X3. EEPROM 670 has a storage capacity of 16 bits×256 bytes (number of registers) and is capable of reading, erasing or writing the contents of any specified register. When EEPROM 670 is set to a selection condition by the chip select signal CS, the "0" and "1" data sent to the serial data input terminal $D_{in}$ is received in sync with the serial data clock SL, but the first three transferred bits of the data is interpreted as a command to the EEPROM, and the next 8 bits are interpreted as the register number where the data is to be read, erased or written. In the case of writing data, the data to be stored are supplied to the data input terminal $D_{in}$ in sync with the serial data clock SL following these command and register specifications.

The register EEPCS switches the chip select signal, and when microprocessor 601 writes level 1 to bit d0 of this register, EEPROM 670 goes to a select condition. Register EEPSK generates the serial data clock SK, and when microprocessor 601 alternately writes level 0 and level 1 to this register, it generates the serial data clock for EEPROM 670. The register EEPDI holds the 1-bit data to be written to EEPROM 670, and microprocessor 601 rewrites to the register EEPSK and rewrites the prescribed bit d0 of register EEPDI according to the data to be written in sync with the generation of the serial data clock SK. The data output terminal $D_{out}$ of EEPROM 670 is the prescribed bit d0 of the transfer flag register 647 explained above, and if microprocessor 601 reads bit d0 of the transfer flag register 647 in sync with the serial data clock SK after it outputs the data read command and the number of the register to be read to EEPROM 670, then it can read the contents of the specified register. Since the data stored in EEPROM 670 is retained even after the power is turned off, the contents of EEPROM 670 can be read immediately after laser printer 500 is powered on again, thus making it possible to return the configuration to the condition it was in immediately before powering off.

G. Configuration and Operation of Read Control Circuit 620

Next, an example configuration of read control circuit 620 and a data transfer procedure using read control circuit 620 are explained. Read control circuit 620 comprises two 8-bit first and second latches 651 and 652 in addition to, as shown in FIG. 21, ROM 671 that outputs the data required for transfer, three-input AND gate 672, and D-type flip-flop 674 that generates the flag EWRDY (bit d0) for status registers 645. When read control circuit 620 is viewed from electronic control device 501, these latches correspond to two registers EWWRL and EWWRH, which transfer data in 8-bit units, as shown in FIG. 15. These registers are used to transfer the lower byte and upper byte, respectively, of the 16-bits/word data. First and second latches 651 and 652 correspond to the register EWRD shown in FIG. 16 when viewed from microprocessor 601. In other words, microprocessor 601 can read both latches 651 and 652 as one word via data bus DB290.

ROM 671 of read control circuit 620 stores 256 bytes of data; e.g., it can be realized with a one time PROM, a low-capacity PROM, etc. Of course it may also be realized using part of a large-capacity ROM, and the same function can be achieved when RAM is used by transferring the data in advance. The lower 8 bits (AC1–AC8) of the address line from connector address bus CAB are connected to address terminals A0–A7 of ROM 671, and the data terminals 00–07 are connected to the inputs 1D–8D of first latch 651 and second latch 652. The outputs of ROM 671 are also output to FIFO control circuit 623 as data bus Z0–Z7 for FIFO control circuit 623.

The outputs of first latch 651 and second latch 652 are connected to data bus DB29, and these can be read by microprocessor 601 as the register EWRD. The output signal /EWROM of three-input AND gate 672 is input to chip select CE and output-enable OE of ROM 671, and when any one of the signals /EWWRH, /FIFOWR and /EWWRL input to three-input AND gate 672 becomes low active, this signal becomes active, at which time ROM 671 outputs the data at the address specified by the lower 8 bits of connector address bus CAB.

The signal /EWWRH becomes low level when transfer of the upper byte is specified by read control circuit 620, the signal /EWWRL becomes low level when transfer of the lower byte is specified by same, and the signal /FIFOWR becomes low level when data transfer is specified by FIFO control circuit 623. Since the signal /EWWRL and the signal /EWWRH are input to the clock terminals CK of first latch 651 and second latch 652, respectively, when these signals become active and data is output from ROM 671, this data is held in first latch 651 and second latch 652. Moreover, since the signal /EWWRL is input to the clock terminal C of D-type flip-flop 674, the output Q of D-type flip-flop 674 is inverted to low level when the lower byte is transferred. The output EWRDY is handled as bit d0 of status registers 645 and bit d1 of transfer flag registers 647, i.e., flag EWRDY.

First latch 651 and second latch 652 are handled as register EWRD by microprocessor 601, and therefore when microprocessor 601 goes to read the data held by first latch 651 and the second latch 652, it performs a read operation on the register EWRD. At this time, the signal EWRD becomes low level, and this signal outputs the previously held data from the output side of first latch 651 and second latch 652, i.e., to data bus DB29, connected to the output-enable terminal. This signal /EWRD is connected to the preset terminal PR of D-type flip-flop 674, and, therefore, the signal EWRDY, which is the Q output of D-type flip-flop 674, is inverted to high level at the same time microprocessor 601 reads the data of first latch 651 and second latch 652. In other words, the flag EWRDY, which is bit d0 of status registers 645 and bit d1 of transfer flag registers 647, is set to level 1.

Assuming this hardware, electronic control device 501 and microprocessor 601 transfer data from electronic control device 501 to microprocessor 601 according to the following procedure. The data to be transferred from electronic control device 501 to microprocessor 601 is print data electronic control device 501 has received from workstation 507 and is the page description language program to be processed in microprocessor 601 in cartridge 503. Data transfer by read control circuit 620 is performed by the routine for handling data transfer to cartridge 503 executed by CPU 510 of electronic control device 501 (FIG. 22) and by the data read interrupt handler routine executed by microprocessor 601 of cartridge 503 (FIG. 24).

When the print data to be transferred to cartridge 503 is accomplished, CPU 510 initiates the processing shown in the flowchart in FIG. 22, whereby it first reads the flag EWRDY (bit d0) of status registers 645 (step S700). This flag EWRDY (bit d0) becomes level 0 when data is set in first latch 651 and second latch 652 of read control circuit 620, and when this data is read by microprocessor 601, the flag is set to level 1, after which it is determined whether or not flag EWRDY has been set to level 1 (step S705).

CPU 510 is in standby condition until flag EWRDY is level 1. When it becomes level 1, CPU 510 reads the addresses corresponding to [top address of area EWWRH+ data D×2 to be transferred]. When reading of the area EWWRH is performed, the data is provided as an output from ROM 671. As shown in FIG. 23, the 256 data at the even-numbered addresses from 00h to FFh from the top address EWWRH is written in order to ROM 671. The reason why data is not positioned at odd-numbered addresses is basically because data access by CPU 510 is performed in single words (16 bits) and because word units cannot be accessed beginning from odd-numbered addresses (results in address bus error). When an address separated from the top of the area EWWRH by D×2 is read, the data D from ROM 671 is read and is latched in second latch 652 as shown in FIG. 21.

When transfer (second latch 652 holds data) of the upper byte of the data to be transferred is performed in this manner, CPU 510 performs transfer of the lower byte (first latch 652 holds data) in the same manner (step S715). Assuming one word of data is being held by first and second latches 651 and 652 as a result of the above processing, CPU 510 performs processing that sets one interrupt request register (AMDINTO in this embodiment) (step S720).

CPU 510 then repeatedly executes the transfer handler routine shown in FIG. 22, but when data is held by first latch 651, the flag EWRDY is set to a low level, as shown in FIG. 21, and, therefore, the next data transfer is not processed until flag EWRDY again becomes high or level 1 (steps S700, S705).

When CPU 510 sets the interrupt request register (AMDINTO), microprocessor 601 receives this interrupt request and initiates the data read interrupt handler routine shown in FIG. 24. This processing is initiated immediately after data is held in first and second latches 651 and 652 in read control circuit 620, and microprocessor 601 reads the one word of data prepared by electronic control device 501 by reading the register EWRD (step S730). Next, microprocessor 601 transfers the data it just read to a prescribed area in RAMs 611–614 (step S735).

By means of the processing described above, electronic control device 501 is capable of transferring data to cartridge 503, which is connected by no more than the data bus CDB, which is a read-only line. Moreover, since data is written in byte units and is read in word units, microprocessor 601 takes in data with great efficiency. This explanation covers the transfer of one word of data, but data do not have to be transferred in word units and can be transferred in byte units. In that case, only transfer that uses the area EWWRL is performed and the upper eight bits of data can be discarded by microprocessor 601.

H. Configuration and Operation of FIFO Control Circuit 623

FIFO control circuit 623 is equipped with latch 657 that latches the data to be written to FIFO memory 621, FIFO write registers 653 that control the writing of data to FIFO memory 621 and FIFO read registers 655 that control the reading of data from same. FIFO memory 621 can hold 2048 bytes of data and is equipped internally with an address counter for writing and a counter for reading. FIFO memory 621 also has a write reset terminal and a read reset terminal for resetting these respective counters, an 8-bit data bus on the write side, an 8-bit data bus on the read side, a clock terminal for writing and a clock terminal for reading.

By utilizing FIFO memory 621, CPU 510 in electronic control device 501 can employ FIFO control circuit 623 to transfer data in multiple bytes to microprocessor 601. Data transfer using read control circuit 620 is performed on a byte unit basis, whereby each time a byte of data is transferred, an interrupt request signal is output to microprocessor 601 to notify it of the transfer, while data transfer using FIFO control circuit 623 takes advantage of the function of FIFO memory 621 to combine multiple bytes for transfer. In order to transfer data from electronic control device 501 to microprocessor 601 using FIFO memory 621, CPU 510 of the electronic control device 501 executes the transfer handler routine shown in FIG. 25 and microprocessor 601 of cartridge 503 executes the handler routine shown in FIG. 26. First is an explanation of the handler routine illustrated in the flowchart of FIG. 25.

When CPU 510 of electronic control device 501 initiates the data transfer handler routine shown in FIG. 25, first the register FIFORST of FIFO write circuit 654 of FIFO control circuit 623 is read and the write address counter is reset (step S750). Next, the variable N is reset to 0 to count the number of data to be read out (step S755). Following this, the addresses [top address of register FIFOWR+data D×2 to be transferred] are read (step S760). When these addresses are read, a prescribed address in ROM 671 is accessed (see FIG. 23) in the same manner as read control circuit 620, the data D to be transferred by CPU 510 are provided as output, and is latched in latch 657 via bus Z0–Z7, shown in FIG. 21.

Next, the data D read from register FIFOREQ of FIFO control circuit 623 and held in latch 657 is transferred to FIFO memory 621 (step S765). When register FIFOREQ is read, a write clock is output to the write clock terminal of FIFO memory 621, and the data D held in latch 657 is written to the address indicated by the write address counter of FIFO memory 621. At the same time, the contents of the write address counter in FIFO memory 621 are incremented by 1. When one byte of data is written in this manner, the variable N, which indicates the number of data transferred, is incremented by 1 (step S770), and judgment is performed to determine whether the variable N is equal to the total byte number X of the data to be transferred (step S775). Therefore, the processing in steps S760 to S775 is repeated until the byte number N of the transferred data is equal to the total byte number X of the data.

When all data have been transferred, CPU 510 sets one of the interrupt request registers (AMDINT1) to notify microprocessor 601 that the transfer of data is complete (step S780), after which the routine escapes to NEXT and is terminated.

Microprocessor 601, on the other hand, initiates the data receive interrupt routine, shown in the flowchart of FIG. 26, when it receives interrupt request AMDINT1. When this routine is initiated, microprocessor 601 first reads the register RDRST in FIFO read registers 655 of FIFO control circuit 623 and resets the address counter on the read side of FIFO memory 621 (step S800). Next, the variable M for counting the number of received data is reset to 0 (step S805).

Following this, the register FIRCLK in FIFO read registers 655 is read (step S810), and the read data is transferred to a prescribed area in RAMs 611–614 (step S815). When the register FIRCLK is read, a read clock is output to the clock terminal on the read side of FIFO memory 621, and the data D at the address indicated by the read address counter at that time are read out. At the same time, the contents of the read address counter in FIFO memory 621 are incremented by 1. The reason why data is normally transferred via FIFO control circuit 623 is because it is the page description language program, and the received data is transferred immediately to a prescribed area in RAM for the development of image data.

When one byte of data is received, the variable M is incremented by 1 (step S820), and the variable M is judged whether or not it is equal to the total byte number X (step S825). Therefore, the processing in steps S810 to S825 above is repeated until the byte number M of the received data equals the total number X for the data.

When it is determined that all data has been received, microprocessor 610 writes a command to polling command registers 643 that indicates the completion of the writing of data (step S630). CPU 510 of electronic control device 501 knows that data reception by FIFO control circuit 623 is complete by reading the contents of polling command registers 643. Microprocessor 601 then escapes to RTN and terminates this routine.

By means of the processing described above, large amounts of data can be efficiently transferred from electronic control device 501 to microprocessor 601. The transferred data is stored in a prescribed area in RAMs 611–614 of data transfer controller 603 and wait for processing by microprocessor 601. Microprocessor 601 receives all of the print data (program described by the page description language) to be developed by electronic control device 501, activates the program comprising the interpreter of the page description language stored in ROMs 606–609, and processes the print data stored in the prescribed area in RAMs 611–614. This processing develops the image, and the developed result is stored as image data in a prescribed area in RAMs 611–614.

I. Configuration and Operation of Double-Bank Control Circuit 624

The image data obtained upon completion of image development is transferred to electronic control device 501, where it is stored in RAM 512 and printed by laser engine 505 according to a prescribed timing. The image data is transferred by double-bank control circuit 624. Double-bank control circuit 624 transfers from microprocessor 601 to electronic control device 501 and is equipped with two banks that store 32 bytes (16 words) of data. These are referred to as A bank and B bank. Since the hardware of both banks are the same, only the configuration for A bank is shown in FIG. 27.

The address and data buses of each of these banks are configured such that they can be switched from microprocessor 601 and from the electronic control device 501. As shown in FIG. 36, they are configured from data selectors 681 and 682, which select the address line; the four octal line buffers 684 to 687, used in two sets of two each and select the data bus (16 bits wide); RAMs 691 and 692, which have a 32-byte storage capacity; OR gates 694 and 695, which make up the other gates; and inverter 696. In FIG. 27, a configuration is shown in which two memory chips with a 32-byte storage capacity are employed, but the memory can also be achieved by switching the upper address of a single memory chip.

Data selector 681 is configured such that it selects the least significant four bits (AC1–AC4) of address bus CAB on electronic control device 501 side and the lower four bits (A2–A5) of address bus AAB on microprocessor 601 side and outputs them, and selection of the address bus is performed by the signal ADDMUXA (bit d0 of register ADDMUXA) connected to the select terminal S. Data selector 682 switches the read-write signal for RAMs 691 and 692 in addition to selecting an address bus, and in a similar manner, the signal ADDMUXA connected to the select terminal S determines which signal is connected to the chip select terminals CE1 and -2 and the output-enable terminal OE by switching them.

Octal line buffers 684 and 685 are tristate line buffers connected to data bus DB29. When the gate terminals 1G and 2G become low or level 0, data bus DB29 on microprocessor 601 side and the data bus of RAMs 691 and 692 are connected, resulting in a condition that allows writing of data from microprocessor 601 to RAMs 691 and 692. The output of OR gate 694, whose inputs are the signal /DPWROA and the signal /DDMUXA, is connected to the gate terminals 1G and 2G of octal line buffers 684 and 685. The signal /DPWROA becomes low or level 0 when microprocessor 601 writes data to A bank. Therefore, by setting bit d0 of register ADDMUXA to low level in advance of writing data to A bank, when microprocessor 601 does write data to A bank, the gates of octal line buffers 684 and 685 open and the data output to data bus DB29 is provided as output to the data bus of RAMs 691 and 692, where they are written.

When gate terminals 1G and 2G of octal line buffers 686 and 687 become low or level 0, data bus DB68 on electronic control device 501 side and the data bus of RAMs 691 and 692 are connected, resulting in a condition wherein data can be read out from RAMs 691 and 692 to electronic control device 501. The output of OR gate 695, whose inputs are the signal /DPOE1A and the signal ADDMUXA inverted in inverter 696, is connected to gate terminals 1G and 2G of octal line buffers 686 and 687. The signal /DPOE1A becomes low level when electronic control device 501 tries to read the data of A bank. Therefore, by setting bit d0 of register ADDMUXA to high level in advance of reading the data of A bank, the gates of octal line buffers 686 and 687 open and the data output to the data bus of RAMs 691 and 692 are output to data bus DB68 when electronic control device 501 performs a read operation on A bank.

The transfer processing of image data by the microprocessor 601 and its receiving processing by the CPU 510 of electronic control device 501 are explained below assuming this hardware. FIG. 28 is a flowchart illustrating the transfer start handler routine for image data executed by microprocessor 601. As shown in FIG. 37, microprocessor 601 sets a transfer start command in polling command register 643 before transferring image data (step S850).

CPU 510 of electronic control device 501 reads polling command register 643 and executes the response handler routine shown in FIG. 29. In other words, electronic control device 501 determines whether or not laser printer 500 is in a print-enabled condition (step S860), and if it determines that it is in a condition that will allow printing, then it sets one (AMDINT2) of the interrupt request registers (step S865) and escapes to NEXT and temporarily terminates the routine. If the printer is not in a condition that will allow printing, then CPU 510 performs processing that notifies microprocessor 601 of cartridge 503 (step S870). A condition that will not allow printing is one in which the laser engine has not completely warmed up yet, or there is a paper jam or other condition that will not allow printing even though the image data have been received.

When the interrupt request signal AMDINT2 is received from electronic control device 501, microprocessor 601 initiates the data transfer interrupt handler routine shown in FIG. 30. When this processing is activated, microprocessor 601 first writes level 1 to bit d0 of register ADDMUXA (step S900). When bit d0 of register ADDMUXA is level 1, the data bus of RAMs 691 and 692 is connected to data bus DB29 on microprocessor 601 side as was explained using FIG. 27, thus disabling access from electronic control device 501.

Next microprocessor 601 transfers 16 words (32 bytes) of data to A bank DPWROA (step S902). When data is written to A bank DPWROA, the signal /DPWROA shown in FIG. 27 becomes low or level 0, and the data is written to RAMs 691–692 via octal line buffers 684 and 685. Upon completion of transfer of the 16 words of data, microprocessor 601 writes level 1 to bit d0 of register ADDMUXA (step S904), and data bus of RAMs 691 and 692, which make up A bank, is connected to data bus DB68 of electronic control device 501.

Microprocessor 601 then writes the command data that notifies that transfer to A bank is complete to polling command registers 643 (step S906). This completes transfer of data to A bank, and microprocessor 601 then executes the same processing, as in the case above, with respect to B bank (step S910). When data transfer to B bank is complete, microprocessor 601 writes command data that notifies that transfer is complete in the same way to polling command registers 643. In this manner, the transfer of a total of 32 words (64 bytes) of data to A and B banks from cartridge 503 is completed.

In response to the above processing performed by microprocessor 601, CPU 510 of electronic control device 501 executes image data receive handler routine shown in FIG. 31. In other words, CPU 510 first reads bit d3 of status registers 645, i.e., flag CMDRD, (step S920) and determines whether or not it is at level 0 (step S925). When command data is written to polling command registers 643 by microprocessor 601, flag CMDRD is set to level 0, and, therefore, CPU 510 reads the command data in polling command registers 643 (step S930).

CPU 510 checks the read command data and determines if it is command data that indicates that data transfer to A bank is complete (step S935), and if it is not, then CPU 510 executes other processing (step S940). When the command data in polling command register 643 indicate that data transfer to A bank is complete, electronic control device 501 reads the 16 words in A bank DPRAMA (step S945; see FIG. 15) and transfers the read data to RAM 512 (step S950).

Since the above processing completes the reading of the 16 words of data in A bank, electronic control device 501 sets one interrupt request register (AMDINT2) that will allow transfer of the next 16 words from microprocessor 601. The processing in steps S920 to S955 is then repeated with respect to B bank. In other words, when it is determined that the transfer of data by microprocessor 601 from B bank has been completed based on the command data in polling command registers 643, then one interrupt request register is set to send an interrupt request to microprocessor 601 after which the 16 words of data in B bank DPRAMB is read and transferred to RAM 512.

When it receives the interrupt request, microprocessor 601 executes the interrupt handler routine shown in FIG. 30 again, and, therefore, microprocessor 601 and CPU 510 complete the transfer of all image data by executing both routines shown in FIGS. 30 and 31. If new print data is not received from electronic control device 501 after all image data have been transferred, then microprocessor 601 writes level 1 to register CLKDIV of control registers 650 after a prescribed time period has elapsed and switches its own operating frequency to half, i.e., to 12.5 MHz, to reduce power consumption and reduce the amount of heat generated.

J. Printing of Image Data

Electronic control device 501, which receives the transfer of all image data, prints the image data by exchanging signals with laser engine 505 employing double-buffer circuit 520 and register 517 explained above. The exchange of signals between electronic control device 501 and laser engine 505 is roughly depicted in FIG. 32. Printing is summarized below with reference to FIG. 32.

When the image data that have been developed is received from cartridge 503, electronic control device 501 inquires whether or not laser engine 505 is in a print-enabled condition, and if it determines that preliminary functions have occurred and are completed, e.g., warming up, etc., and the laser engine is in a print-enabled condition, then it outputs the print signals shown in FIG. 32 to laser engine 505 via register 517. When laser engine 505 receives these signals, it immediately starts the motor for paper transport. Rotation of the photosensitive drum, charging processing, etc., are started in sync with the receipt of these signals.

When the paper to be printed reaches a position at a predetermined distance from the photosensitive drum, laser engine 505 detects the front end of the paper and outputs the signal VREQ to electronic control device 501 via register 517. When electronic control device 501 receives signal VREQ, it waits a predetermined period of time, i.e., the time required for the photosensitive drum to rotate to the position where formation of the latent image by the laser beam begins, and outputs the signal VSYNC via register 517. When laser engine 505 receives this signal VSYNC, it outputs the laser beam horizontal sync signal HSYNC via register 517. Since this signal HSYNC is a signal that instructs the beginning of reading one line of image data, laser engine 505 reads image data from either RAM 520A or RAM 520B of double-buffer circuit 520 in sync with this signal. When there is a top margin, control is performed that ignores the signal VSYNC for a predetermined number of lines corresponding to the width of the top margin. This kind of control is the same in forming the bottom margin.

At the same time, CPU 510 counts this signal and transfers the necessary image data to RAM 520A or RAM 520B of double-buffer circuit 520. When a predetermined amount of time has elapsed or the count of the horizontal sync signal becomes equal to a value previously set to conform with the paper size after laser engine 505 detects the trailing edge of the paper, CPU 510 terminates the transfer of image data to double-buffer circuit 520. By means of the above processing, one page of image data is transferred to the laser engine and the image is printed onto paper.

K. Effectiveness of Second Embodiment

The same advantages as achieved in the first embodiment are realized in the second embodiment relative to the transfer of data from electronic control device 501 to cartridge 503. Moreover, since an ASIC chip is employed in this embodiment, the circuit can be made more compact and simpler. Further, since both read control circuit 620 and FIFO control circuit 623 are employed to transport data from electronic control device 501 to data transfer controller 603, data can be transferred efficiently by using one or the other depending on the type of data to be transferred. Also, if one circuit should fail, the other circuit can be used to continue the process.

Since electronic control device 501 uses an interrupt to notify in the case of transfer of data to cartridge 503 in this embodiment, microprocessor 601 of cartridge 503 need not continually monitor the operation of electronic control device 501 thereby allowing it to be more efficiently operated.

L. Other Embodiments

Specific configurations of the invention were explained in the two embodiments above, but the invention is not limited to these embodiments. Other configurations for the transfer of data in devices with a read-only data bus are explained in the following order: configuration that transfers data using the address bus as a communication line (FIG. 33, FIG. 34, FIG. 35), configuration that transfers data by setting each bit of the data to be transferred by means of a data read signal (FIG. 36, FIG. 37), configuration that transfers data using a counter (FIG. 38, FIG. 39), and configuration that transfers data by reproducing a signal as received from outside (FIG. 40). The following explanations assume the conifiguration of the second embodiment in order to simplify the explanations and the same signals names are used, but these configurations for data transfer are not limited to the second embodiment.

(1) Configuration that Utilizes Address Bus as Communication Line—No. 1

FIG. 33 is a block diagram showing the configuration of the part of the accessory control device that receives data. This circuit comprises, as shown in the figure, decoder 1000, which detects that this circuit has been selected based on the address signals A3 to A20, the address strobe signal /ABS and the cartridge select signal /CTRGSEL, AND gates 1001 and 1002 which obtain the logical product of the output signal of the decoder and the address signals A1 and A2, respectively, and two serial-parallel converters (S/P converter) 1005 and 1006 whose data inputs are from AND gates 1001 and 1002 and whose clock signal CLK is the output of decoder 1000 inverted in inverter 1004.

Each time S/P converters 1005 and 1006 input the clock signal CLK, they take in the data of the input terminal Sin and convert it to a parallel output by shifting the data one bit at a time from output a to output h. The clear signal /CLR output from microprocessor 601 is connected to the clear terminals CLR of S/P converters 1005 and 1006, and the outputs a to h of S/P converters 1005 and 1006 are cleared prior to data transfer.

The transfer of data using this circuit is explained now. The top address assigned this transfer circuit is YYYYY0h. The upper 8 bits of the transfer data are transferred via the address signal A2, and the lower 8 bits are transferred via the address signal A1. In other words, the side to which the data is transferred (electronic control device 501 in this case) develops the data into binary signals beginning with the lower bits of the address signal. As illustrated in the address shown in FIG. 37, since the upper byte and lower byte of the data is transferred at the same time, the data is fetched from D8 for the upper byte and from D0 for the lower byte, and the address that performs readout is determined by their combination. As shown in FIG. 34, in a case in which bit Dd (d=8, 9, . . . , 15) of the upper byte is level 0 and bit Dd-8 of the lower byte is level 0, then processing is performed from data read from address YYYYY0h.

When electronic control device 501 reads data from address YYYYY0h, both address signals A2 and A1 become low level, and therefore the outputs of AND gates 1001 and 1002, i.e., the data Sin of S/P converters 1005 and 1006, become low level, and data 0 is received. Similarly, in a case in which bit Dd of the upper byte is level 0 and bit Dd-8 of the lower byte is level 1, in a case in which bit Dd of the upper byte is level 0 and bit Dd-8 of the lower byte is level 1 from the address YYYYY2h, and in a case in which bit Dd of the upper byte and bit Dd-8 of the lower byte are both level 1, processing is performed that reads each data from address YYYYY6h. As a result, the data corresponding to bits Dd and Dd-8 of the data to be transferred are taken in by S/P converters 1005 and 1006, respectively, and developed to the outputs a to h.

Upon completion of the transfer of all data in this manner, electronic control device 501 resets an interrupt request signal, which is not shown, to inform microprocessor 601 in cartridge 503 that transfer is complete. Microprocessor 601 reads the outputs of S/P converters 1005 and 1006 via data bus DB29, after which it resets S/P converters 1005 and 1006 by making the clear signal /CLR low active. By means of the above processing, 16-bit data can be transferred from electronic control device 501 to cartridge 503.

In this embodiment, the data to be transferred are converted to serial data and reflected in the address signals A1 and A2, and the signal lines for the address signals A1 and A2 are utilized as communication lines. In this case, the read cycle for sending data may be terminated as soon as the address strobe signal /ABS is established, and therefore the time required for data transfer can be shortened. The bit number of the address signal used for transfer may be 1. In this case, a simple circuit configuration can be used for transfer. Also, the time until completion of transfer of 3 bits or more can be further shortened.

(2) Configuration that Utilizes Address Bus as Communication Line—No. 2

Another configuration is shown in FIG. 35 for the transfer of data employing the address bus as a signal line for communication. This circuit comprises decoder 1010 that outputs the selection signal /CS2 when this circuit is selected, OR gate 1011 that outputs the selection signal /CS0 from the selection signal /CS2 of decoder 1010 and the address signal A2, three-input OR gate 1012 that outputs the selection signal /CS1 when the selection signal /CS2, the inverted address signal A2 inverted by inverter 1013 and the address signal A1 become low level, 8-bit shift register 1015 that operates using the selection signal /CS0 as a clock CLK and the address signal A1 as data Sin, latch 1017 that holds the outputs a to h of shift register 1015 by means of the selection signal /CS1, D-type flip-flop 1018 whose output Q is also set by the selection signal /CS1, and tristate buffer 1019 that outputs a to g of shift register 1015 and the address signal A1 to data bus DB68 of electronic control device 501. The outputs Q0 to Q7 of latch 1017 are connected to the lower bytes D0 to D7 of data bus DB29 of microprocessor 601.

After the 1-byte (8-bit) data to be transferred are sequentially converted to serial data from bit D0 in this circuit, they are reflected as is in the address signal A1. Therefore, assuming the top address assigned this circuit is YYYYY0h, electronic control device 501 reads address YYYYY0h when bit Dd is level 0 and address YYYYYZh when bit Dd is level 1. When addresses corresponding to each 1 byte or 8 bits of data are read 8 times, a condition results in which 1 byte of data is set in the outputs a to h of shift register 1015. When the address YYYYY4h is now read by electronic control device 501, the selection signal /CS1 becomes low level, and the output of shift register 1015 is set in the latch 1017. At the same time, the output Q of D-type flip-flop 1018 is set to high level, and an interrupt request is issued to microprocessor 601 by the output signal INT.

Microprocessor 601, which receives the interrupt request signal INT, reads the data held in latch 1017 via data bus DB29 and resets flip-flop 1018 by setting the interrupt clear signal /INTCLR to low level. By means of the above processing, data can be transferred from electronic control device 501 to microprocessor 601. In this embodiment, the transfer of data is performed by read processing, and since the output of shift register 1015 and the address signal A1 are output to data bus DB68 of electronic control device 501 via tristate buffer 1019, data sent from electronic control device 501 can be read and the sent data confirmed when the data D7 of the eighth bit is transferred.

In the two circuits explained above, data are sent serially as temporal variations in the address signal, and they are read by microprocessor 601 after they are converted to parallel data by the hardware. In contrast to this, a configuration can also be employed in which the address signal line on which the serial data are carried is input directly to the I/O port of the microprocessor 601 via the tristate buffer and the temporal variations are read directly by the microprocessor. In this case, no hardware is required for serial-parallel conversion and the circuit configuration can be made simple.

(3) Configuration that Transfers Data by Setting Each Bit of the Data to Be Transferred by Means of a Data Read Signal The circuit shown in FIG. 36 comprises decoder 1020 that outputs a selection signal when this circuit is selected, decoder 1021 whose inputs are the address signals A1 to A3 and that is enabled when it receives the selection signal from encoder 1020, and RS flip-flops (RS f/f) 1030 to 1037 that are set by each of the outputs Q0 to Q7 of decoder 1021. The clear signal /CLR output by microprocessor 601 accessing a prescribed address is connected to the reset terminals of RS f/f 1030 to 1037, and the outputs of R/S f/f 1030 to 1037 are connected to the lower byte D0 to D7 of data bus DB29 of microprocessor 601. Before data are transferred from electronic control device 501, microprocessor 601 outputs the clear signal /CLR and resets all of RS f/f 1030 to 1037 (output q=0).

When data are sent from electronic control device 501 in this configuration, each bit Dd (d=0, 1, ..., 7) of the 1-byte data are checked, and processing is performed that reads data of a corresponding address for level 1 bits. That is, when bit Dd is level 1 in a case in which the top address assigned this circuit is YYYYY0h, then processing is performed that reads the address

[YYYYY0+2×d]

corresponding to the bit Dd. As a result, that bit Dd is set to level 1. When bit Dd is level 0, then no processing is performed with respect to the address corresponding to that bit.

When the above processing is performed for all bits, each bit of the data to be transferred is set in RS f/f 1030 to 1037. Following this, electronic control device 501 outputs an interrupt request signal, which is not shown, to notify microprocessor 601 that the transfer of data is complete, at which time microprocessor 601 reads the addresses assigned the outputs of RS f/f 1030 to 1037. Microprocessor 601 then outputs the clear signal /CLR and resets each of RS f/f 1030 to 1037. This is how data transfer is performed.

In this configuration, the address space required for data transfer need only be 16 words. Also, the circuit configuration can be made relatively simple.

(4) Configuration that Transfers Data Employing a Counter

The circuit shown in FIG. 38 comprises decoder 1040 that outputs selection signals when this circuit is selected, 8-bit counter 1041 that performs counting by means of the selection signal CS0 from decoder 1040, and inverter 1043 that inverts the other selection signal CS1 from decoder 1040 and inputs it to the clear terminal of counter 1041. The eight outputs Q0 to Q7 of counter 1041 are connected to the lower byte D0 to D7 of data base DB29 of microprocessor 601 via the tristate buffer, which is not shown.

When data are transferred from electronic control device 501 to microprocessor 601 in this configuration, electronic control device 501 first performs a read operation on a prescribed address and sets the selection signal CS1 of decoder 1040 to high level, whereby it clears counter 1041 to zero. Following this, processing is performed that reads a number of prescribed addresses equal to the number of data D to be transferred, and the selection signal CS0 is switched on and off a prescribed number of times. As a result, counter 1041 counts this number D and the outputs Q0 to Q7 become equal to the data D to be transferred. Electronic control device 501 notifies microprocessor 601 that data transfer has been completed by means of an interrupt request signal, which is not shown. When microprocessor 601 receives the interrupt request signal, it enables the output of tristate buffer 1045 and completes data transfer by reading the output of counter 1041.

When the amount of data to be transferred becomes large in this embodiment, much time is required for transfer, but only a very few number of addresses need be occupied. In this example, counter 1041 was cleared to zero by electronic control device 501, but a configuration is also possible in which it is cleared by microprocessor 601, in which case it becomes possible to transfer data by assigning only one address.

(5) Configuration that Transfers Data Employing a Control Signal

As shown in FIG. 39, the cartridge selection signal /CTRGSEL that indicates cartridge 503 has been selected can be used for the clock signal of counter 1041. In this example, the address signal is used to clear counter 1041, but by clearing the counter from microprocessor 601 and transferring the start and completion of data transfer via interrupt request signals, data can be transferred without specifying addresses.

In the two circuits described above, an 8-place counter was used, but by using a counter with more places, data of more than 8 bits can be transferred at the same time. Of course, data in units of less than 8 bits can also be transferred.

(6) Configuration that Transfers Data by Reproducing a Signal as Received from an Outside Source The circuit shown in FIG. 40 performs the transfer of data by transmitting an image of the signal as received by laser printer 500 from workstation 507 to cartridge 503 when that signal is a parallel signal based on the Centronics standard. FIG. 40 shows, on the left side, part of line buffer 515, which is the interface for electronic control device 501, and, on the right side, that part of cartridge 503 concerned with data transfer. FIG. 40 further shows line buffer 1051, which outputs the address signals A1 to A9 to cartridge 503 by means of the selection signal CS0, and tristate buffer 1052, which receives the output of the data bus from cartridge 503 in electronic control device 501 by means of the selection signal CS.

The circuit of cartridge 503 comprises latch 1061 that holds the address signals A2 to A9 from electronic control device 501 as the data D0 to D7, inverter 1063 that outputs the address signal A1 from electronic control device 501 to clock CLK of latch 1061 as the strobe signal STB, D-type flip-flop 1065 that sets the output Q by means of this clock signal, and latch 1067 that holds the data D5 to D7 of data bus DB29 of microprocessor 601 by the selection signal CS2.

The selection signal CS1, which is generated by microprocessor 601 accessing a prescribed address, is connected to the output enable terminal OE of latch 1061, and the output of latch 1061 is connected as is to the lower byte D0 to D7 of data bus DB29. Therefore, by accessing this address, microprocessor 601 can read the data held in the latch 1061. The output Q of D-type flip-flop 1065 becomes the interrupt request signal INT for microprocessor 601, while at the same time it becomes the signal BUSY and can be read by electronic control device 501 as bit D0 of the data from cartridge 503.

When data are transferred using the circuit described above, electronic control device 501, after reading bit D0 and confirming in advance that the signal BUSY is not active high, reflects the data as received from workstation 507 via the Centronics interface, as well as the strobe signal STB, in the address signals A2 to A9 and A1 to transfer them.

When the output address signals are held in latch 1061, the interrupt request signal INT for microprocessor 601 becomes active, but since this signal becomes the signal BUSY for electronic control device 501, electronic control device 501 holds the signal BUSY as is at the interface with workstation 507 at high level (busy condition). Microprocessor 601, which receives the interrupt request INT, reads the output of latch 1061 and outputs the clear signal /CLR. As a result, D-type flip-flop 1065 is reset, and the signal BUSY is inverted to low level. When it reads this, electronic control device 501 inverts the signal BUSY at the interface with workstation 507 to low level. Workstation 507, which is monitoring this signal, judges from the inversion of the signal BUSY to low level that laser printer 500 has received the previous data and outputs the next data. By repeating this procedure, the print data output by workstation 507 can be transferred to cartridge 503.

When the selection signal CS2 is active, the signals /ACK, /ERR and /PE at the Centronics interface can be operated by outputting prescribed data to bits D5 to D7 of data bus DB29.

In the embodiment described above, the interface with workstation 507 is reproduced as is and is transmitted to cartridge 503, and therefore processing of data transfer in electronic control device 501 can be simplified. Further, since cartridge 503 exchanges data directly with the external device, workstation 507 in this case, that transfers the print data, the handling of errors is simplified. This example used a Centronics interface, but the same configuration is possible when using an RS-232C or an RS-422C interface or an AppleTalk (trademark of Apple Corporation) interface.

M. Other Applications of the Invention

The embodiments explained above concerned the application of the invention to a printer, but application of the invention is not limited to printers; e.g., it can also be applied to word processors, personal computers and workstations. In recent years, in addition to expansion slots, many computer-related devices have the ability to accommodate cartridge-type expansion devices such as IC cards. By mounting the accessory control device of the invention in a word processor, personal computer, etc., equipped with an expansion slot, IC card, etc., and shifting processing by the processor of the main unit to processing stored in the memory built into the accessory control device by a monitor command, etc., and processing information together with the processor in the accessory control device, the information processing function can be easily upgraded. Further, once control is shifted to the accessory control device, the contents of the processing can be changed in any manner, and therefore, the functions of devices that have already been purchased can be changed or improved and the software in word processors and other dedicated devices can be upgraded, improved or otherwise enhanced.

In this manner, the invention can be applied to all types of devices that employ a processor, e.g., electrical equipment for vehicles, facsimile machines, telephones, electronic notebooks, electronic musical instruments, electronic cameras, translating machines, handy copiers, cash dispensers, remote controllers, calculators and any other information processing device to which an accessory control device can be connected via a connector. If the processor in the main unit of these types of information processing devices has a function that recognizes an accessory control device and transfers its processing to an address prepared in the accessory control device, the accessory control device and information processing device of the invention can be easily realized, even in exisiting electronic apparatus. Even in cases wherein this function is not provided, various means can be considered for shifting the processor of the main unit to processing stored in the accessory control device. When the 68000 family of processors read data from a prescribed address, data on the data bus is judged to be fixed or not by the signal DTACK returned to the processor of the device (slave) outputting the data. Therefore, when the processor of the main unit attempts to execute a jump instruction to an absolute address while executing processing stored in ROM in the main unit, the accessory control device analyzes the instruction and detects it as the execution of a jump instruction to an absolute address, and before the original ROM in the main unit can output the target absolute address of the jump to the data bus, the accessory control device outputs the execution address in ROM in the accessory control device to the data bus and returns the signal DTACK to the processor in the main unit, whereby processing is forcibly shifted subsequent to a prescribed address in the accessory control device. Once processing is shifted to ROM in the accessory control device, subsequent processing can be configured in any manner.

This example is premised on the execution of a jump instruction to an absolute address by the processor in the main unit, but since the jump instruction itself comes from ROM in the main unit, a configuration can be employed that supplies a code equivalent to the jump instruction from the accessory control device to the data bus when the instruction is first read from ROM after powering on and also returns the signal DTACK. In these methods, there is a possibility of conflict with the signal DTACK, but the methods can be realized through careful analysis of the bus timing.

Further, in the embodiments described above, the accessory control device is configured as a cartridge capable of being handled as a single unit in which a printed circuit board is housed in a case, but it may also be configured as a single circuit board that mounts in an expansion slot. An accessory control device having multiple connectors can also be realized. In another configuration of the invention, the case itself may be configured as a printed circuit board.

The invention is not limited by the above embodiments; e.g., a configuration in which the cartridge, with built-in outline fonts, receives the character point size and other data from the printer, generates a bit image at the specified point size and transfers it to the printer, a configuration in which data received from the electronic apparatus are not subjected to particularly complex processing in the accessory control device but rather are merely stored or displayed, a configuration in which the main printer unit is an ink jet printer, and other configurations are possible as long as they do not deviate from the essential points of the invention.

The invention described herein can be applied relative to all types of devices that employ a processor, e.g., printers, electrical equipment for vehicles, facsimile machines, telephones, electronic pocketbooks, electronic musical instruments, electronic cameras, translating machines, handy copiers, cash dispensers, remote controllers, calculators and any other information processing device to which an accessory control device can be connected via a connector. By applying the invention to these devices, the functionality of the electronic apparatus may be improved, enhanced, added to or changed, and the invention can be utilized in a wide range of fields in industry including effective utilization in existing devices already in the hands of users.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. An intelligent cartridge for releasable attachment to a printer, said printer having a printer controller capable of receiving print data from an external source and developing the print data into printer controller developed bit image data for printout, the cartridge including logic means and memory means for receiving the print data from the printer controller when connected thereto, developing the print data into logic means and memory means developed bit image data, and transferring said logic means and memory means developed bit image data to the printer controller for printout in lieu of said printer controller developed bit image data;

wherein the logic means and memory means receive said print data in the form of address data transferred to the cartridge from the printer controller, the cartridge further including transfer means for processing said address data to reproduce said print data, and forwarding said reproduced print data to the logic means for developing into said logic means and memory means developed bit image data.

2. The intelligent cartridge of claim 1, wherein said address data comprises an address portion and a print data portion, and the transfer means comprises a decoder for decoding only said print data portion.

3. The intelligent cartridge of claim 1, wherein said print data is transferred serially as a bit of said address data, and the transfer means comprises a serial-to-parallel converter for receiving said bit of said address data and reproducing said print data in parallel form in response thereto.

4. The intelligent cartridge of claim 3, wherein the printer controller generates a clock signal for clocking the serial-to-parallel converter in synchronism with serially transferring said print data to the cartridge.

5. The intelligent cartridge of claim 1, wherein said print data is transferred serially as a first bit of said address data corresponding to a high order portion of said print data, and a second bit of said address data corresponding to a low order portion of said print data, and the transfer means comprises a first serial-to-parallel converter for receiving said first bit of said address data and reproducing said high order portion of said print data in parallel form in response thereto, and a second serial-to-parallel converter for receiving said second bit of said address data and reproducing said low order portion of said print data in parallel form in response thereto.

6. The intelligent cartridge of claim 5, wherein the printer controller generates a clock signal for simultaneously clocking the first and second serial-to-parallel converters in synchronism with serially transferring said print data to the cartridge.

7. The intelligent cartridge of claim 1, wherein said print data is transferred serially as a bit of said address data, and the transfer means comprises a shift register for receiving said bit of said address data at a serial input and reproducing said print data at a parallel output.

8. The intelligent cartridge of claim 7, wherein the printer controller generates a clock signal for clocking the shift register as another bit of said address data.

9. The intelligent cartridge of claim 1, wherein said address data comprises an address portion and a print data portion, and the transfer means comprises a decoder for decoding only said print data portion, and a plurality of flip-flops connected to outputs of the decoder respectively.

10. The intelligent cartridge of claim 1, wherein the printer controller applies said address data to the cartridge a number of times corresponding to said print data, and the transfer means comprises a counter for reproducing said print data by counting said number of times.

11. The intelligent cartridge of claim 1, wherein the printer controller applies said address data to the cartridge to select said cartridge and applies a strobe signal to the cartridge a number of times corresponding to said print data, and the transfer means comprises a counter for reproducing said print data by receiving said strobe signal and counting said number of times.

12. The intelligent cartridge of claim 1, in which the printer controller applies said address data to the cartridge in parallel, and the transfer means comprises a latch for latching said address data.

13. A method of image processing carried out, in part, via a separate intelligent cartridge having its own CPU processing unit and releasably connected to a printer having a CPU operated printer controller, the cartridge being electrically connected to the printer controller to provide a read-only address capability to the cartridge and a read-only data capability to the printer controller, said printer controller being capable of developing a printer controller developed bit image based on print data received from an external source and printing the printer controller developed bit image, the method comprising the steps of:

(a) transferring said print data submitted as address data from the printer controller to the cartridge;

(b) processing said address data to reproduce said print data;

(c) employing the processing unit to develop a cartridge developed bit image based upon the print data corresponding to said index; and (d) transferring said cartridge developed bit image to the printer controller to print said cartridge developed bit image.

14. The method of claim 13, wherein step (a) comprises transferring said address data as including an address portion and a print data portion, and step (b) comprises decoding only said print data portion.

15. The method of claim 13, wherein step (a) comprises transferring said print data serially as a bit of said address data, and step (b) comprises using a serial-to-parallel converter to receive said bit of said address data and reproduce said print data in parallel form in response thereto.

16. The method of claim 15, wherein step (a) comprises generating a clock signal for clocking the serial-to-parallel converter in synchronism with serially transferring said print data to the cartridge.

17. The method of claim 13, wherein step (a) comprises transferring said print data serially as a first bit of said address data corresponding to a high order portion of said print data, and a second bit of said address data corresponding to a low order portion of said print data, and step (b) comprises using a first serial-to-parallel converter to receive said first bit of said address data and reproduce said high order portion of said print data in parallel form in response thereto, and a second serial-to-parallel converter to receive said second bit of said address data and reproduce said low order portion of said print data in parallel form in response thereto.

18. The method of claim 17, wherein step (a) comprises generating a clock signal for simultaneously clocking the first and second serial-to-parallel converters in synchronism with serially transferring said print data to the cartridge.

19. The method of claim 13, wherein step (a) comprises transferring said print data serially as a bit of said address data, and step (b) comprises using a shift register to receive said bit of said address data at a serial input and reproduce said print data at a parallel output.

20. The method of claim 19, wherein step (a) comprises generating a clock signal for clocking the shift register as another bit of said address data.

21. The method of claim 13, wherein step (a) comprises transferring said address data as including an address portion and a print data portion, and step (b) comprises using a decoder to decode only said print data portion, and transfer said reproduced print signal from the decoder to a plurality of flip-flops connected to outputs of the decoder respectively.

22. The method of claim 13, wherein step (a) comprises applying said address data to the cartridge a number of times corresponding to said print data, and step (b) comprises using a counter to reproduce said print data by counting said number of times.

23. The method of claim 13, wherein step (a) comprises applying said address data to the cartridge to select said cartridge and applying a strobe signal to the cartridge a number of times corresponding to said print data, and step (b) comprises using a counter to reproduce said print data by receiving said strobe signal and counting said number of times.

24. The method of claim 13, in which step (a) comprises applying said address data to the cartridge in parallel, and step (b) comprises latching said address data.

25. A method of image processing carried out, in part, via a separate intelligent cartridge having its own CPU processing unit and releasably connected to a printer having a CPU operated printer controller, the cartridge being electrically connected to the printer controller to provide a read-only address capability to the cartridge and a read-only data capability to the printer controller, said printer controller being capable of developing a printer controller developed bit image based on print data received from an external source and printing the printer controller developed bit image, and comprising the steps of:

(a) transferring said print data submitted as address data from the printer controller to the cartridge;

(b) processing said address data to reproduce said print data;

(c) interpreting the print data in the cartridge into a cartridge developed bit image employing the processing unit; and (d) transferring said cartridge developed bit image to the printer controller to print said cartridge developed bit image.

26. The method of claim 25, wherein step (a) comprises transferring said address data as including an address portion and a print data portion, and step (b) comprises decoding only said print data portion.

27. The method of claim 25, wherein step (a) comprises transferring said print data serially as a bit of said address data, and step (b) comprises using a serial-to-parallel converter to receive said bit of said address data and reproduce said print data in parallel form in response thereto.

28. The method of claim 27, wherein step (a) comprises generating a clock signal for clocking the serial-to-parallel converter in synchronism with serially transferring said print data to the cartridge.

29. The method of claim 25, wherein step (a) comprises transferring said print data serially as a first bit of said address data corresponding to a high order portion of said print data, and a second bit of said address data corresponding to a low order portion of said print data, and step (b) comprises using a first serial-to-parallel converter to receive said first bit of said address data and reproduce said high order portion of said print data in parallel form in response thereto, and a second serial-to-parallel converter to receive said second bit of said address data and reproduce said low order portion of said print data in parallel form in response thereto.

30. The method of claim 29, wherein step (a) comprises generating a clock signal for simultaneously clocking the first and second serial-to-parallel converters in synchronism with serially transferring said print data to the cartridge.

31. The method of claim 25, wherein step (a) comprises transferring said print data serially as a bit of said address data, and step (b) comprises using a shift register to receive said bit of said address data at a serial input and reproduce said print data at a parallel output.

32. The method of claim 31, wherein step (a) comprises generating a clock signal for clocking the shift register as another bit of said address data.

33. The method of claim 25, wherein step (a) comprises transferring said address data as including an address portion and a print data portion, and step (b) comprises using a decoder to decode only said print data portion, and transfer said reproduced print signal from the decoder to a plurality of flip-flops connected to outputs of the decoder respectively.

34. The method of claim 25, wherein step (a) comprises applying said address data to the cartridge a number of times corresponding to said print data, and step (b) comprises using a counter to reproduce said print data by counting said number of times.

35. The method of claim 25, wherein step (a) comprises applying said address data to the cartridge to select said cartridge and applying a strobe signal to the cartridge a number of times corresponding to said print data, and step (b) comprises using a counter to reproduce said print data by receiving said strobe signal and counting said number of times.

36. The method of claim 25, in which step (a) comprises applying said address data to the cartridge in parallel, and step (b) comprises latching said address data.

\* \* \* \* \*

UNITED STATES PATENT AND TRADEMARK OFFICE
CERTIFICATE OF CORRECTION

PATENT NO. : 5537517
DATED : July 16, 1996
INVENTOR(S) : Wakabayashi, et al

It is certified that error appears in the above-identified patent and that said Letters Patent is hereby corrected as shown below:

On the title page, under item [56], Other Publications, insert the following

-- Byte, October 1990, Volume 15, Number 10; "Head to Head"
MICROWAY INC., Trade brochure "SX your AT", 1 sheet
MICROWAY INC., Trade brochure regarding AT accelerator and XT/AT motherboard products; 1 sheet
Microway Trade Brochure regarding Quadputer and Number Smasher 860 products; 1 sheet --

Signed and Sealed this

Thirty-first Day of December, 1996

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,537,517
DATED : July 16, 1996
INVENTOR(S) : Kenichi Wakabayashi et al.

It is certified that error appears in the above-indentified patent and that said Letters Patent is hereby corrected as shown below:

Title page, item [63],
Related U.S. Application Data:

Change "Ser. No. 895,536" to --Ser. No. 895,537--.

Signed and Sealed this

Eighteenth Day of February, 1997

Attest:

BRUCE LEHMAN

*Attesting Officer*     *Commissioner of Patents and Trademarks*